US010700976B2

(12) United States Patent
Richards et al.

(10) Patent No.: US 10,700,976 B2
(45) Date of Patent: *Jun. 30, 2020

(54) SYSTEM AND METHOD FOR AN AUTOMATED SYSTEM FOR CONTINUOUS OBSERVATION, AUDIT AND CONTROL OF USER ACTIVITIES AS THEY OCCUR WITHIN A MOBILE NETWORK

(71) Applicant: Network Kinetix, LLC, Austin, TX (US)

(72) Inventors: Carissa Richards, Georgetown, TX (US); Peter Richards, Georgetown, TX (US); Hariharan Ramachandran, New South Wales (AU)

(73) Assignee: NETWORK KINETIX, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/989,962

(22) Filed: May 25, 2018

(65) Prior Publication Data

US 2018/0279126 A1 Sep. 27, 2018

Related U.S. Application Data

(63) Continuation of application No. 15/783,436, filed on Oct. 13, 2017, now Pat. No. 10,015,675, which is a
(Continued)

(51) Int. Cl.
*H04W 12/06* (2009.01)
*H04L 12/26* (2006.01)
(Continued)

(52) U.S. Cl.
CPC ............ *H04L 47/10* (2013.01); *G06Q 20/32* (2013.01); *G06Q 20/3223* (2013.01);
(Continued)

(58) Field of Classification Search
CPC ..... H04L 47/10; H04L 47/2483; H04L 43/08; H04L 43/062; H04L 43/16; H04L 41/12;
(Continued)

(56) References Cited

U.S. PATENT DOCUMENTS 5,239,294 A * 8/1993 Flanders ................ H04W 12/06
340/5.74
5,517,554 A * 5/1996 Mitchell ........... H04W 12/1206
455/411
(Continued)

FOREIGN PATENT DOCUMENTS

WO WO-2007002752 A2 * 1/2007 ............. G06F 21/33

*Primary Examiner* — Kostas J Katsikis
(74) *Attorney, Agent, or Firm* — Dickinson Wright PLLC; Ross Spencer Garsson

(57) ABSTRACT

A method for detecting a fraudulent attempt to activate a new PIN, SIM Card or mobile device includes monitoring, at a first processing node associated with a network interconnecting a first network point and a second network point, a mirrored live-data flow of a live data flow passing through the first processing node in a non-intrusive manner that does not affect the first live-data flow passing through the first processing node. The live-data flow comprises data that is in active transmission between the first network point and the second network point and prior to storage of the data in a database. The first processing node detects that a transaction within the monitored live-data flow relates to an activation of the new PIN, SIM card or mobile device and compares the detected transaction to a list of known fraud situations stored in the first processing node to determine if the detected transaction relates to a known fraud situation. The first processing node generates an alert indication responsive to a determination the detected data relates to one of a plurality of known fraud situations. The first processing node identifies the detected transaction as a potential fraud situation responsive to a determination the detected data does not
(Continued)

relate to one of the plurality known fraud situations. An automatically generated dialog verification with a party requesting the new PIN, SIM Card or mobile device is performed to verify identity of the party requesting the new PIN, SIM Card or mobile device for the detected transaction identified as the potential fraud situation.

20 Claims, 33 Drawing Sheets

Related U.S. Application Data continuation of application No. 15/606,047, filed on May 26, 2017, now Pat. No. 9,832,646, which is a continuation of application No. 15/357,401, filed on Nov. 21, 2016, now Pat. No. 9,763,093, which is a continuation of application No. 15/162,159, filed on May 23, 2016, now Pat. No. 9,532,227, which is a continuation-in-part of application No. 14/962,660, filed on Dec. 8, 2015, now Pat. No. 9,369,366, which is a continuation of application No. 14/596,781, filed on Jan. 14, 2015, now Pat. No. 9,210,061, which is a continuation of application No. 14/485,172, filed on Sep. 12, 2014, now Pat. No. 8,966,074.

(60) Provisional application No. 61/877,810, filed on Sep. 13, 2013.

(51) Int. Cl.
| | |
|---|---|
| *H04W 12/12* | (2009.01) |
| *H04L 29/06* | (2006.01) |
| *H04L 12/801* | (2013.01) |
| *G06Q 20/08* | (2012.01) |
| *G06Q 30/02* | (2012.01) |
| *G06Q 20/40* | (2012.01) |
| *G06Q 20/32* | (2012.01) |
| *H04W 24/08* | (2009.01) |
| *H04L 12/851* | (2013.01) |
| *H04L 12/24* | (2006.01) |

(52) U.S. Cl.
CPC ..... *G06Q 20/4016* (2013.01); *G06Q 30/0248* (2013.01); *H04L 43/062* (2013.01); *H04L 43/16* (2013.01); *H04L 63/1425* (2013.01); *H04L 63/20* (2013.01); *H04W 12/0605* (2019.01); *H04W 12/12* (2013.01); *H04L 41/12* (2013.01); *H04L 41/5009* (2013.01); *H04L 43/08* (2013.01); *H04L 47/2483* (2013.01); *H04W 12/1201* (2019.01); *H04W 12/1206* (2019.01); *H04W 24/08* (2013.01)

(58) Field of Classification Search
CPC . H04L 41/5009; H04L 63/20; H04L 63/1425; H04L 63/083; H04L 63/0853; H04W 12/06; H04W 12/12; H04W 12/1201; H04W 12/1206; H04W 12/0605; H04W 24/08; H04W 12/1202; H04W 12/1208; G06Q 20/08; G06Q 20/32; G06Q 20/3223; G06Q 20/4016; G06Q 30/0248
See application file for complete search history.

(56) References Cited

U.S. PATENT DOCUMENTS

| | | | | | |
|---|---|---|---|---|---|
| 5,572,193 | A | * | 11/1996 | Flanders | H04W 12/06 340/5.74 |
| 5,892,827 | A | * | 4/1999 | Beach | G06Q 20/342 340/5.26 |
| 5,953,653 | A | * | 9/1999 | Josenhans | H04W 12/1206 455/410 |
| 6,829,596 | B1 | * | 12/2004 | Frazee | G06Q 20/0457 235/380 |
| 7,480,631 | B1 | * | 1/2009 | Merced | G06Q 20/3674 235/380 |
| 7,636,338 | B1 | * | 12/2009 | Vu | H04L 63/08 370/338 |
| 7,774,076 | B2 | * | 8/2010 | Skowronek | G06Q 20/32 700/44 |
| 8,109,444 | B2 | * | 2/2012 | Jain | G06K 19/07707 235/492 |
| 8,285,639 | B2 | * | 10/2012 | Eden | G06Q 20/04 705/35 |
| 9,681,303 | B2 | * | 6/2017 | Haberkorn | H04W 12/12 |
| 10,354,253 | B2 | * | 7/2019 | Ferguson | G06Q 20/4016 |
| 10,460,312 | B1 | * | 10/2019 | Kurani | H04W 4/24 |
| 2004/0225604 | A1 | * | 11/2004 | Foss, Jr. | G06Q 20/04 705/39 |
| 2005/0084083 | A1 | * | 4/2005 | Lawyer | G06Q 10/00 379/114.14 |
| 2006/0287004 | A1 | * | 12/2006 | Fuqua | G06Q 20/0658 455/558 |
| 2007/0072587 | A1 | * | 3/2007 | Della-Torre | H04L 63/1408 455/410 |
| 2007/0233615 | A1 | * | 10/2007 | Tumminaro | G06Q 20/12 705/75 |
| 2007/0244811 | A1 | * | 10/2007 | Tumminaro | G06Q 20/10 705/39 |
| 2007/0255653 | A1 | * | 11/2007 | Tumminaro | G06Q 20/10 705/39 |
| 2007/0255662 | A1 | * | 11/2007 | Tumminaro | G06Q 20/027 705/79 |
| 2008/0097851 | A1 | * | 4/2008 | Bemmel | G06Q 30/02 705/14.36 |
| 2009/0061860 | A1 | * | 3/2009 | Jiang | H04M 3/2281 455/433 |
| 2009/0119190 | A1 | * | 5/2009 | Realini | G06Q 20/04 705/30 |
| 2009/0132813 | A1 | * | 5/2009 | Schibuk | G06Q 20/389 713/158 |
| 2009/0319425 | A1 | * | 12/2009 | Tumminaro | G06Q 20/108 705/42 |
| 2011/0022472 | A1 | * | 1/2011 | Zon | G06Q 20/10 705/14.64 |
| 2011/0078025 | A1 | * | 3/2011 | Shrivastav | G06Q 20/02 705/14.64 |
| 2011/0087598 | A1 | * | 4/2011 | Bozeman | G06Q 20/04 705/45 |
| 2012/0030067 | A1 | * | 2/2012 | Pothukuchi | G06Q 10/08 705/26.81 |
| 2012/0095852 | A1 | * | 4/2012 | Bauer | G06Q 20/20 705/16 |
| 2012/0136732 | A1 | * | 5/2012 | McMillen | G06Q 20/105 705/16 |
| 2013/0046697 | A1 | * | 2/2013 | Schibuk | G06Q 20/32 705/67 |
| 2014/0024361 | A1 | * | 1/2014 | Poon | H04W 12/06 455/419 |
| 2014/0106728 | A1 | * | 4/2014 | Aboulhosn | H04W 8/205 455/418 |
| 2014/0316984 | A1 | * | 10/2014 | Schwartz | G06Q 20/4016 705/44 |
| 2014/0351899 | A1 | * | 11/2014 | Dennis | H04W 12/06 726/4 |
| 2015/0031337 | A1 | * | 1/2015 | Adenuga | G06F 21/35 455/411 |
| 2015/0142623 | A1 | * | 5/2015 | Ferguson | G06F 21/88 705/30 |
| 2017/0193503 | A1 | * | 7/2017 | Oppenheim | G06Q 20/401 |
| 2017/0308880 | A1 | * | 10/2017 | Phillips | G06Q 20/206 |
| 2018/0184330 | A1 | * | 6/2018 | Egner | H04L 43/065 |

* cited by examiner

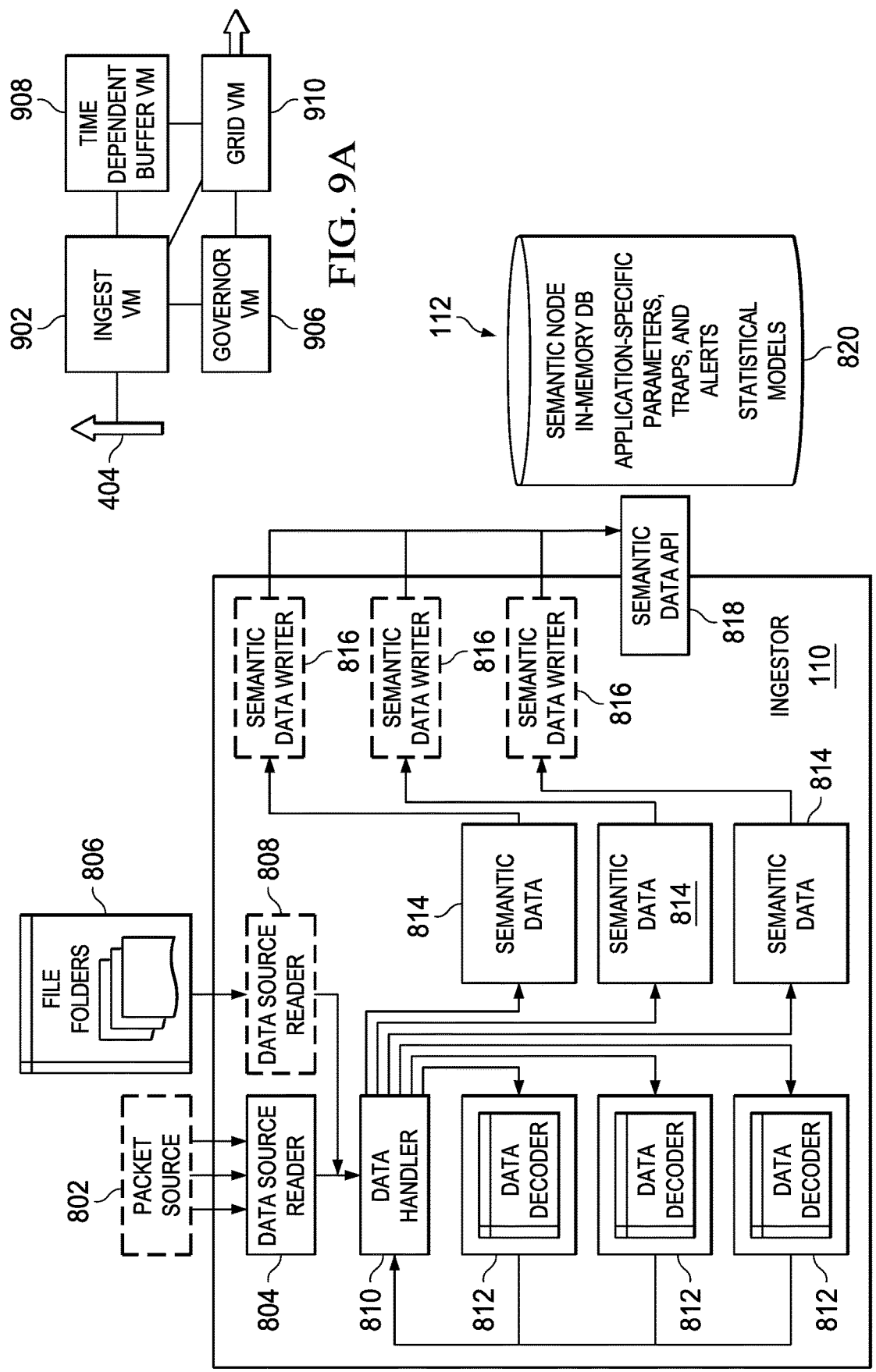

SYSTEM AND METHOD FOR AN AUTOMATED SYSTEM FOR CONTINUOUS OBSERVATION, AUDIT AND CONTROL OF USER ACTIVITIES AS THEY OCCUR WITHIN A MOBILE NETWORK

CROSS-REFERENCE TO RELATED APPLICATIONS

The present patent filing is a continuation of U.S. patent application Ser. No. 15/783,436, having the same title, filed 13 Oct. 2017, which is a continuation of U.S. patent application Ser. No. 15/606,047, having the same title, filed 26 May 2017, which is a continuation of U.S. patent application Ser. No. 15/357,401, having the same titled, filed 21 Nov. 2016, which is a continuation of U.S. patent application Ser. No. 15/162,159, having the same titled, filed 23 May 2016, which is a continuation-in-part of U.S. patent application Ser. No. 14/962,660, titled SYSTEM AND METHOD FOR REAL-TIME ANALYSIS OF NETWORK TRAFFIC, filed 8 Dec. 2015, which is a continuation of U.S. patent application Ser. No. 14/596,781, having the same titled, filed 14 Jan. 2015, which is a continuation of U.S. patent application Ser. No. 14/485,172, having the same titled, filed 12 Sep. 2014, which claims the benefit of U.S. Provisional Pat. App. 61/877,810, titled REAL-TIME ANALYSIS OF NETWORK TRAFFIC, filed 13 Sep. 2013. The entire content of each afore-listed patent filing, along with that of U.S. Pat. App. 62/165,721, is hereby incorporated by reference.

TECHNICAL FIELD

The invention relates to networks for example, voice, data and enterprise networks (whether in real hardware form or functional virtualized clouds), and more particularly to the real-time analysis of a live-data stream resulting in a situational deduction simultaneous to the live-data transmission over those networks, and as a result providing an opportunity to make effective an alert or action that now affects a set of probable outcomes before that data in transmission exits the network, or becomes at rest as a stored event, log record, or application record of what has already happened as the only outcome.

BACKGROUND

The proliferation of internet and mobile-connected devices, the 'Internet of Things', has increased network traffic volume, transmission speeds and usage on communications networks. The ubiquity of device types and connections (cellular, wireless, sensor, multi-SIM, machine-to-machine) and the expansion of usage types (voice, high-definition video, music, data) have also made it more complex to monitor and secure these networks and to conduct analysis on the traffic and content.

To accomplish this, the traffic must be instrumented (what data is moving across the network), analyzed (what is the content of the traffic), and contextualized (what are the implications of this) so a relevant decision can be made or action taken within the available window of opportunity. This is especially so in the case of time-critical security, verification, or revenue impacting situations, and customer, operational, or machine-to-machine impacting events. Examples of such events include fraud occurring on mobile carrier networks, cellular zones dropping calls above an acceptable threshold, malfunctioning mobile applications or sensor devices, or malicious content or agents compromising a network.

Today, this network data is captured by a variety of network probes sitting 'inline' (intrusively) inside the network. Network events must first 'complete' (example: after a voice call is completed and goes through 'call teardown') before they are translated into offline database records (example: Call Detail Records, Event Detail Records). These records are extracted at regular time intervals and provided to applications in offline enterprise data centers for post-event processing and analysis.

These systems can suffer from latency delays of up to 15 minutes for event data to be extracted and delivered to databases. In many cases, multiple terabytes of data are written into databases, posing 'Big Data' analytical challenges when time-critical results are needed. The inline hardware represents significant capital expenditures. These types of systems also provide a limited ability to respond flexibly to live conditions, as the application layer is not integrated contextually within the data collection layer. Database records are not generated for some network events that may provide indications of fraud or other critical issues that must be detected.

A use case is mobile carrier fraud detection that utilizes call detail records that have been delivered to a data warehouse after the relevant network traffic or calls have been completed. Detection of fraud in this case occurs after the actual fraudulent event has occurred, and in many cases, the carrier has already incurred a financial loss. Any actions taken to remediate (example: block the caller) can only be applied to the next time a relevant event appears in the network.

Increasingly fast and interconnected networks are driving more activities on to mobile devices such as phones, tablets, etc. Users are adopting everything from e-commerce, mobile health applications and mobile financial tools at a rapidly growing rate. Mobile carriers are enabling money services, similar to those services provided by traditional banks, using mobile devices to transfer electronic money, send and receive money from one device to another, and to deposit and withdraw money. This enables mobile carriers to essentially act as banks by receiving banking licenses in many parts of the world to support these mobile money transfer activities.

Just as traditional banking has a long tradition of fraud, mobile money transfers are rife with opportunities to defraud users at several levels. During the issuance and provisioning of SIM cards there is the opportunity for dishonest retail agents to sell customers phony mobile wallets and applications or to register fake accounts to earn commissions. Additionally, there are classic "socially engineered" scams to trick unsuspecting individuals out of their money by promising they've won a lottery, offering a job application for a small fee, and phishing scams. These fraud situations cost mobile carriers hard dollars in reimbursements to subscribers, regulatory compliance issues, and brand reputation damage.

Preventing mobile money transfer fraud requires the ability to deduce with a high probability whether mobile transfers are legitimate before they are allowed to complete. Unlike today's traditional retail EFT/POS systems where there is an ability to check for stolen cards or lack of funds available before the transaction is approved, there is no ability in the mobile network to undertake any level of positive identification for provisioning, transaction fidelity or identity assurance while the transaction is underway.

Carrier fraud management systems analyze log records after transactions have been completed. This does not provide a capability to prevent a fraudulent transaction from occurring in the first place. Safeguarding mobile money transfers from fraud requires accessing the transaction during the transmission in order to provide an opportunity to interject an action to control the outcome of the transaction

SUMMARY

The present invention, as disclosed and described herein, in one aspect thereof, comprises a method for detecting a fraudulent attempt to activate a new PIN, SIM Card or mobile device includes monitoring, at a first processing node associated with a network interconnecting a first network point and a second network point, a mirrored live-data flow of a live data flow passing through the first processing node in a non-intrusive manner that does not affect the first live-data flow passing through the first processing node. The live-data flow comprises data that is in active transmission between the first network point and the second network point and prior to storage of the data in a database. The first processing node detects that a transaction within the monitored live-data flow relates to an activation of the new PIN, SIM card or mobile device and compares the detected transaction to a list of known fraud situations stored in the first processing node to determine if the detected transaction relates to a known fraud situation. The first processing node generates an alert indication responsive to a determination the detected data relates to one of a plurality of known fraud situations. The first processing node identifies the detected transaction as a potential fraud situation responsive to a determination the detected data does not relate to one of the plurality known fraud situations. An automatically generated dialog verification with a party requesting the new PIN, SIM Card or mobile device is performed to verify identity of the party requesting the new PIN, SIM Card or mobile device for the detected transaction identified as the potential fraud situation.

BRIEF DESCRIPTION OF THE DRAWINGS

For a more complete understanding, reference is now made to the following description taken in conjunction with the accompanying drawings in which:

FIG. 8 illustrates the topical data flow through an ingestor node and semantic node;

FIG. 9A is a block diagram of an ingestor node;

DETAILED DESCRIPTION

Figure 1:
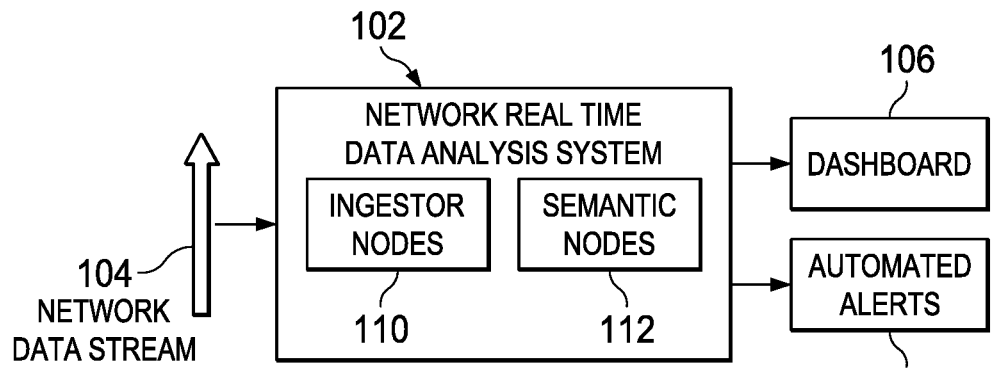
FIG. 1 illustrates the operational environment of a network live-data, real time data analysis system.

Referring now to the drawings, wherein like reference numbers are used herein to designate like elements throughout, the various views and embodiments of a system and method for real-time live-data analysis of network traffic are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated the operational environment of the network live-data, real-time analysis system 102 ("the System") according to the present disclosure. ARCHITECTURE: A system and methodology results in the ability to integrate an application and its relational language processing (example: SQL) in parallel and in real-time operational unity with network signaling, packet or data content ("network traffic") as it is in transmission ("live-data") and to make situational deductions and to take action on that live-data as it is being transmitted between points within a network. The usefulness here is the ability to take meaningful derived or deduced action on the information in transmission (or to use such information in relationship to other situations) to predictively inform of, alert on, alter or prepare for, or shape or execute a desired outcome, in advance of the live-data exiting the network (interception, interdict, adjust content or prevent an action on network activity or to stop, shape, alter, copy, redirect or release a network activity) and becoming a data center log record or database application event under its normal course of business operations.

The System 102 uses relational processing languages and techniques to enable detection of a situation in real-time and in parallel to its occurrence within a network; and not at a later point in time after the data has left the network for analysis based upon post-event data processing, which does not allow an opportunity to affect a change in outcome on that present event. The network traffic 104 is comprised of continuous transmissions of multiple feeds of signaling and related data content (live-data), from both homogenous and heterogeneous networks as can be found within voice communications or data networks such as those provided by mobile, broadband, or data communications network service providers. The System 102 provides any network provider (wireless carrier, fixed wire/line carrier, cable operator, enterprise network, sensor network, M2M, etc.) an opportunity to detect and identify target events or patterns of data flow or relationships ("Events") occurring within its network traffic 104 by providing a common view of these events as they occur and to automatically deduce and take predictively relevant actions or control responsive to the detection in a concurrent manner to those transmissions. The network live-data, real-time analysis, and deduction system 102 provides the automated action in any number of fashions, including, but not limited to providing information to a dashboard, web based or mobile device display 106 that responds to a detected Event in parallel to the Event occurring and remaining open within the network traffic 104, or the generation of automated alerts 108 that may then be responded to manually or by the network.

Live-data is data that is in transmission between endpoints, not at rest within a database. Live-data is transient data in that it exists only for that period of time it is in transmission. The term "real-time" typically refers to the immediacy of a process or response to a query being made available in time for its usefulness. The term real time has nothing to do with the age or relevancy of the data, but instead has everything to do with the timeliness of response relevant to a time period. The term real time is therefore an omni-available description that introduces a time period and that needs to be qualified as, "real time to what?" Data that is time-critical relates to the period of urgency or usefulness applied to it. Real time live-data analysis is the time-critical processing of network traffic in parallel with its transmission and before such network traffic completes its transmission and exits the network to become an "already-happened" data event at rest.

The System 102 provides a non-intrusive process that enables data center logic to operate concurrently with the transmission before the transmission terminates and exits the network to become a data center application event, and additionally provides the ability for the data warehouse system to interact in a time-critical manner with the same network traffic 104 to provide contextualization of conditions based on trends or other data. The System 102 enables concurrent analysis and deduction of relationships and probabilities as Events occur and are transmitted as network traffic 104, thus allowing deductive parallel operations with the concurrently occurring network traffic and its operations. The System 102 does not reside within a data center that operates on a sequence of post event analytical functions; rather it is architected as a larger network topology operating non-intrusively and in parallel to the network traffic 104.

Within a network topology, the system is able to use one or more virtual machines (a virtual machine is any segmented computing context such as, for example, Processes, Threads, Virtual Machines, Containers, micro services, Network Function Virtualization, etc.) as data collection devices ("ingestor node(s)") connected non-intrusively to network elements that provide a port mirror to non-intrusively ingest network traffic ("live-data source") to dynamically and continuously decode signaling, packet or data content ("network traffic"), and action such identifiable selected network traffic to trap and generate immediate alerts, and additionally pass through all or such selected subject matter for further processing simultaneously with and live to the network traffic event remaining open or in transit, or before the transmission exits the network and becomes a data center log record or application event. The system 102 is in two parts, consisting of one or more ingestor nodes 110 and one or more semantic nodes 112. The ingestor node 110 enables a non-intrusive, direct mirroring of network traffic 104 and its content, and provides protocol decoding, data extraction, and prescribed Event alert capabilities. The ingestor node also feeds an assigned semantic node 112 with such prescribed traffic as required. The ingestor node 110 non-intrusively undertakes its analysis and alerts while a particular Event is occurring or in transmission.

The various rules in control that dynamically instruct ingestor nodes 110 as to what particular protocol and information is being sought to be alerted by the System 102 are provided by the semantic node 112. The semantic node provides one or more virtual machines for the purpose of collecting all or selective network traffic from the ingestor node(s) 110 and enabling access to relational language processing in combination with their application use cases and variable windows of time to provide analysis and reasoned deduction of outcomes of time-critical live-data situations for the generation of further alerts, intercept and interdiction actions ("semantic node(s)"), being able to affect a more desirable or predictable outcome of the network traffic, before the transmission exits the network and becomes a data center log record or application event. The primary functions of the semantic node 112 are to attach to the ingestor node 110 for the receipt of all or some ingestor node packets 1104 for business application deductive reasoning and future dynamic updating of conditions and rules back to the ingestor node 110. Functions include to receive selected ingestor node packets 1104; the preparation and management of time critical processes required by use case applications 1102 to process the described use cases; to provide fast in-memory storage for statistical models required by a use case application; to provide application visualization and system administration visualization through the visualization VM 1110; and to provide integrity check of packets mirrored to packets that exit the network.

The System 102 has the ability to process data from the network traffic 104 at gigabit speeds. The ingestor node 110 filters, decodes, undertakes prescribed alerts and feeds selective or all network traffic into the semantic node 112. The semantic node 112 undertakes application specific use case tasks including situational analysis, contextual reasoning and deductive processing according to rules, statistical models and, if any, subject matter databases attached to the semantic node 112.

Figure 2:
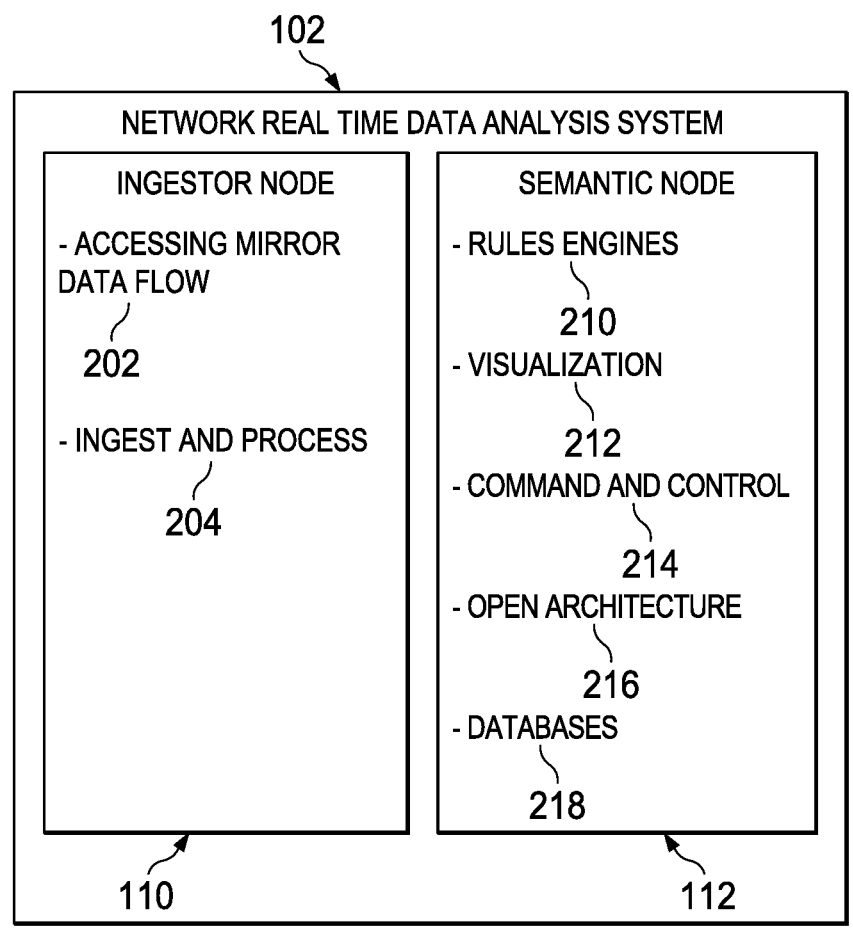
FIG. 2 is a functional block diagram of an ingestor node and a semantic node.

Referring now to FIG. 2, a more detailed illustration of the functioning of the system 102 is provided. The System 102 may include multiple ingestor nodes 110 that are each capable of providing a number of functionalities by way of accessing the mirrored data flow 202 provided by a targeted live-data source. Multiple ingestor nodes 110 are able to form a non-intrusive analytical grid with regard to the desired traffic flow to be analyzed. The ingestor node 110 is able to ingest and process mirrored network traffic 204 at network speeds. Each of the ingestor nodes 110 and semantic nodes 112 use in-memory database architectures, C++ programming language and commodity servers and operating systems.

The semantic node 112 provides rules engine functionalities 210, visualization functionality 212, and command and control framework 214 to provide for an application use case execution. The rules engine 210, visualization 212 and command and control 214 provide a manner for analyzing the received data according to a particular use case. Specific use cases are provided within this framework using an open application programming interface (API) application blade architecture 216 that enables a user to develop and add multiple application use cases to the System 102. The semantic node 112 can be expanded to incorporate SSD and hard drive databases 218 provided they are able to perform at the time-critical speeds of the live-data processing. In direct relation to an embedded use case, the semantic node 112 has the ability for internal contextual evolution of the application specific statistical models by way of contextual table update and dynamically allocated stored procedures. This provides a certain amount of internally biased (situational learning) based on the correctness of the recommended decisions and execution of each application use case. Multiple applications can coexist and be implemented within the same semantic node 112 and processed from the same live-data input.

Figure 3:
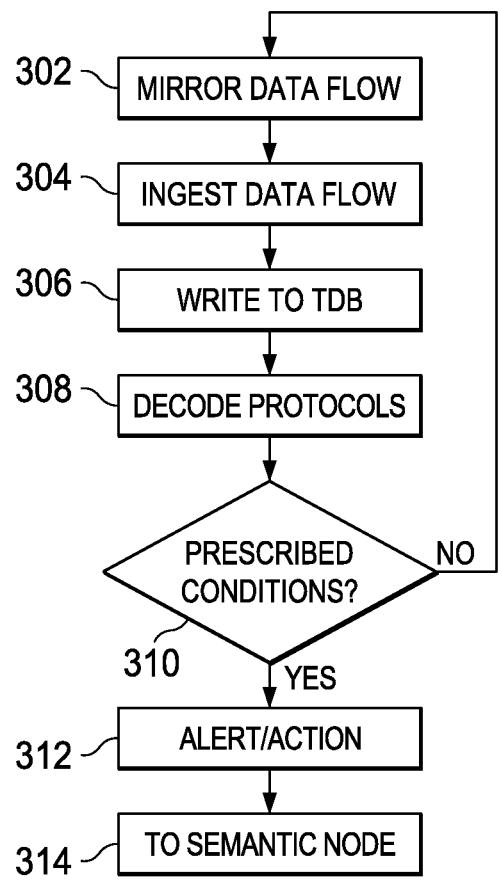
FIG. 3 is a flow diagram illustrating the process for monitoring of a network data stream.

Referring now to FIG. 3, there is a flow chart illustrating the operation of the system 102. The data flow is mirrored at step 302. Next at step 304, the ingestor node 110 ingests a mirrored copy of the network traffic provided by the live-data source. Using mobile network traffic as an example, the ingest VM 902 writes the network traffic into an allocated time dependent buffer (TDB) at step 306. The protocol decoder commences decoding at step 308 the contents of the TDB to find the protocol required. In the case of SS7 network traffic, there are many protocols. The decoder checks for these protocols, such as ISUP or TCAP/MAP protocols. If found, the decoder continues to decode, and retrieves any required information that may be present, such as a phone number. The process is granular in that it decodes small portions of the TDB rapidly to identify specific requirements before proceeding to decode the next set of requirements or the entire contents of the TDB. The decoded contents are passed to packet sniper for analysis in accord with a set of criteria for action at step 310.

If no prescribed conditions are detected, control passes back to step 302 and the process repeats. Once a particular prescribed condition is detected, the ingestor node 110 sends an alert to the semantic node 112 or undertakes a preset action at step 312. This action could be to send a prescribed alert to network elements to truncate or trap and redirect that particular network traffic to other systems, including the semantic node, for processing. Such processing may include change of content, copy of content or to create interdiction schemes for further network traffic of a like nature. All decoded network traffic is sent at step 314 to the semantic node 112 wherein such particular use case rules associated with any detected conditions is applied to the data.

Figure 4:
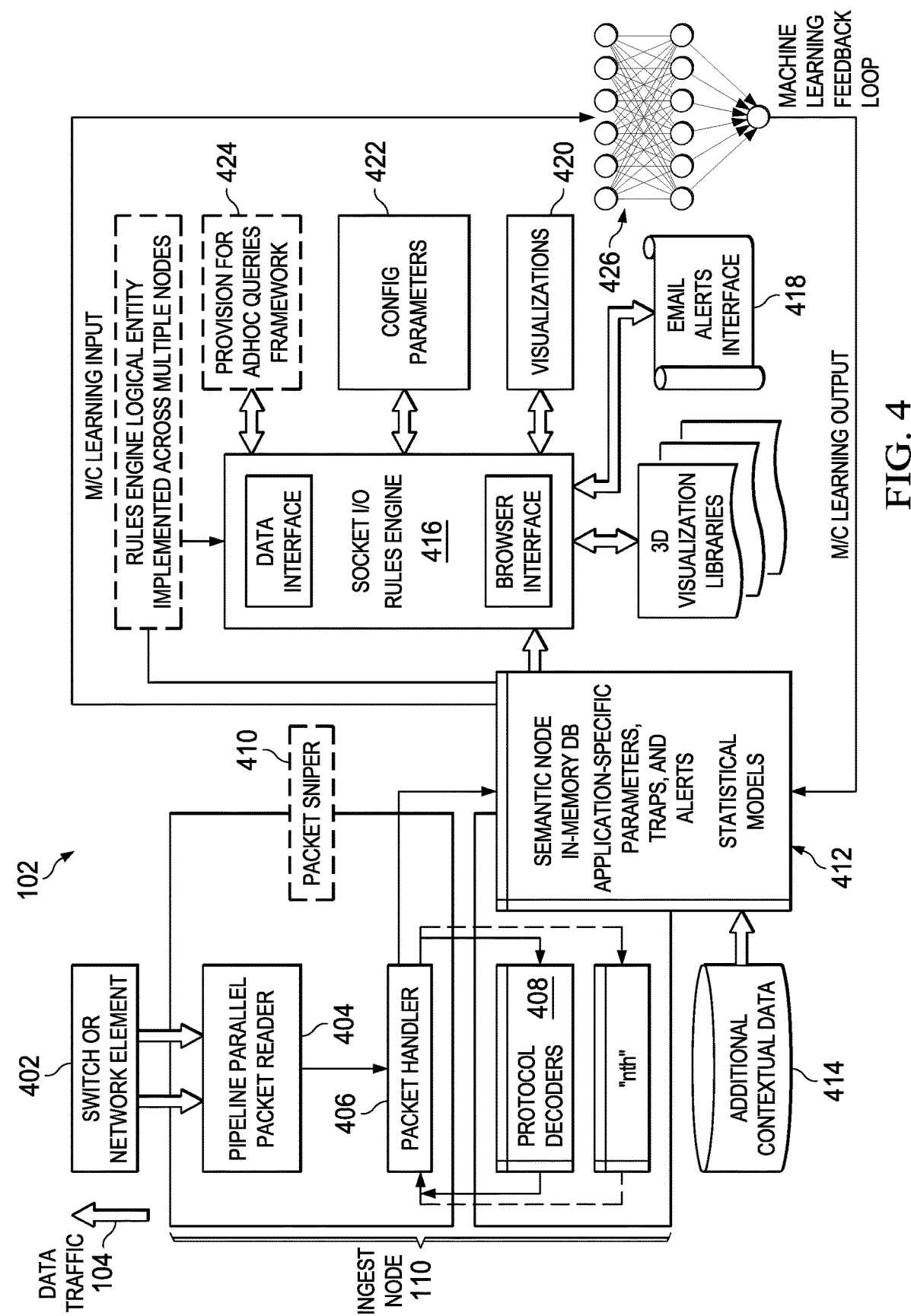
FIG. 4 is a system block diagram for a network live-data, real time data analysis system monitoring packet data transmissions.
Figure 5:
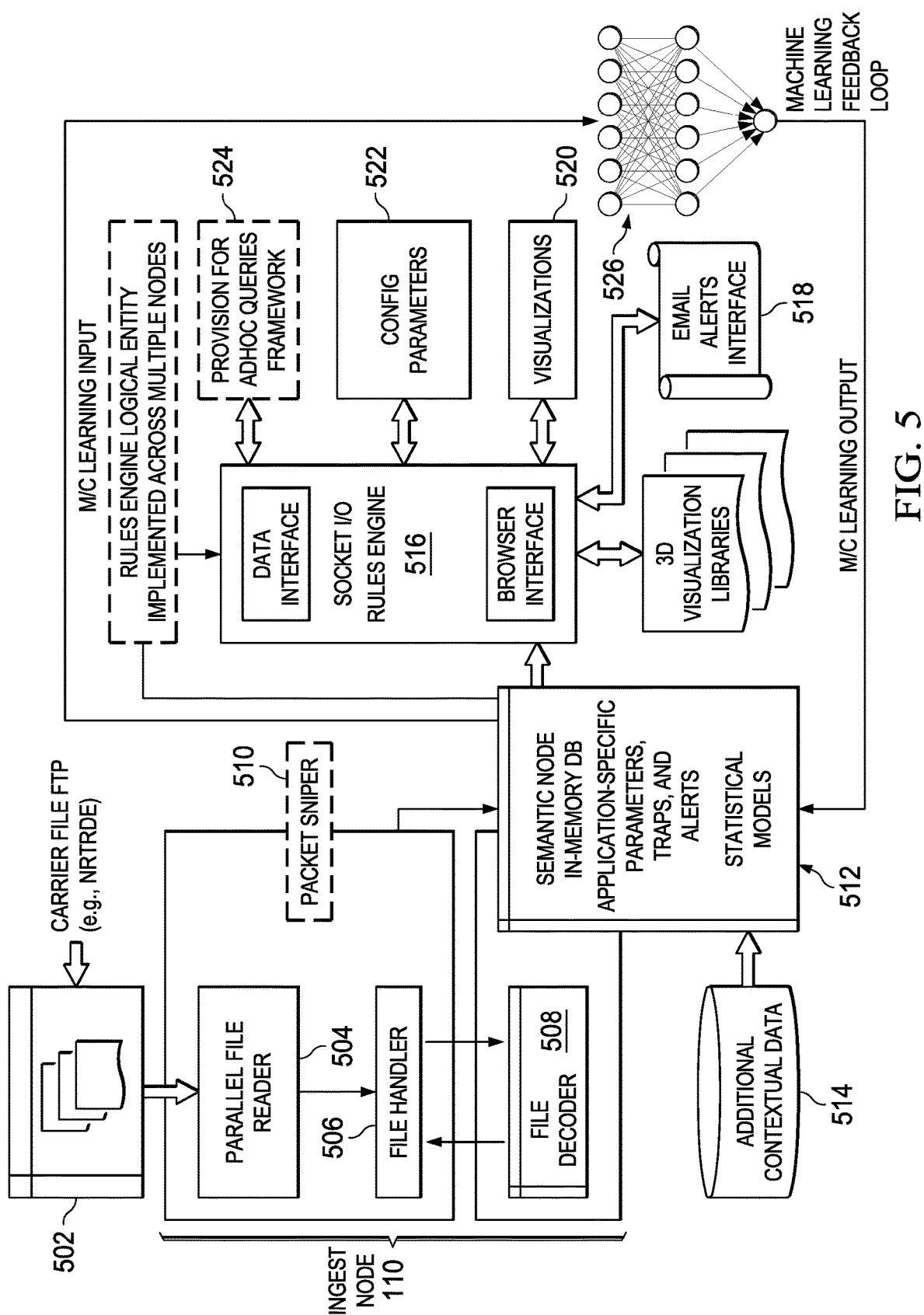
FIG. 5 is a system block diagram of a network live-data, real time data analysis system for monitoring FTP file data.

Referring now to FIGS. 4 and 5, there are illustrated block diagrams for implementation of the system with a network packet data configuration (FIG. 4) and a FTP file based data configuration (FIG. 5). The System 102 causes application driven relational language processing situational analysis, deduction and resulting actions to be not limited to events that have happened, but to bring such situational analysis, deduction and resulting actions into operational real-time unity at the time of, and concurrent with, their live transmission. The System 102 therefore enables understanding and calculation of relevant actions to be taken to better affect a desired outcome before closure of that opportunity by the network traffic exiting the network to become a post event log record or stored data center application event.

Referring now to FIG. 4, there is illustrated a system block architecture for the System 102 configured to monitor network traffic transmissions. The network traffic 104 passes through some type of switch, live-data source or other network element 402 that provides a port to mirror the data for ingestion. Within the ingestor node 110 a pipeline packet reader 404 ingests the mirrored network traffic 104 passing through the switch, live-data source or other network element 402 and reads all of the data passing therethrough. A packet handler 406 within the ingestor node 110 processes all of the packets and decodes the associated protocols of the packet using protocol decoders 408. A packet sniper 410 within the ingestor node 110 monitors for the occurrence of particular conditions or packet combinations as defined by the semantic node 112 use cases. The information monitored for by the packet sniper 410 is controlled by a semantic node and in-memory database 412 which provides application specific parameters, traps and alerts that are to be monitored for and provided by the semantic node 112.

This information may be monitored for using particular statistical models implemented within the semantic node and in-memory database 412 and may additionally use additional contextual data from outside databases 414. The information within the semantic node and in-memory database 412 controls the operation of a rules engine 416 that generates the appropriate responses to information detected by the packet sniper 410 and generates various responses thereto such as email alerts 418, visualization outputs 420, configuration parameters 422 and framework queries 424. Information within the semantic node and in-memory database 412 may also be updated through a machine learning feedback loop 426.

Referring now to FIG. 5, there is illustrated the architecture for the system 102 whereby a file server acts as a live-data source port mirror and transmits FTP files 502 to the ingestor node 110 for processing using a parallel file reader 504. The System provides a file handler 506 that processes the monitored files via a file decoder 508. The packet sniper 510 within the ingestor node 110 monitors for specific information and sends the file information to the semantic node 112 as per the System requirements.

In a method similar to that of the live-data network traffic ingest, the file-based information is also ingested, monitored and analyzed using particular statistical models implemented within the semantic node and in-memory database 512 and may additionally use contextual data from outside databases 514. The information within the semantic node and in-memory database 512 controls the operation of a rules engine 516 that generates the appropriate responses to information detected by the packet sniper 510 and generates various responses thereto such as email alerts 518, visualization outputs 520, configuration parameters 522 and framework queries 524. Information within the semantic node and in-memory database 512 may also be updated through a machine learning feedback loop 526.

The systems of FIGS. 4 and 5 provide the ability to bring application driven relational language processing situational analysis, deductions and resulting actions into operational real-time unity with network traffic while it is being transmitted within its associated network. Actions may then be taken on the Event to shape, truncate, alert or redirect before it exits the network and becomes a post Event fixed log, record or data center application event.

Figure 6A:
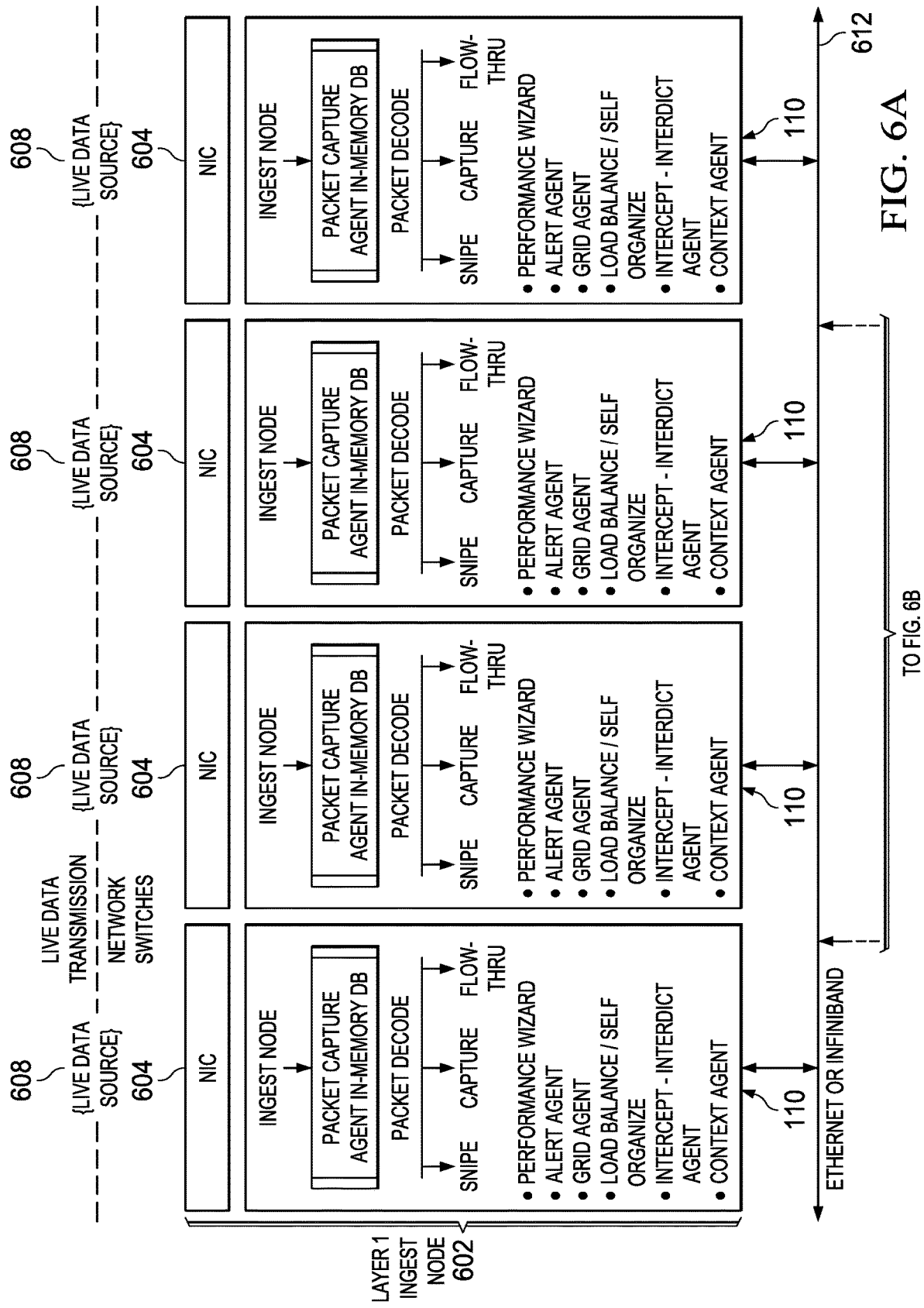
FIGS. 6A and 6B illustrate a function specific topology layered architecture of a network live-data, real time data analysis system.
Figure 6B:
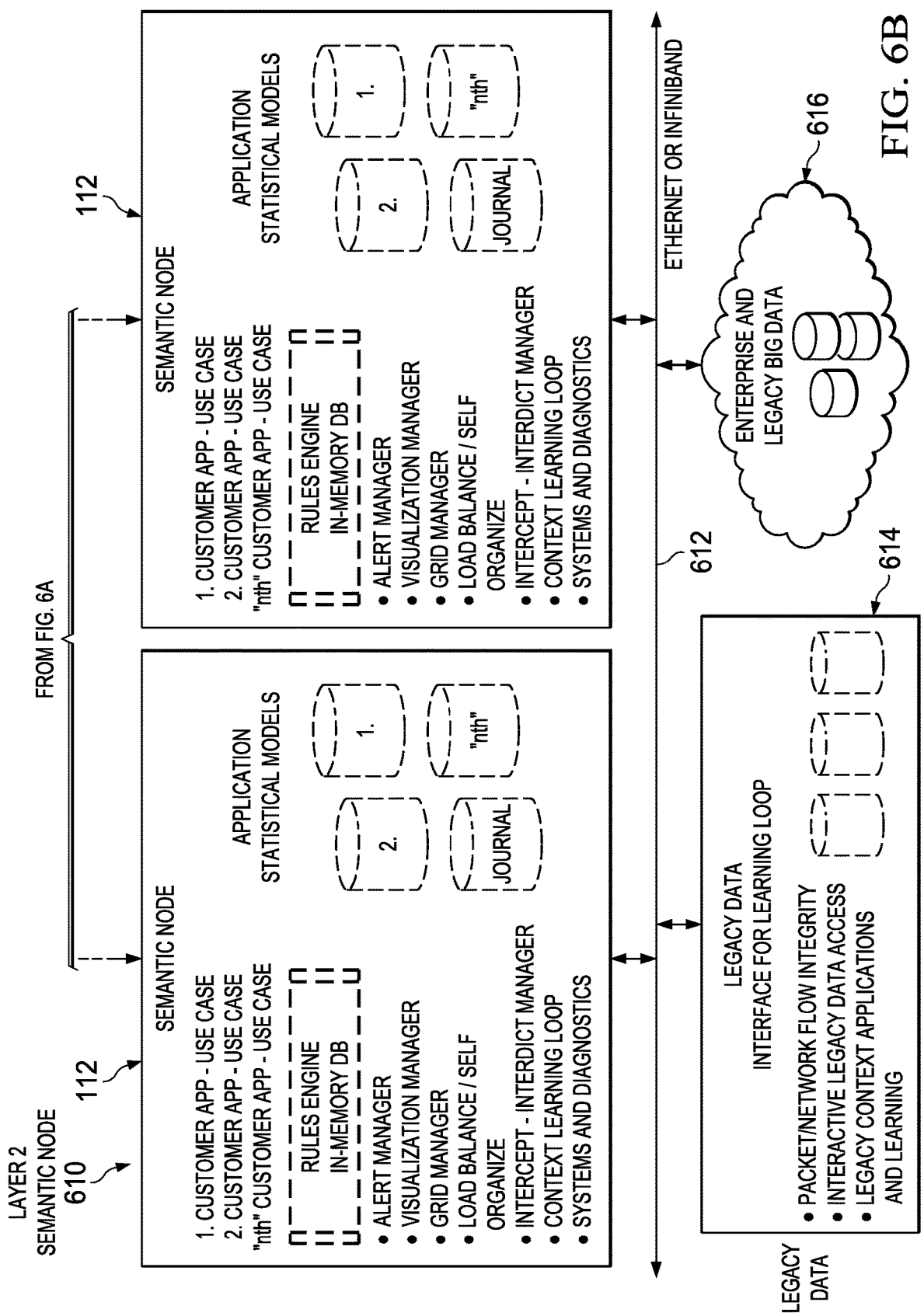

Referring now to FIGS. 6A and 6B, there is illustrated the configuration of the System 102 within a function-specific topology layered architecture. The first layer 602 comprises the ingestor node 110. Each of the ingestor nodes 110 are connected to a live-data source 606 through an associated port mirror or network interface controller ("port mirror") 604 that provides the ingestor nodes 110 access to mirrored network traffic. Each of the ingestor nodes 110 connects to a second layer 610, which provides the semantic node 112. The semantic node 112 interconnects with the ingestor node 110 via an Ethernet or Infiniband connection 612.

The semantic node 112 in layer 610 contains the application decision matrices, self-learning cognitive decision support, and action logic to enable execution of the desired use case outcome. Each semantic node 112 contains the use case or pattern recognition logic to identify with instances and situations that are of interest in accordance with their use case. The semantic node 112 provides a contextual learning loop through an independent process 614 connecting to legacy storage 616 and providing updates to the semantic node 112 in parallel to the system 102.

Figure 7A:
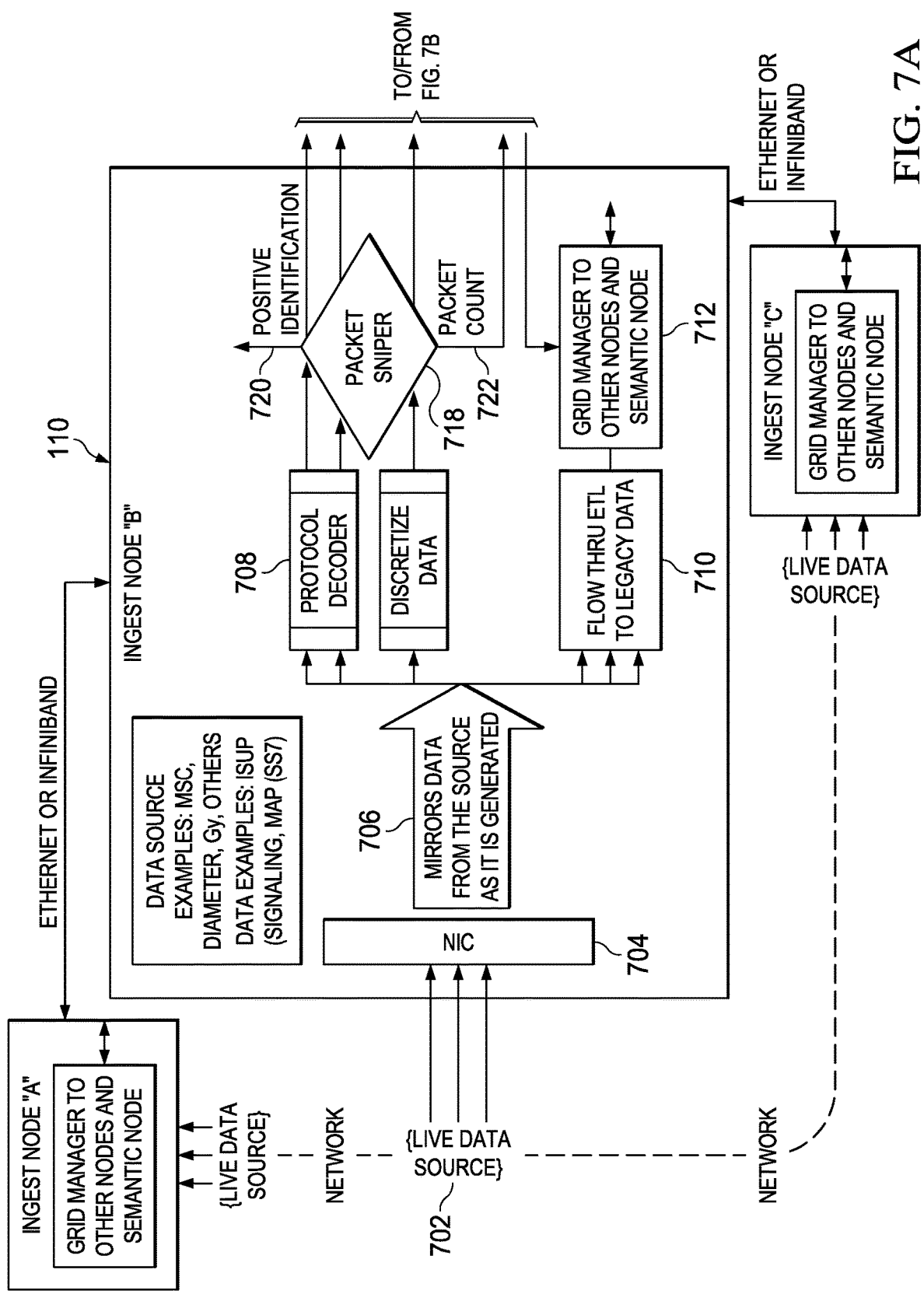
FIG. 7A is a functional diagram of the ingestor node
Figure 7B:
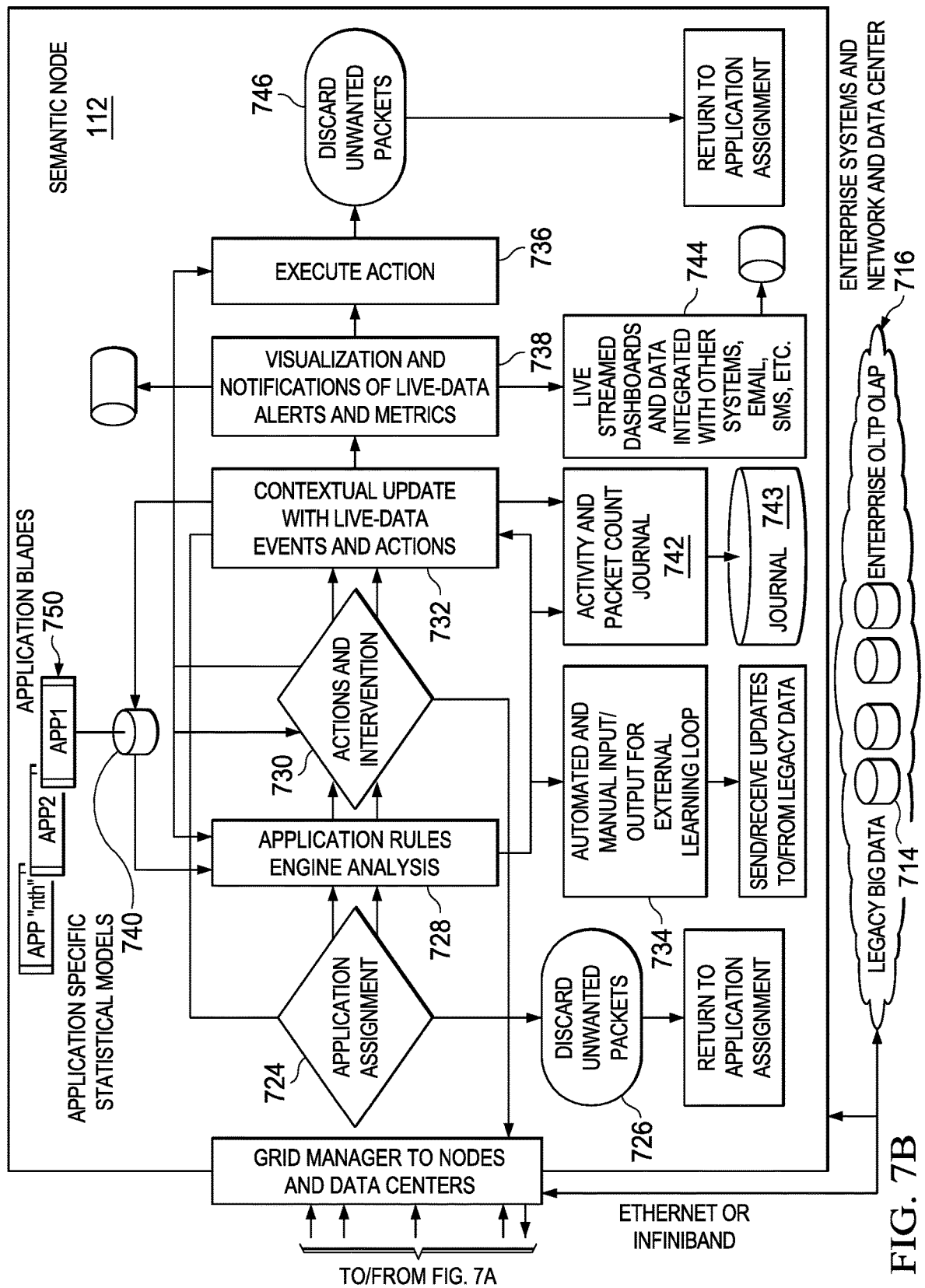
FIG. 7B is a function diagram of the semantic node.

Referring now to FIGS. 7A and 7B, there is illustrated a functional block diagram of the methodology used for nonintrusive live-data ingest at the ingestor node 110 to the application specific situational analysis performed at the semantic node 112. The process provides a relational processing language driven analysis for the stated applications to occur while the Event is still open by way of its transmission within the network, and thus provides the ability for real-time, dynamic relational processing language driven intercept, adjustment of content, prevention of action or interdiction to occur before the data exits the network and becomes a data center application event. This provides the opportunity to stop, shape, alter, copy, redirect or release the network activity while it is still in transit. The result is that the method allows for high data rate, high volume signaling data to be analyzed in real-time while it is still within the network so that certain enterprise policies, controls, predictive probability alerts, or other actions can be applied in real-time to the monitored data flow.

The live-data source provides network traffic (structured or unstructured) to the ingestor node 110 for decoding and identification. Upon ingestion by the ingestor node 110, the network traffic is sent to the protocol decoder 708 that decodes and identifies each wanted protocol packet and discretizes such wanted decoded network traffic as packets into a time dependent buffer ("TDB") as allocated by the time dependent buffer VM ("TDB VM") 908. The TDB VM 908 is a semaphore-based internal memory allocation manager for the ingestor node 110 that assists in the integrity of memory allocation and release to ensure that both locked and lockless operations can occur in parallel, in real-time as needed and without clash. This memory is allocated and distributed at arbitrary lengths, based on need (via a variable length bitmap). The address of each newly loaded TDB is passed to a process whereby prescribed or deduced events are looked for in packet sniper 718.

The packet sniper 718 compares the decoded data to certain conditions of interest as indicated by the prescribed rules provided by the semantic node 112 or by deduced conditions determined by the contextual data and feedback loop/learning loop undertaken by the semantic node 112. The packet sniper 718 provides positive indications 720 upon detection of these conditions. On completion of its search, each packet sniper 718 releases its previously allocated TDB to the ingestor node memory manager for use by other parallel current tasks or future operations that could be requested or introduced to the ingestor node 110. The TDB allows a no-lock, variable time latency multiprocessing of each packet by the ingestor node 110, and, the capability for locked operation in the eventuality of write functions being required to change the contents of packets. The packet sniper 718 further counts the number of packets that are received from the decoder 708 and provides this as a packet count indication 722. The packet count 722 is used to verify live event network traffic flow with post event network traffic records, providing a network transmission integrity check for network operations. The packets of interest detected by the packet sniper 718 are referenced against an action table by the ingestor node 110 and such prescribed action is executed. Network traffic of interest is flagged and sent to the semantic node 112 for application based processing. Selected or all network traffic flows to the application relevancy filter 724 within the semantic node 112; these are provided for longer term storage or transferred to legacy data or discard 726. Relevant network traffic is passed to the application rules engine 728 for further analysis to determine the actions required based upon the detected data.

The application rules engine 728 initiates particular actions and interventions 730 in accord with each application use case deduction and initiates the desired analytic outcome(s). The application rules engine 728 may also provide information to enable contextual updates with live-data events and actions at 732, in addition to the ability to enable manual input/output as part of the learning loop at step 734. The determined actions and interventions at 730 drive contextual updates with live-data events and actions that occur at 732. The actions and interventions 730 are used to execute particular actions at 736 or to provide information to the grid manager 712 within the ingestor node 110. The contextual update with live-data events and actions at 732 enable the creation of visualization and notifications of live-data alerts and other metrics to provide necessary notifications at step 738. The contextual update with live-data events and actions 732 also provides information for storage and application specific static and dynamic statistical model 740 and provides information to the activity and packet count journal 742. They also enable adjustment to the conditions, rules and actions which are passed back to ingestor node 110 and packet sniper 718 to provide dynamic and deducted additions to those prescribed by the use case. The visualization and notification of live-data alerts and other metrics execute an action at 736, or alternatively or additionally, enact live output to dashboards or data integration with other systems such as email, SMS, etc., at 744. After the executed actions at 736 are caused to occur, unwanted packets are discarded at 746. Information generated responsive to the activities are stored within the packet count journal 742.

Each use case provides the control information that controls the operation of its respective processes within the semantic node 112 and ingestor node 110. Each blade 750 may be associated with a particular use case such that a particular condition or operation may be monitored and detected by the ingestor node 110 and semantic node 112. Multiple blades 750 may be utilized such that different use cases may be implemented by the system 102 on the same network traffic 104 in parallel in a multithreaded fashion.

Referring now to FIG. 8, there is illustrated the topical data flow through the ingestor and semantic nodes. A packet source 802 is associated with a particular network traffic and may be read by a live-data source reader 804 within the ingestor node 110. Additionally, various files 806 may be read by a live-data source reader 808 configured for reading files. Reading data from 802 and 806 can be enacted simultaneously. The data read by the data source readers 804 and 808 are processed by data handlers 810 which utilize a number of data decoders 812 in order to decode data from the various data readers 804 and 808.

The data handler 810 generates various sources of semantic data 814. This data is provided to a semantic data writer 816 so that it may be written to a semantic data application program interface 818. The API 818 provides the data to the semantic node and in-memory database 820 that contains application specific parameters, traps and alerts that are generated responsive to various statistical models relating to received Events within the semantic node 112. Various alerts and reports are generated responsive to the semantic node and in-memory database 820 operations.

Referring now to FIG. 9A, there is more particularly illustrated a block diagram of the various virtual machine functions that make up the ingestor node 110. The primary functions of the ingestor node 110 are to attach the System to a live-data source for the purpose of receiving mirrored data from that source, then decoding and preprocessing before forwarding to the semantic node 112. The ingestor node 110 attaches to the live-data source through a live-data source port mirror or other non-intrusive method that enables access to data as a "parallel observe and duplicate" process and not by being a network element step of "pass through-stop-copy-forward". Each ingestor node 110 is able to directly communicate with its peer nodes in a grid, and with an assigned semantic node 112. The ingestor node 110 feeds information to its assigned semantic node 112 for use case application analysis and deduction. The ingestor node 110 provides peer-to-peer communications.

The ingestor node 110 consists of four agents able to operate independently and in parallel: 1) the ingest VM 902, 2) the governor VM 906, 3) the time dependent buffer (TDB) VM 908 and 4) the grid VM 910. The ingest VM 902 ingests the mirrored network traffic, undertakes protocol decoding, acquires a TDB, and discretizes and writes the required packetized data to the assigned TDB. The protocol decoder process within the ingest VM 902 uses an informational map that the ingestor node 110 uses for the dynamic allocation of threads and cores to decode one or potentially more protocol packets in parallel.

A network packet may contain multiple protocols. For example, an internet protocol (IP) packet may include web traffic (HTTP), mail (SMTP), internet phone (VOIP), file transfer (FTP) and network monitor (SNMP), amongst others. When the protocol decoder tells the ingestor node 110 to decode HTTPs, SMTP, FTP protocols, the protocol decoder collects information on both the sender and the target servers. The ingestor node 110 allocates three threads each operating on its assigned protocol and all three threads run in parallel to more readily operate on the packet. The design of the protocol decoder is lockless and a read-only operation. As an example, a decoded packet within a TDB VM 908 could be analyzed by three or more protocol decoders independently in parallel and with no fixed ordering. Thus, the HTTP decoder would perform a bit-comparison to determine if there were an HTTP page request within the packet, retrieve the target server name, and place the information within the semantic data queue. The SMTP decoder would perform a bit comparison to determine if there were an SMTP send mail within a packet, retrieve the mail server name and sender, and place the information within the semantic data queue. The FTP decoder would perform a bit comparison to determine if there were an SMTP PASV within the packet, retrieve the mail server name, and place the information within the semantic data queue. Each protocol decoder would independently release its use of its allocated TDB VM 908.

The ingest VM 902 also includes one or more packet sniper 718 process(es) for providing multi-threaded parallel comparisons for prescribed or deduced conditions. The packet sniper process also includes the information that the ingestor node 110 uses for allocation of threads and/or cores to analyze per data type along with where and/or how to generate alerts to the semantic node 112. Similar to the protocol decoders, multiple packet sniper processes can be enacted on any assigned TDB, each process releasing its interest in the TDB when finished. The conditions being sought by packet sniper processes are set up by the semantic node 112 or may optionally be established by direct input to the ingest VM 902. The ingest VM 902 is also able to simultaneously transmit selected or all data to the semantic node 112.

In one example, a decoded SS7 packet contains the phone number of a caller and the phone number of a call recipient. To address the requirement of alerting when caller (1234567890) makes calls to any number, and to alert when called number (1900PREMIUM) receives calls from any number, the packet sniper configuration tells the ingestor node 110 of these two separate operations with respect to an outgoing sniper and an incoming sniper. The ingestor node 110 allocates two packet snipers, each operating on its assigned task and within its own in-memory database or assigned TDB VM 908. Each thread runs in parallel and independently with no fixed ordering and will operate on a decoded packet. When the outgoing sniper matches the caller number to a caller blacklist in its in-memory database, an alert will be generated. Similarly, if the incoming sniper matches a called number to a called blacklist within its memory database, the packet sniper generates an alert. Packet sniper will independently release use of its TDB VM 908.

The governor VM 906 acts as a performance watchdog with the ability to organize core and/or memory availability of the ingest VM 902 responsive to its detected conditions. The dynamic allocation and release of multiple TDB VM 908 allows multiple functions of disparate timing to be scheduled by the ingest VM 902 so that optimum memory availability is provided to those functions. The TDB VM 908 provides the ingestor node 110 with the ability to use memory efficiently in concert with the speed of ingest and any disparate ingestor node 110 processing. The TDB VM 908 uses a combination of semaphores and arbitrary memory mapping dynamically responding to allocation of memory requests. The TDB VM 908 allows for the efficient use and tuning of memory based upon time required and size needed. Multiple ingestor node tasks and VMs are able to request workspace of varying need and time. TDB VM 908 flags the required memory blocks. These can be flagged as a lock or no lock status. The flagged memory can then be used in parallel by multiple tasks in read only mode, and dynamically locked if in write mode. Each task releases its need for the memory block on completion of its task. The final release will release that memory block back to the TDB VM 908 for further use. TDB VM 908 is able to allocate as a single block of memory non-contiguous blocks grouped as a virtual contiguous allocations of memory.

Figure 9B:
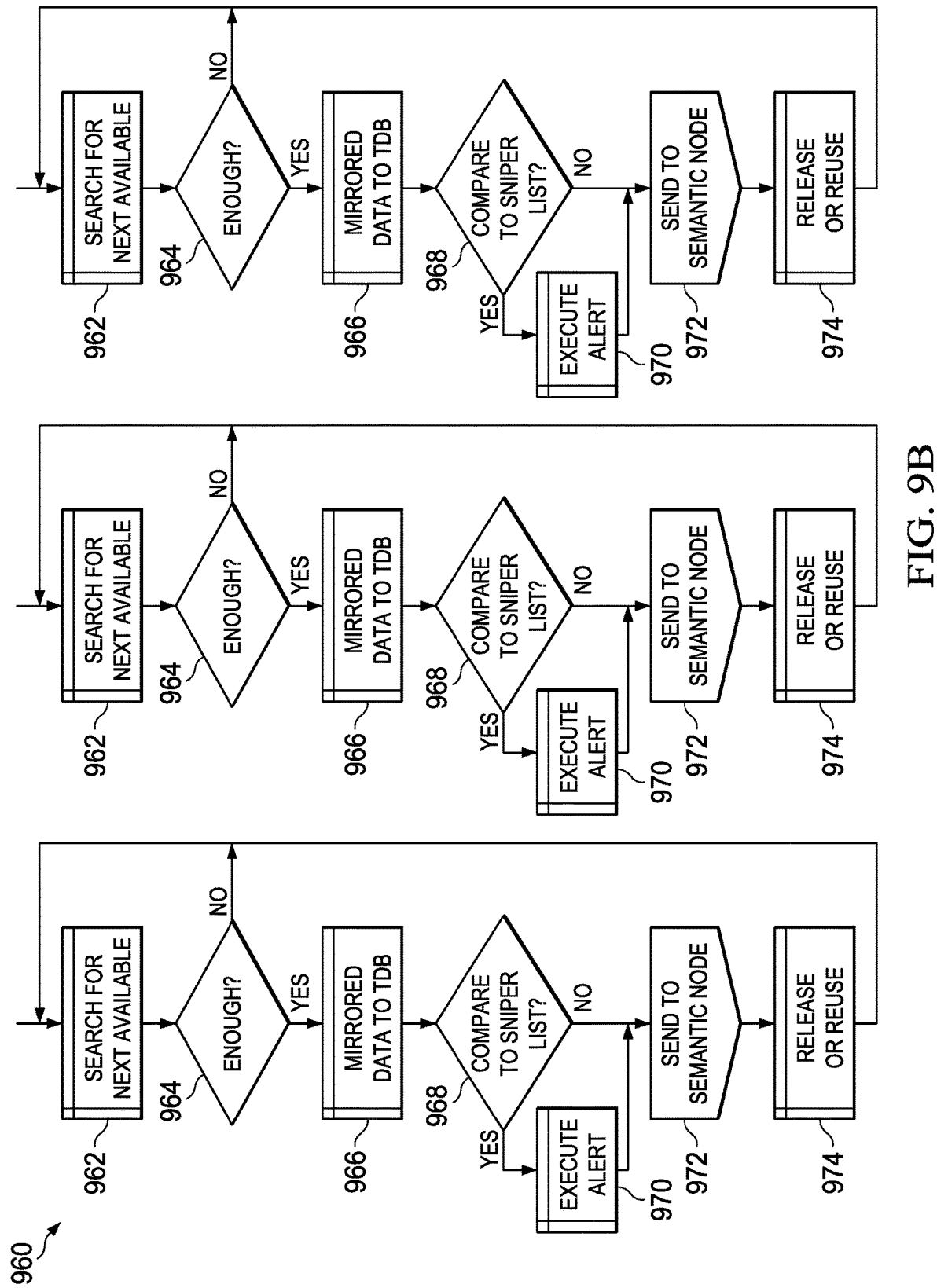
FIG. 9B is a flow diagram of simultaneous processing of data packets within an ingestor node.

This memory management is illustrated for three simultaneously operating processes in FIG. 9B. FIG. 9B illustrates four separate tasks 960 that are occurring in parallel within the same TDB as allocated by the TDB VM 908. The processes search for the next available data packet at step 962 for decoding. Step 964 checks if all packets have been received and if not, control passes back to step 962 to get the next packet for decoding. As packets are decoded and identified they are placed into requested TDBs. Control passes to step 966, and the addresses of buffered packets are passed to the packet sniper or other ingest VM 902 tasks. Packet sniper 718 analyzes the buffered data comparing it for triggers of interest to its sniper list at step 968 to determine if any relevant conditions are detected. If a trigger is detected, an alert is executed at step 970 and in parallel any recorded action beyond a trigger is also executed. If no trigger is detected at inquiry step 968 or following an alert or action executed at step 970, the contents of the data packets are forwarded on to the semantic node 112 at step 972 and that interest in that TDB memory is released by packet sniper back to TDB VM 908 at step 974. An action at step 970 could be to change the contents of that packet content, or to alert a network operations center to truncate the transmission of that Event, or to trigger other events that may or may not activate intercept or interdiction processes. As can be seen, the same data packets can be monitored in three separate use cases 960 that are each monitoring for different types of information in the same manner. Governor VM 906 monitors the timeliness of disparate use cases as to their use of the same memory buffer for different purposes in relationship to the overall memory available for allocation by the TDB VM 908.

Figure 10A:
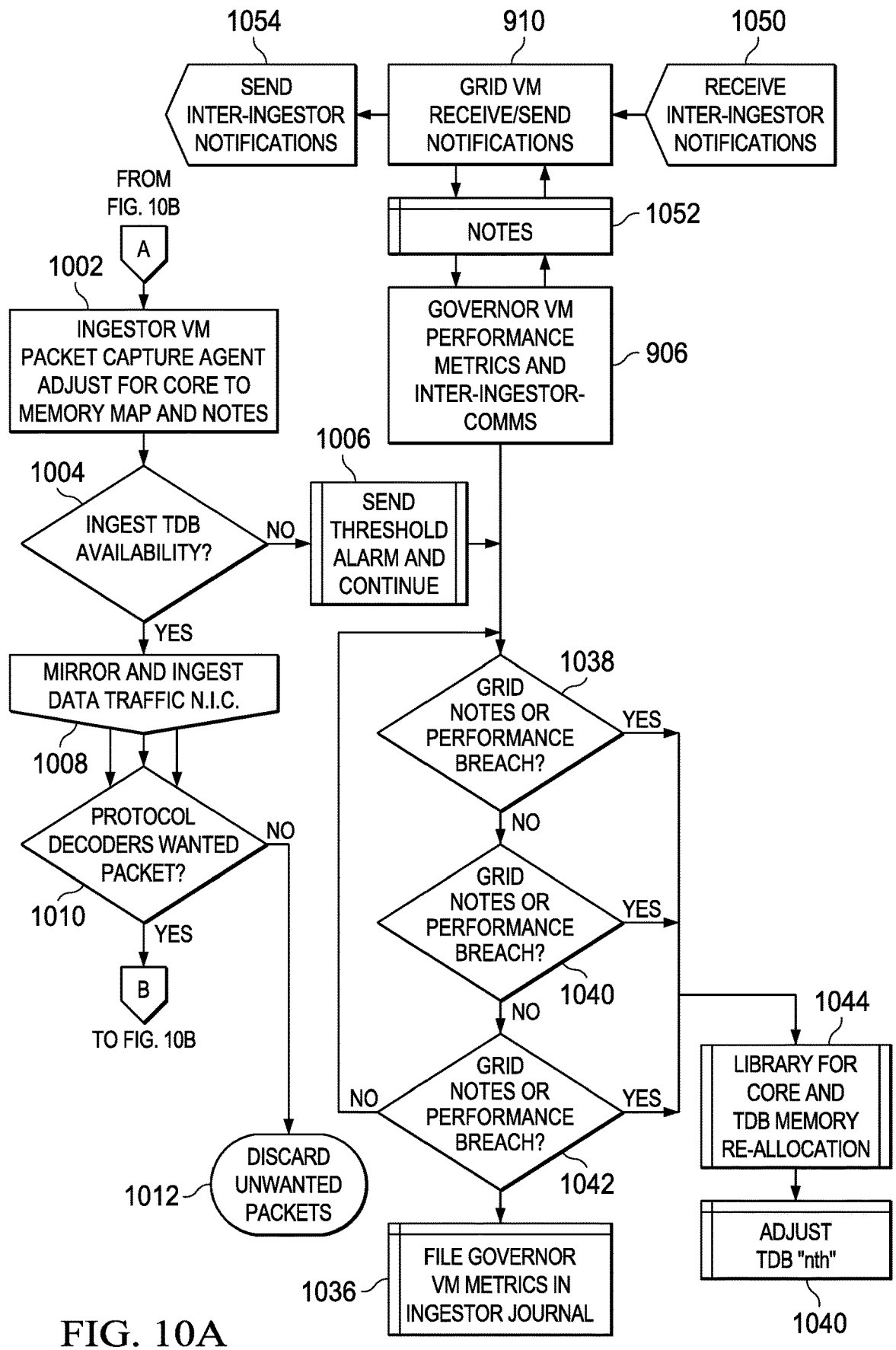
FIGS. 10A and 10B illustrate the process flow of an ingestor node.
Figure 10B:
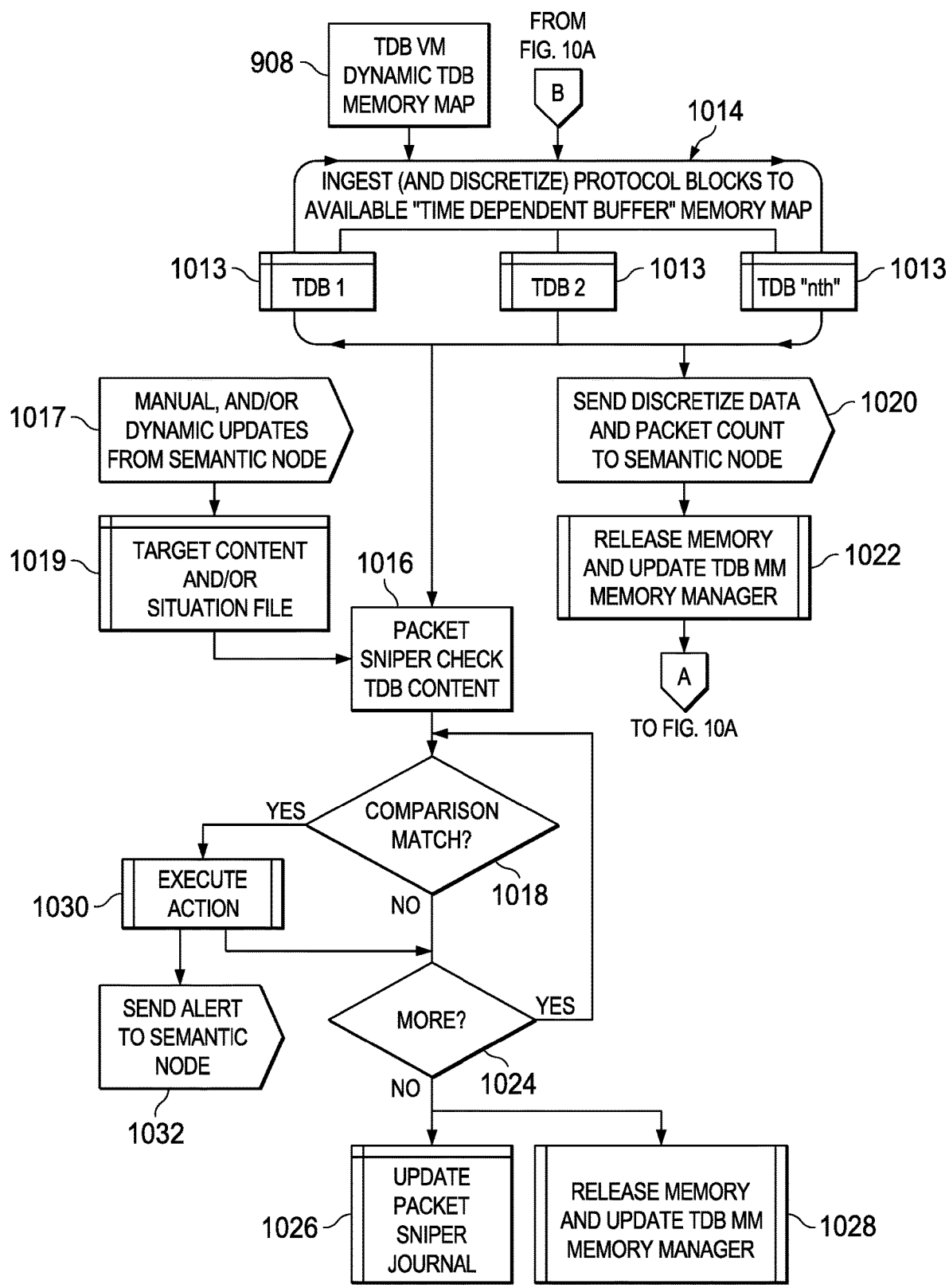

Referring now to FIGS. 10A and 10B, there is illustrated the process flow of an ingestor node 110 with respect to each of the virtual machines described herein above. The ingest VM 902 uses a packet capture agent at 1002 to allocate available cores and request allocation of TDB 1013 from the TDB VM 908. If a TDB 1013 is not available, the threshold alarm is generated at step 1006. If a TDB 1013 is available, the mirror of the network traffic is copied and processed at 1008. Protocol decoders at 1010 ingest the mirrored packets to determine if the packets are wanted. Unwanted packets are discarded at step 1012.

Thus, from the port mirror the network traffic can be copied (in parallel to its transmission) into one or more of the allocated TDBs 1013 and made available to one or more of assigned scheduled cores of the ingest VM 902 and, by using variable bitmap searching, the required protocols are decoded and recognized, or the required patterns are recognized at step 1010. The address of TDBs 1013 containing wanted protocols/packets/patterns are passed to packet sniper 1016 and other such tasks for further processing or inspection. The TDB VM 908 process monitors the availability of memory blocks and presents the available status to the ingest VM 902. The ingest VM 902 schedules the sending of the ingested data to the semantic node 112 in parallel scheduling routines through the packet sniper 1016 that compares data for preselected alerts or actions at inquiry step 1018. Once a TDB 1013 is fully released and its contents transmitted at step 1020 to the semantic node 112, the now available TDB addresses are returned at step 1022 to the TDB VM 908 memory map as being available. Control will then pass back to step 1002.

If the packet sniper 1016 does not detect a comparison match at inquiry step 1018, control passes to step 1024 to determine if different content exists. If so, additional comparisons are performed at step 1018. If no further comparison data is available, control passes to steps 1026 and 1028 wherein the packet sniper journal is updated at step 1026, and the memory associated with the compared data is released and the TDB VM 908 memory map updated at step 1028. The TDB VM 908 does not clear buffers for use until every task has issued a clear status on that TDB 1013.

Packet sniper 1016 is engaged when each ingest VM 902 has completed its loading of live-data from the allocating core. The packet sniper 1016 is responsive to dynamic or deduced updates received from the semantic node at 1017. This update information 1017 enables the packet sniper 1016 to target particular content and/or situations. This information is stored within a target content and/or situation file 1019 that controls the operation of the packet sniper 1016. Packet sniper 1016 analyses the contents of the TDB 1013 for content or conditions that have already been determined as being of interest at inquiry step 1018, as well as updated deduced conditions from step 1019. If found, packet sniper 1016 performs predetermined action triggers at 1030 that can either execute within the ingestor node 110 or defer to the semantic node 112. If inquiry step 1018 determines that a match does exist, the action associated with the match is executed at step 1030 and an alert is generated to the semantic node 112 at step 1032. Packet sniper 1016 will then continue its searches at step 1024.

The role of the governor VM 906 is to monitor and maintain the preset performance levels of core usage and memory space available to all virtual machines and tasks within their host ingestor node 110. Assigned cores that operate at a higher percent busy value or excessive memory usage cause an alarm to be sent to the semantic node 112 for diagnostic records and alerts.

The governor VM 906 measures the time periods of the ingestor node 110. This comprises measuring the time taken for the TDB VM 908, the packet sniper(s) and other tasks to complete their operations, and additionally, ensuring that memory usage is not growing beyond a certain threshold. The governor VM 906 operates in parallel to all of the other virtual machines in the ingestor node 110 and engages dynamic performance balancing of available cores and memory should processes start to encroach on preset or dynamically set hurdles. The performance gathering data of the governor VM 906 is logged and sent at regular intervals to the semantic node 112 for journal entry at 1036. The governor VM 906 also acts as the entry point for executing messaging from the grid VM 910 and command and control functions from the assigned semantic node 112. The governor VM 906 determines at inquiry steps 1038-1042 whether there has been a grid VM 910 condition set or an internal performance breach. When a grid VM 910 condition or performance breach is detected, the governor VM 906 undertakes reallocation of priorities and resources as provided by the resident operating system and utilities at step 1044 and at step 1046. Governor VM 906 undertakes similar actions when receiving command, control, update, or diagnostic instructions by the assigned semantic node 112.

As a result of a threshold alarm, the governor VM 906 commences working with the operating system and TDB VM 908 to reassign other cores and memory of a lower priority and to allocate the newly-available resources to assist in reducing the workload of other cores. Thus, in a situation where cores running ingest or decode or packet sniper tasks approached a set threshold level of, for example, 70% and, or, the amount of available memory for allocation to those tasks in the TDB 1013 also reached a threshold level of, for example, not less than 20%, the governor VM 906 would a) attempt to reassign or cease lower priority work, b) attempt to increase available memory in the TDB 1013, and c) inform the assigned semantic node 112 of the condition.

The role of the grid VM 910 is to manage for its host ingestor node 110 the intercommunications between peer ingestor nodes 110, and thereby the intercommunications between multiple semantic nodes 112. Based on use case performance requirements it is possible to configure any number of ingestor nodes 110 and semantic nodes 112 into an analytical grid architecture. Thus, the grid VM 910 receives inter-ingestor node notification at 1050 and makes notes of these indications at 1052. The grid VM 910 is also able to send notifications to other ingestor nodes 110 at 1054. The data within the grid VM 910 is referred to as map of operations and contains a role both within the grid and within the node. The grid VM 910 enables notification of dynamic conditions and required action among various ingestor nodes 110 within a set of Systems 102.

Figure 11:
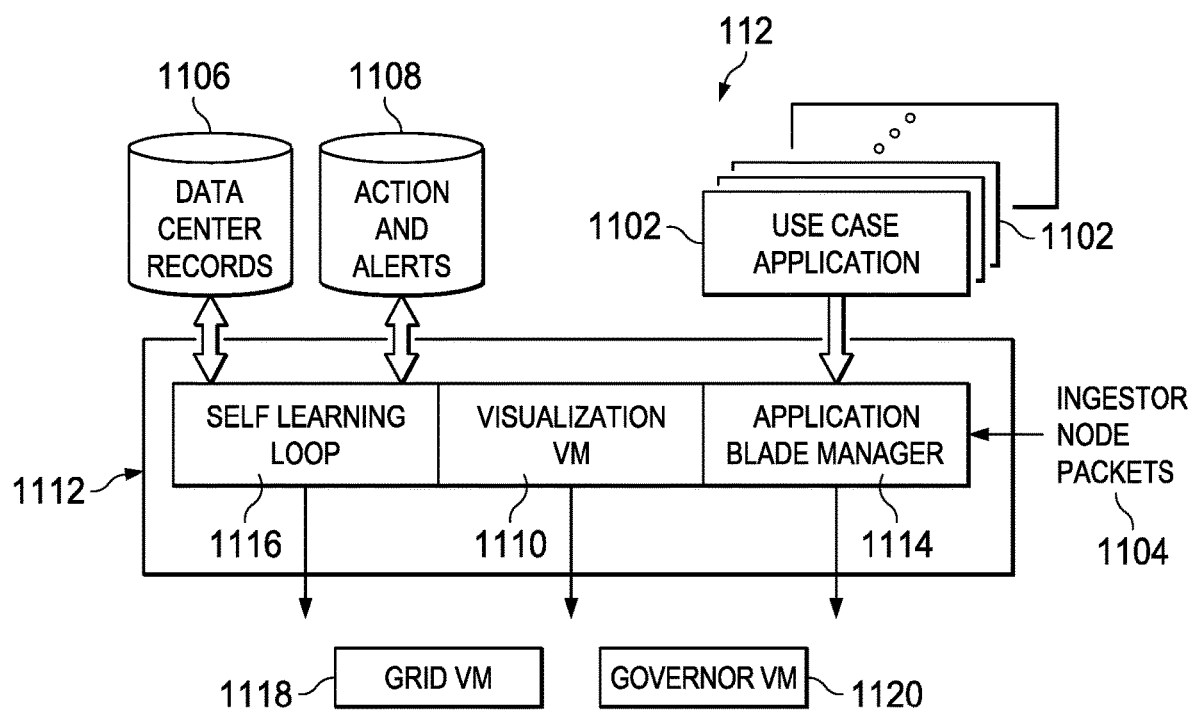
FIG. 11 illustrates a block diagram of a semantic node.

Referring now to FIG. 11, there is more particularly illustrated the semantic node 112. The semantic node 112 provides a use case application environment for time-critical situational analysis, contextual deduction, decision support and follow up action as dictated by the use case applications 1102 defined within that semantic node 112, working within a required window of time set by the application in regard to any desired result remaining relevant to its opportunity to effect change or alert. The semantic node 112 is able to inform other network elements or outside data processing environments of conditions within the System and additionally request or send determined intercept or interdiction commands that are in accord with the application.

The semantic node 112 provides a framework for time-critical situational analysis, decision support deduction and action processing of multiple use applications 1102 with regard to the live-data packets 1104 sent by the ingestor node 110. In some cases this may require the use case application to access various other data such as legacy data center records 1106 or to send alerts or to seek action that may require the servicing of the use case application's needs to include non live-data access to data storage outside the System 102.

The decision accuracy and situational relevancy of semantic node 112 is continually updated through the recording of actions and alerts within the action and alerts database 1108. The actions and alerts are deemed to be correct/non-correct through programmatic access to data center records 1106 and the subsequent reformulation of statistical subject matter used in decision support situational analysis. The semantic node 112 consists of three processes that operate dynamically and independently to form the rules engine 1112. These include the application blade manager 1114, visualization VM 1110 and self-learning loop 1116. A semantic node 112 further includes two virtual machines (agents) including a grid VM 1118 and governor VM 1120. The grid VM 1118 and governor VM 1120 operate in the same fashion discussed herein above with respect to the ingestor node 110 and provide the same functionalities. Queries to the semantic node 112 can be dynamically and programmatically executed responsive to use case application 1102 control or may also be learned through matrices input and defined or external machine (big data) input, including statistical models and pattern recognition.

The visualization VM 1110 provides the framework to drive dashboards (visual analysis tool or data presentation media) reporting in real-time to the activities being undertaken or their results, and provides an operational command and control entry point to the System 102.

Figure 12:
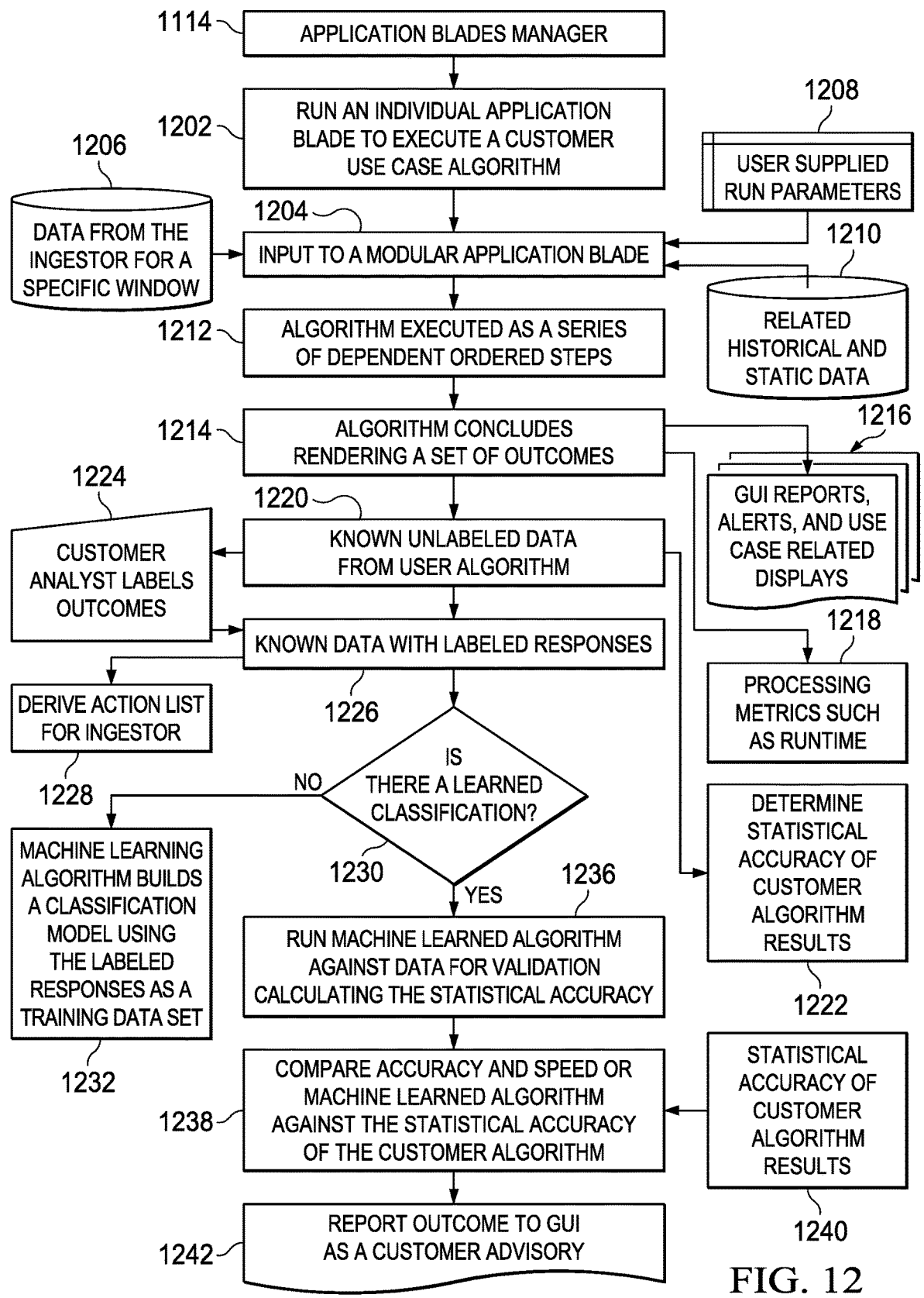
FIG. 12 illustrates the operation of an application blade manager.

Referring now to FIG. 12, there is illustrated a manner of operation of an application blade manager 1114. The application blade manager 1114 is responsible for managing and providing control based upon the various use case applications 1102 defined in use case application blades within the semantic node 112. The application blade manager 1114 runs at 1202 an individual application blade associated with a use case application 1102 to execute the customer use case algorithm. Input to the modular application blade is received from the process at step 1202 from data provided from the ingestor node 110 for a specific window 1206, from user supplied run parameters 1208 and from related historical and static data 1210. Each of these is received as input to the modular application blade at step 1204. Next, at step 1212, the use case algorithm is executed as a series of dependent ordered steps using the provided data. The algorithm concludes at step 1214 rendering a set of outcomes. These outcomes may be used to provide GUI reports, alerts and use case related displays on a dashboard as indicated at 1216. Additionally, the outcomes may be used to provide processing metrics at run time at 1218. Finally, the outcomes may provide at 1220 known, unlabeled data from the user algorithm.

This known unlabeled data may be used to determine the statistical accuracy of customer algorithm results at step 1222 or provide customer analyst label outcomes at step 1224. The customer analyst label outcomes may provide known data with labeled responses at step 1226 which may be used to derive an action list for the ingestor node 110 at step 1228. Inquiry step 1230 determines if there is a learned classification algorithm based upon the labeled responses. If not, the machine learning algorithm builds a classification model using the labeled responses as a training data set at step 1232. If so, the machine-learned algorithm is run against data for validation to calculate the statistical accuracy at step 1236. At step 1238, a comparison of the accuracy and speed of the machine learned algorithm against the statistical accuracy of the customer algorithm may be based upon the result from step 1236, and the statistical accuracy of customer algorithm results at step 1240. All this information is used to generate a report outcome to the graphical user interface as a customer inquiry at step 1242. Additionally, this outcome is used to calculate the deduced conditions which are provided back to the ingestor node 110 and packet sniper 1016.

Figure 13:
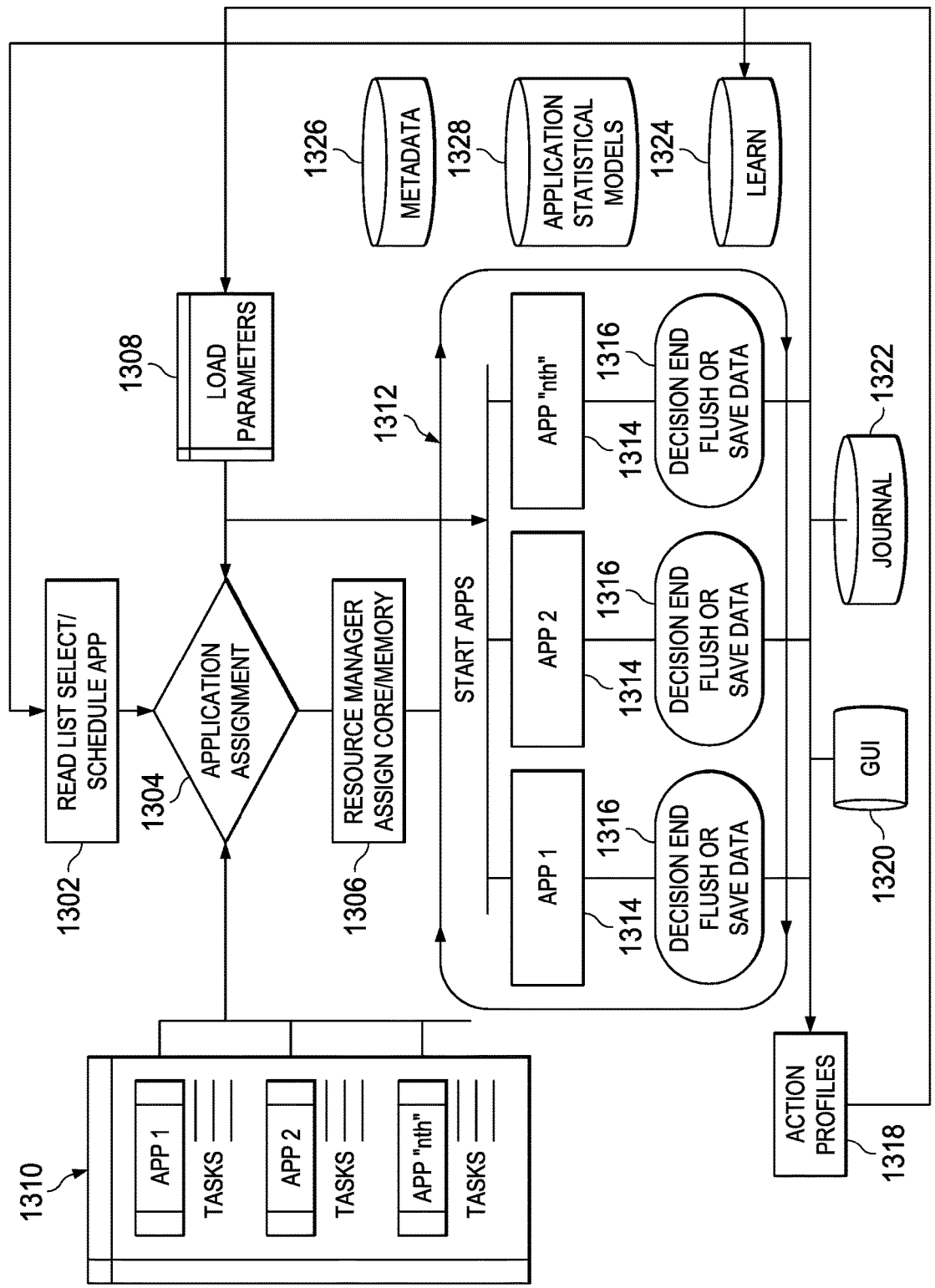
FIG. 13 illustrates the operation of a semantic node user application blade.

Referring now to FIG. 13, there is provided an illustration of the operation of a semantic node 112 user application blade. A particular application blade is selected at step 1302, and the associated information related to the blade is read. Next, at inquiry step 1304, the applications assigned to the use case application are determined. The assigned application information is forwarded to the resource manager 1306 to assign the core/memory requirements necessary for executing the application. The application assignments are based upon load parameters 1308 that are provided to the application assignment process 1304 and selected from the number of available applications 1310 that may be utilized. Each application 1310 has various operational tasks associated therewith. The resource manager 1306 will start the selected applications at 1312. The started applications may comprise any number of applications 1314 and execution of the applications will generate a decision to either flush or save data that is being analyzed by the use case application at 1316. These decisions to flush or save data are provided to action profiles 1318 that identify particular actions to be taken depending upon the decisions made by the applications 1314. Additionally, the decisions 1316 may be provided to a graphical user interface 1320 for display of information in the form of alerts or other dashboard activities or the information may be stored within a journal 1322 for later or further analysis. The action profile information 1318 may be forwarded to the load parameters block 1308 for further action or stored within a learning database 1324. The various applications 1314 that are implemented may utilize information from existing databases such as metadata 1326, applications statistical model 1328 or the learning database 1324.

The system described herein above with respect to FIGS. 1-13 may be implemented in a number of manners in order to provide real-time monitoring of live-data flowing through such associated live-data sources and other network elements. Various applications in which the methodology may be utilized include business assurance applications, customer experience applications, network operations applications and network security applications. Various business assurance applications include ways for monitoring and confirming that a business model implemented by a system is operating in a known and desired manner. These applications include international roaming fraud, Wangiri inbound calls/text messages (SMS), international revenue share (country or number callout) fraud, SMS fraud, SMS spam whitelisting, SLA (service level agreement) verification, shared services fraud management monitoring, shared services fraud threat aggregation and alerting, M2M (mobile to mobile) usage fraud monitoring, SIM (subscriber identification module) cloning, interconnect bypass (SIM box) usage fraud, phishing/farming, stolen device/IMEI (international mobile equipment identity) hotlist, femto cell fraud detection, subscriber fraud detection, mobile payment system monitoring, content distribution SLA monitoring, network event verification for revenue assurance, real-time margin calculations for subscriber profitability, interconnect charges verification, PBX/corporate account hacking, mobile banking/2-Factor authentication fraud detection, mobile churn protection/head-off.

This methodology may also be utilized in a number of applications for controlling and managing customer experience. These include things such as bill shock management, social network analysis for churn avoidance, identification of non-optimal network conditions and immediately notifying or offloading subscribers for amelioration, high-value subscribers and the provision of granularized service to them for things such as dropped calls, wireless offloading for congestion, dynamic notifications for network outages, All-You-Can-App (customized tariff plans based on personalized application usage), and social network analysis for individualized experiences.

With respect to network operations applications, the system methodology can provide an intelligent network planning to prioritize/plan/optimize investments ahead of a demand curve, provide subscriber-centric wireless offload based on contextual intelligence, provide congestion control at the granular level, provide core instrumentation and alerting, provide traffic management, provide instrumentation for circuit measurements, detect silent/dropped calls, calculate answer ratios, real-time control and alerts and to provide for data session quality-of-service monitoring and control. In one example, the System 102 receives outage plans for cell towers and commences monitoring in conjunction with a live-data source the presence, movement and activities of such mobile devices or devices within that nominated cell tower transmission area. A file is built in real-time to that monitoring and a usage map is dynamically built. The map is used to selectively alert through SMS, email, or other such contact methods such dynamic situations or planned outages creating a just in time dynamic alert system based in real time to the live-data deductions.

Finally, with respect to network security applications, the system methodology enables analysis of live-data network traffic for the purpose of identifying malicious content or agents as they enter the network at any determined location or between two or more points, in applications, packets, on devices or network elements. This identification and detection in concert with the packet sniper capabilities of automated alert and prescribed or dynamic/deduced actions can isolate, trap, or reject the passage of such threats from further movement through or into the network (or out of the network into further onwards data centers or enterprise systems). While each of these various applications of the described methodology are only examples thereof, it would be appreciated by one skilled in the art that various other implementations of the methodology in accordance with the general process described herein may also be implemented.

Figure 14:
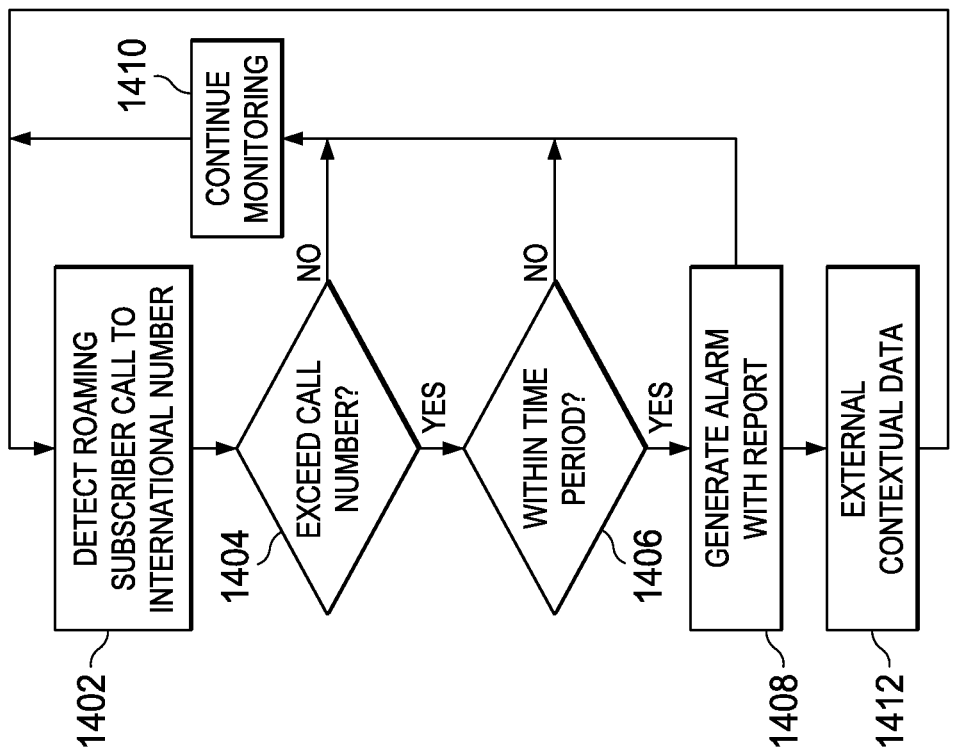
FIG. 14 is a flow diagram illustrating detection of international roaming fraud using a network live-data, real time data analysis system.

Referring now to FIG. 14-24, there are more particularly described implementations of various applications utilizing the methodology described herein with respect to FIGS. 1-13. FIG. 14 is a flow diagram relating to a use of the system 102 for detection of international roaming fraud. Perpetrators of international roaming fraud make international calls on stolen or purchased SIM cards with no intention of paying the roaming charges. Perpetrators steal SIM cards and make international calls or calls to premium numbers, leaving a large unpaid bill. In other occurrences, perpetrators purchase large blocks of SIM cards from the carrier country, roam out of country, and use the cards to call their own premium numbers, profiting off the calls and leaving the roaming charges to be absorbed by the carrier. The present methodology would make use of the roaming data files provided by the roaming data file syndicator. This data may be used to detect patterns indicative of roaming fraud.

The System 102 can detect the number of outgoing calls from a single roaming subscriber to one or more international numbers at step 1402. Next, a determination is made at inquiry step 1404 as to whether the number of outgoing calls from a single roaming subscriber to one or more international numbers has exceeded a user configurable threshold and, if so, whether this has occurred within a user configurable period of time at inquiry step 1406. If the number of outgoing calls has exceeded the threshold within the configured time period, alarms with associated reports may be generated at step 1408. The alarm may be used to indicate to the network provider that an outgoing call threshold from the specified roaming subscriber number has been exceeded and further scrutiny is necessary. A drill down report generated along with the alarm is made available for the network provider that will list the international numbers that are being called. If inquiry steps 1404 and 1406 determine that the configurable call numbers or time periods have not been exceeded, control passes back to step 1410 to continue monitoring the roaming data at step 1402. Outcomes from 1408 are integrated with external contextual data at 1412, and this information is utilized by the semantic node 112 to calculate dynamic changes to any parameters relevant to the use case.

Figure 15:
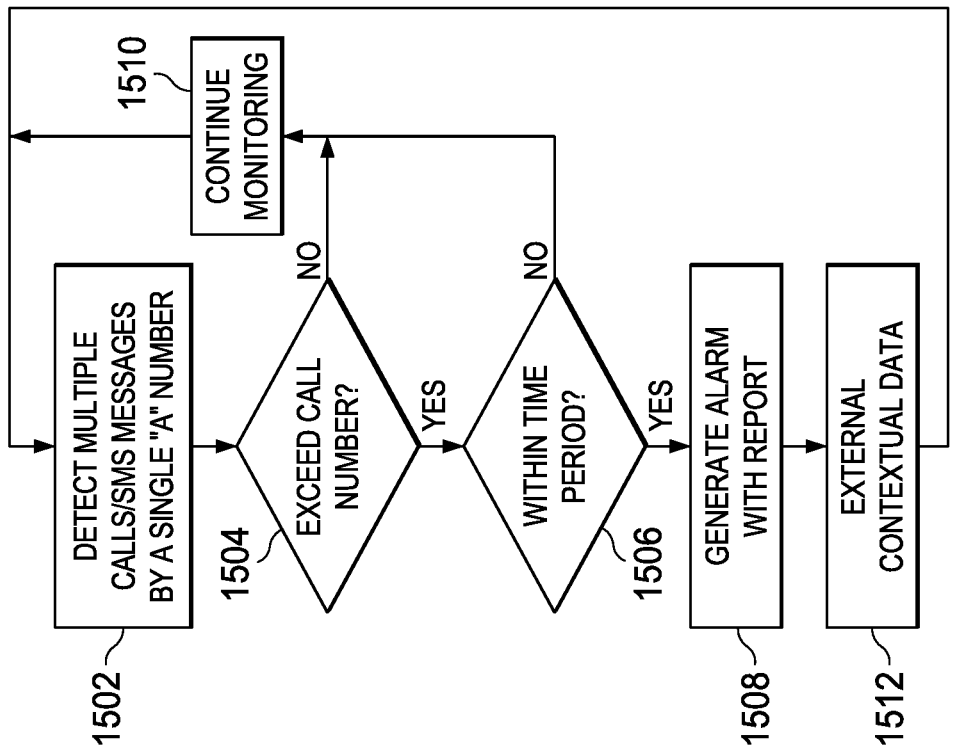
FIG. 15 is a flow diagram illustrating the detection of Wangiri fraud using a network live-data, real time data monitoring system.

Referring now to FIG. 15, there is illustrated a manner in which the methodology may be used for detecting Wangiri fraud. Owners of premium numbers may drive traffic to their numbers by calling unsuspecting subscribers or sending them SMS messages to lure or trick them into calling the premium number. This is referred to as Wangiri fraud and frequently occurs over the weekend (between Friday evening and Monday morning) or during holidays when there are fewer people staffing the carrier network and thus making it less likely they will notice traffic spikes indicating possible fraud. Subscribers will receive inbound calls from what may, at first glance, appear to be a local number. In some cases, the calls are brief and the recipient hears a baby crying or a woman screaming. After the call is disconnected, the subscriber will call back out of concern. In other cases, recipients may have missed the call during the night and will return it in the morning under the presumption that the call must have been important. In another variant, subscribers will receive an SMS message informing them that they have won a prize or have a gift to be delivered and they must call a number to arrange delivery. The customer calls the number, which is again an international premium number.

The methodology uses data sources consulted by the semantic node 112 that include known revenue share fraud databases or threat lists that have been built based on past calling behavior, carrier fraud and threat databases. In using the methodology of FIGS. 1-13 to detect Wangiri fraud, the system detects multiple calls/SMS messages from a single number or range, or an excessive number of calls/SMS messages at step 1502. The allowable number of SMS messages or calls is a user-configurable number. It is determined at inquiry step 1504 whether the configured number of call or SMS message number has been exceeded and whether this exceeded number has occurred within the user configured time period at inquiry step 1506. If so, alarms with associated reports may be generated at step 1508. Otherwise, the system continues monitoring at step 1510 until a problem condition is detected. Any outcome from 1508 is integrated with external contextual data at 1512 and this information is utilized by the semantic node 112 to calculate dynamic changes to any parameters relevant to the use case. This includes packet sniper conditions for alert or action, statistical or risk scoring models, and/or additional information that can be provided back to the network carrier to enhance the alert or report contents at 1408. Examples include customer billing records to determine how the subscriber's current balance may affect their perceived risk in real-time, social analysis of calling maps to determine circles of subscribers involved with suspicious network activity, or contrasting the live network activity with the subscriber's 'normal' behavioral patterns to determine if an outlier or anomaly has been detected.

The reports generated in response to detection of this condition would include updates of all current fraud events updated with all victims who have received SMS or phone calls. The reports would show common numbers any victims are calling back in order to identify the callback numbers of the SMS attacks. The reports would further provide real-time calculations of KPIs and savings in the dashboard to show cost/call of each return call so analysts can track savings from the time the callback number is barred to customers. This will calculate how much it would have cost the customer had the Wangiri fraud not been identified and stopped. Thus, a particular savings benefit can be numerically defined for customers and the network provider.

Another type of fraud which may be detected by the system 102 is International Revenue Share fraud. This type of fraud involves perpetrators making calls to international premium numbers on stolen or purchased SIM cards from within the carrier network. This type of fraud has two subtypes. Within the "number callout" scenario, subscribers call international premium numbers as evidenced by a sudden high number of outbound calls to a small range of destinations. This could indicate the usage of stolen SIMs or SIMs purchased with no intention to pay the full contract/bill. In this case, there is no correlated inbound trigger of calls from an international number as in Wangiri Fraud, and the calls are placed from within the carrier network, unlike the international roaming fraud. In the "country callout" scenario a high number of calls are suddenly placed to a specific country. These calls exceed the normal baseline call rates and the calls are placed from within the carrier network. External data sources may be consulted by the semantic node 112 in order to access known revenue sharing databases, threat lists that have been built on past calling behavior, carrier fraud and threat databases.

Figure 16:
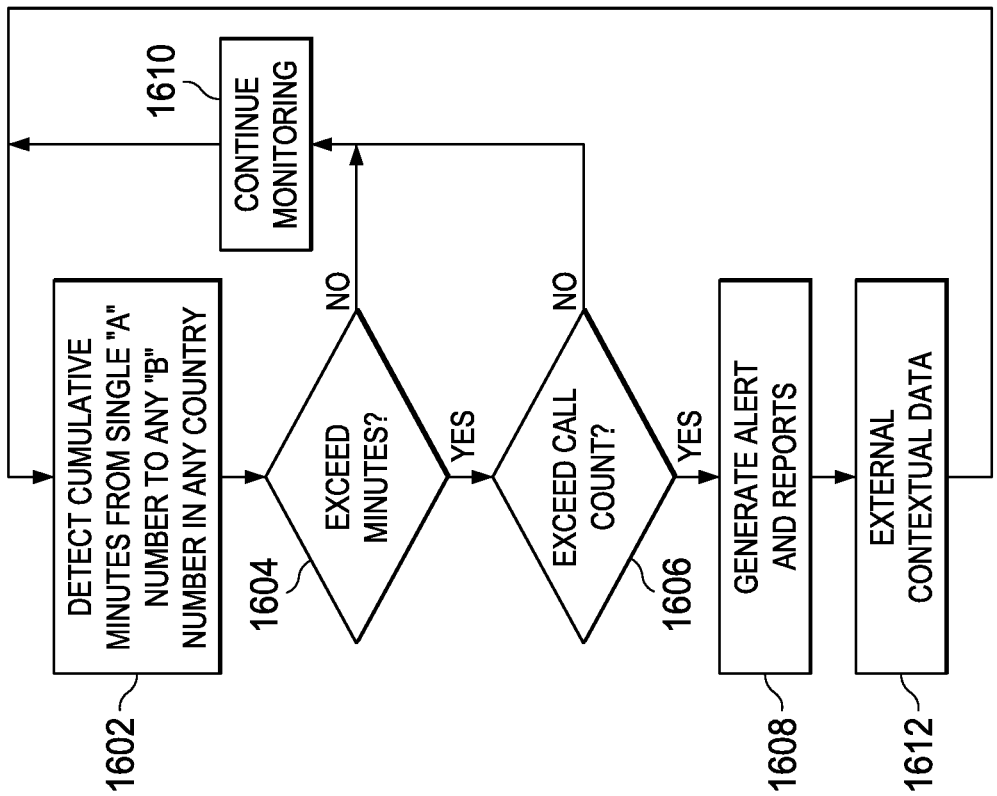
FIG. 16 illustrates a flow diagram for detecting a number callout scenario for international revenue share fraud using a network live-data, real time data monitoring system.

The calling patterns are detected in the manner illustrated in FIG. 16. With respect to the "number callout" scenario, the cumulative minutes from a single "A" number to any "B" number in any country is first detected at step 1602. Inquiry step 1604 determines if the cumulative minutes exceed a user defined threshold level and if so, inquiry step 1606 determines whether the cumulative minutes exceed a call count from a single "A" number to any "B" number in any of the countries within a configurable time period. If so, an alert and associated report may be generated at step 1608. If the cumulative minutes have not been exceeded within a configured time period, or the call count has not been exceeded within a configured time period, the cumulative minutes are further monitored at step 1610 to continue monitoring for possible issues. Any outcome from 1608 is integrated with external contextual data at 1612, and this information is utilized by the semantic node 112 to calculate dynamic changes to any parameters relevant to the use case.

Figure 17:
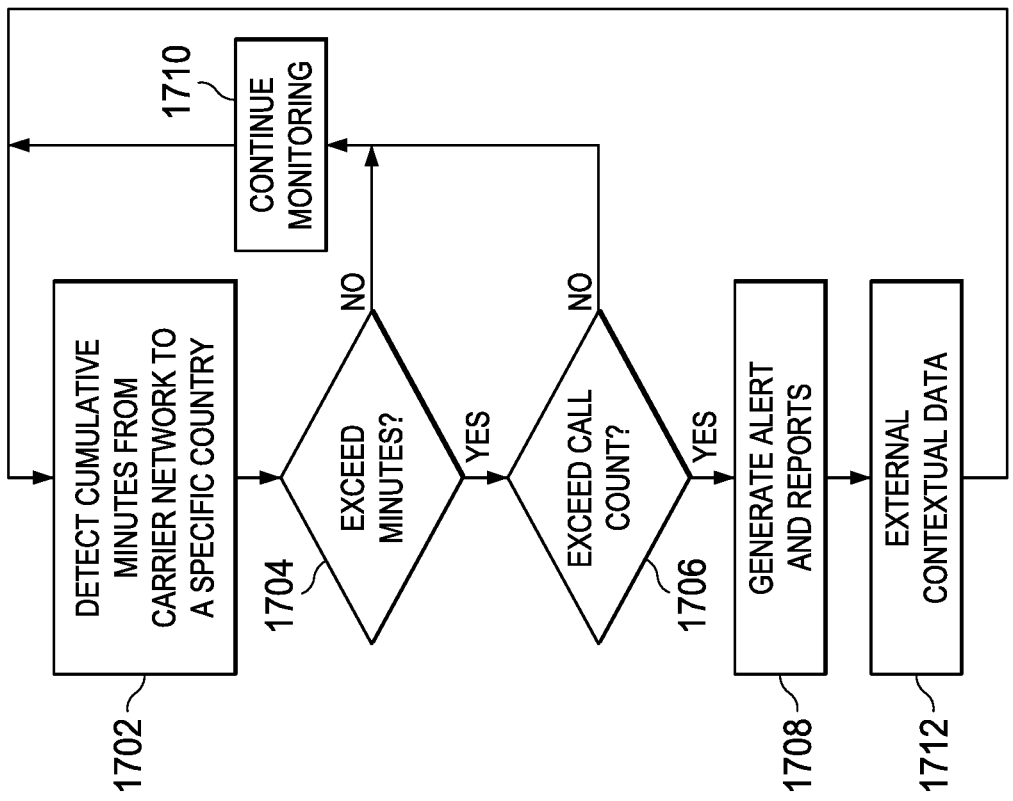
FIG. 17 is a flow diagram illustrating the detection of country callout international revenue share fraud using a network live-data, real time data monitoring system.

Referring now to FIG. 17 in the country callout configuration, at step 1702, the cumulative minutes from a carrier network to a specific country are first detected and inquiry step 1704 determines whether these cumulative minutes exceed a predetermined threshold within a defined time limit. If so, a further determination is made at step 1706 whether the cumulative minutes involve an excessive call count threshold within a defined time period. If so, this causes the generation of alerts and reports at step 1708. If the threshold call limit or call count are not exceeded at step 1704 and 1706, respectively, control passes back to step 1710 to continue monitoring for issues. Any outcome from 1708 is integrated with external contextual data at 1712, and this information is utilized by the semantic node 112 to calculate dynamic changes to any parameters relevant to the use case. Both the semantic node 112 and the data in 1712 enable adjustments to the input parameters to adjust for the live-data conditions of the network. In the case of country-specific thresholds, this dynamic input enables variations to account for regular network baselines (which days of the week are highest/lowest traffic to and from each country, for example), as well as unexpected or uncontrollable factors such as world events (natural disasters, terror attacks, religious holidays) that prompt an unusual surge of traffic to or from specific locations.

The drilldown reports provided at 1608 and 1708 respectively can provide updates on the configurable time period of each fraud event. Reports may also provide a summary of each fraud alert for immediate scanning by an analyst, enabling them to determine how many A numbers/B numbers, cumulative duration, etc. The reports may also provide risk scoring of each alert based upon a configurable set of questions (e.g. are 90% of calls being answered, are majority of calls 2 minutes plus). The report may also provide risk scoring of each alert based upon an external big data contextualization (do any A numbers in this alert have a current balance owing greater than $X). The alert generation may comprise the provision of an application program interface to customer billing and customer profile information, as at 1612 and 1712. Finally, calling maps may be generated to show the relationship between anyone involved in the fraud event, showing all activity for the past 48 hours. These external data sources can be linked to semantic node 112 for ongoing, automatic adjustment or feedback to the use case rules and can inform packet sniper in ingestor node 110 to be aware of specific subscribers, phone numbers, relationships, patterns, thresholds, or other factors, that, when encountered in the network traffic 104, will be automatically alerted on or actions/instructions sent to other systems. Examples include communications to network operations to terminate a call, bar a specific subscriber, prevent outbound calls to a specific phone number—all of these are actions to alter the specific activity as it is detected. This enables the carrier to prevent the losses from being incurred by intercepting the fraudulent activity before or while it happens.

Figure 18:
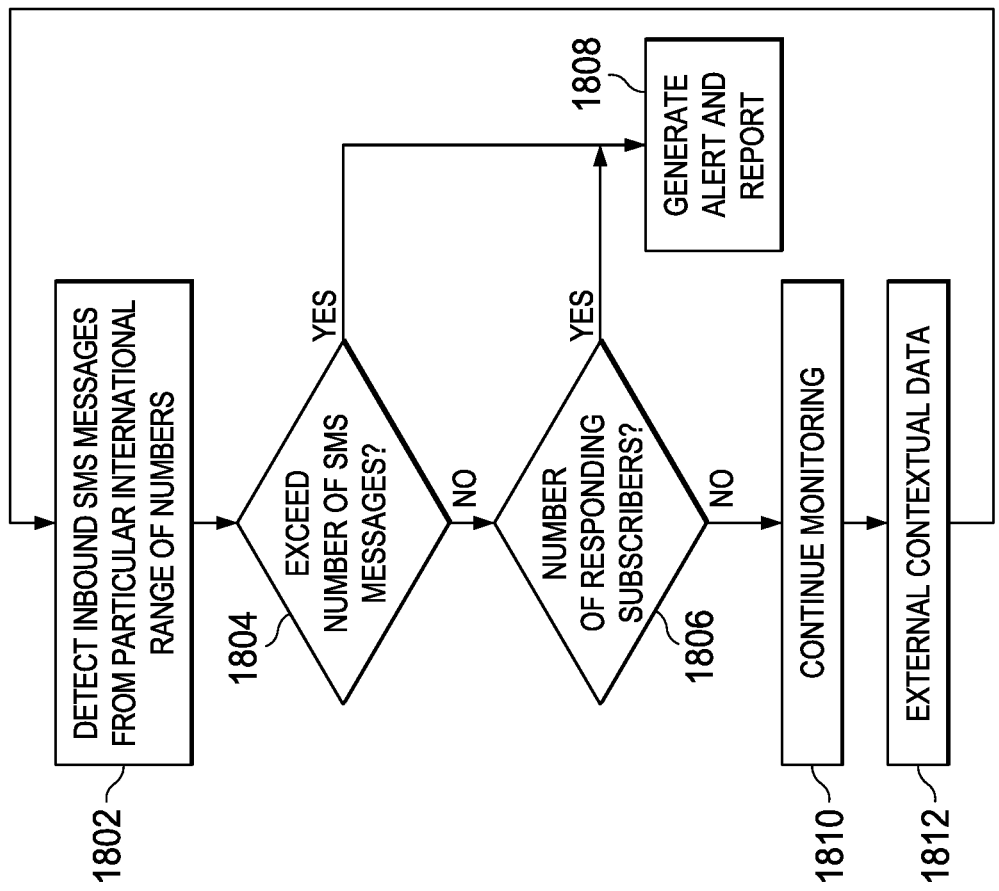
FIG. 18 is a flow diagram illustrating the detection of SMS fraud using a network live-data, real time data monitoring system.

Referring now to FIG. 18, there is illustrated the manner in which the system may detect inbound SMS fraud. Within the SMS fraud situation, subscribers receive SMS messages designed to trick them into either calling international premium numbers or clicking on links designed to phish for usernames and passwords to give access to private information. The system may detect inbound SMS messages at step 1802 that come from a particular international number or range of numbers. The determination is made at inquiry step 1804 whether the number of SMS messages exceeds a configurable limit established by the system. If so, an alert and associated report may be generated at step 1808. If a selected number of SMS messages has not been exceeded, control passes to inquiry step 1806 which determines if an allowable number of responding subscribers who have received the SMS message have dialed a same international number greater than a configurable threshold number of times within a configurable time period. If so, a report and alert are generated at step 1808. If not, control passes to step 1810 and SMS messages will continue to be monitored. To enhance this ongoing monitoring, external contextual data is integrated at 1812, and this information is utilized by the semantic node 112 to calculate dynamic changes to any parameters relevant to the use case. In this case, the contextual data enables, for example, correlation to identify common numbers being dialed—even if those numbers did not originate the inbound spam—so that action can be taken to bar, monitor or otherwise take action on parties involved in a fraud event as it is happening.

Figure 19:
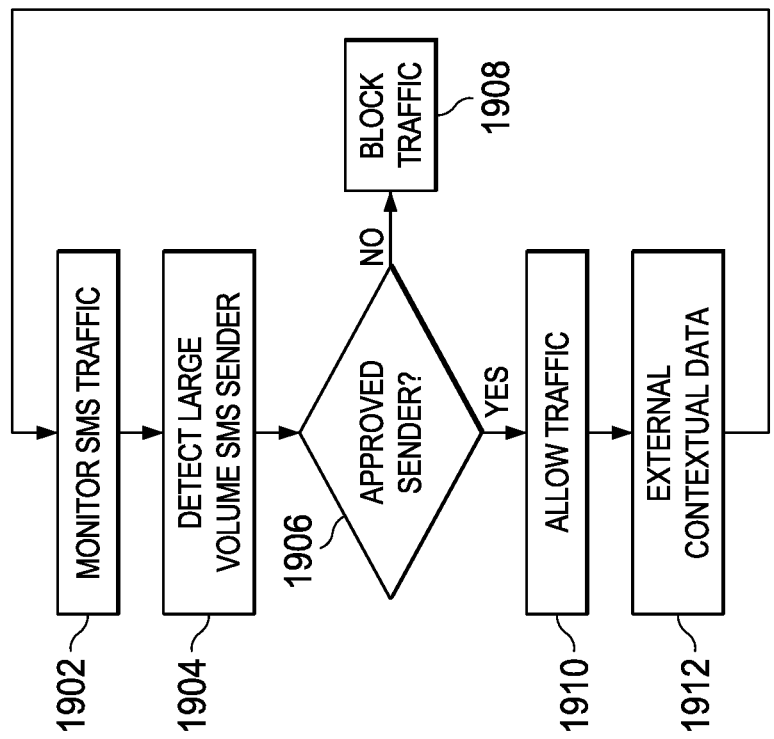
FIG. 19 illustrates the detection of SMS spam using a network live-data, real time data monitoring system.

FIG. 19 illustrates the use of the system to monitor for SMS spam. SMS traffic is tracked at step 1902 and upon detection at step 1904 of a large volume of SMS data from a particular SMS server, or source inquiry step 1906 determines whether the large volume SMS sender is an approved sender on an approved whitelist of approved SMS advertisers. If not, the traffic is blocked at step 1908. If the sender is an approved sender, the traffic is allowed at step 1910. External contextual data is integrated at 1912, and this information is utilized by the semantic node 112 to calculate dynamic changes to any parameters relevant to the use case. Dynamic factors in this use case can include inputs such as flexible whitelists cognizant of time-of-day or day-of-week, or specific special events during which time the parameters for certain SMS senders are different than at other times.

Figure 20:
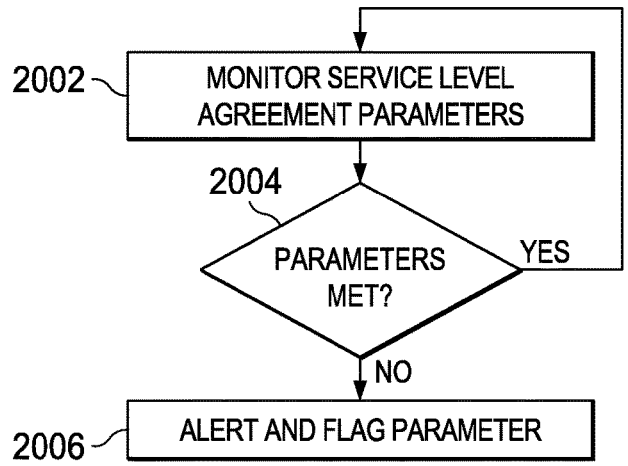
FIG. 20 illustrates a flow diagram for ensuring service level agreement compliance using a network live-data, real time data monitoring system.

Referring now to FIG. 20, there is illustrated the manner in which the system may be used to ensure service-level agreement compliance. Various service-level agreement (SLA) parameters are monitored in real-time at step 2002 and a determination is made 2004 whether all parameters are met. When inquiry step 2004 determines that certain parameters are not met, an alert/flag is generated at step 2006. If the parameters are met, control returns to step 2002 to continue monitoring the parameters. An example of this would be if international roaming files must be generated and submitted to a syndicate service within 4 hours of a call closure. The system automatically checks for SLA compliance and flags any roaming file that is not compliant so that it can be diverted to billing systems/department so that it is not paid back to the roaming carrier.

Figure 21:
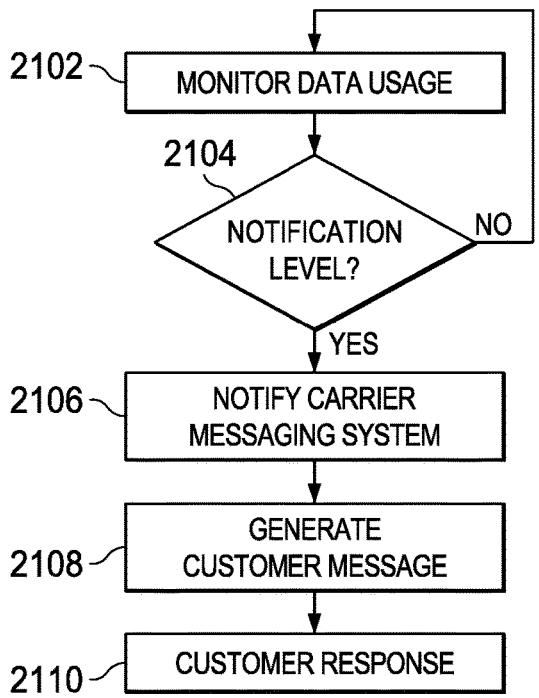
FIG. 21 is a flow diagram illustrating live-data usage verification and notification using a network live-data, real time data monitoring system.

Referring now to FIG. 21, there is illustrated the manner in which the system may be used to provide real-time live-data usage verification and notification in order to prevent bill shock for subscribers. Carriers must provide subscribers with up-to date data usage information so that subscribers do not inadvertently burst through their upper data limits and incur a large overcharge on their monthly bills. This requires the ability to define thresholds of data usage for alerts based upon live customer activity. Responsive to these thresholds, notification triggers are provided to carrier messaging systems enabling further action by the subscribers to interact with the carrier to respond to their respective data usage position. Thus, subscriber data usage is monitored at step 2102 and when various notification levels are reached as determined at inquiry step 2104, a notification is provided to the carrier messaging system at step 2106. The carrier generates messages to the customer at step 2108, enabling a customer response at step 2110. Customer responses may range from upgrading their plan, blocking further data usage, shifting remaining data to shared devices or instantly adding data amounts to their device, etc. If no notification is needed at step 2104, the system continues monitoring data usage at step 2102. This is particularly important so that carriers remain in compliance with regulatory mandates on overage charges, for customer satisfaction, and to maintain brand reputation.

Figure 22:
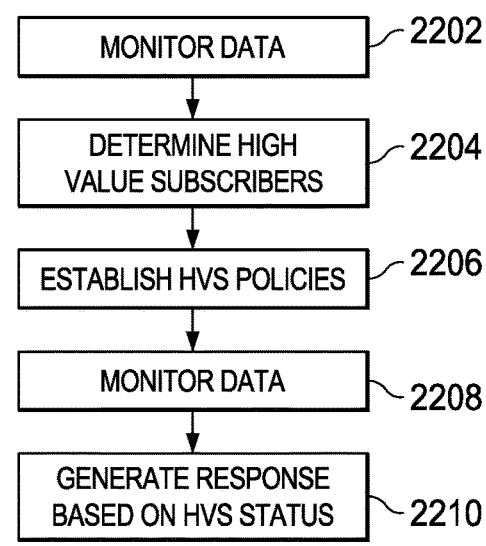
FIG. 22 is a flow diagram illustrating the provisioning of services to high value subscriber customers using a network live-data, real time data monitoring system.

Referring now to FIG. 22, the system is also useful in providing services to various high value subscribers. In order to bridge the current chasm between OSS and BSS toolsets, carriers can identify high-value subscribers (HVS) in real-time and set policies and rules for a variety of conditions and actions. These policies can be adjusted in real-time based upon the HVS score and controlled by customer care, network operations, marketing/promotions, etc. Examples of granularity include the ability to set automatic actions for subscribers with certain HVS levels and manual actions via dashboard for subscribers with other HVS scores. Thus, the system would monitor data usage at step 2202 and determine the high-value subscribers at 2204 in real-time. Policies are established for the high value subscribers at step 2206 and the data associated with the subscriber monitored at step 2208; responses based upon the HVS status are generated at step 2210. Examples of particular types of services which could be provided to HVS users include: HVS users that are determined to be victims of fraud or phishing can receive an SMS message if they are identified as a victim of an inbound fraud or phishing attempt. With respect to network quality of service, the HVS will be flagged if they have x number of dropped or silent or incomplete calls, which are detected by the System 102 as they occur and are mapped against each HVS. The HVS can automatically receive an SMS with an apology and an offer of credit toward next month's bill. Based upon network voice and data usage patterns of the HVS, the carrier can choose to offer completely customized tariff plans. All-You-Can App offers include the option of paying per month for unlimited access to certain frequently used applications, with the data usage not counted against the data limits of the subscriber's base plan. This sort of offer must be calculated and maintained in real-time with live network traffic, as the billing system and the customer's real-time usage must be kept in sync.

Figure 23:
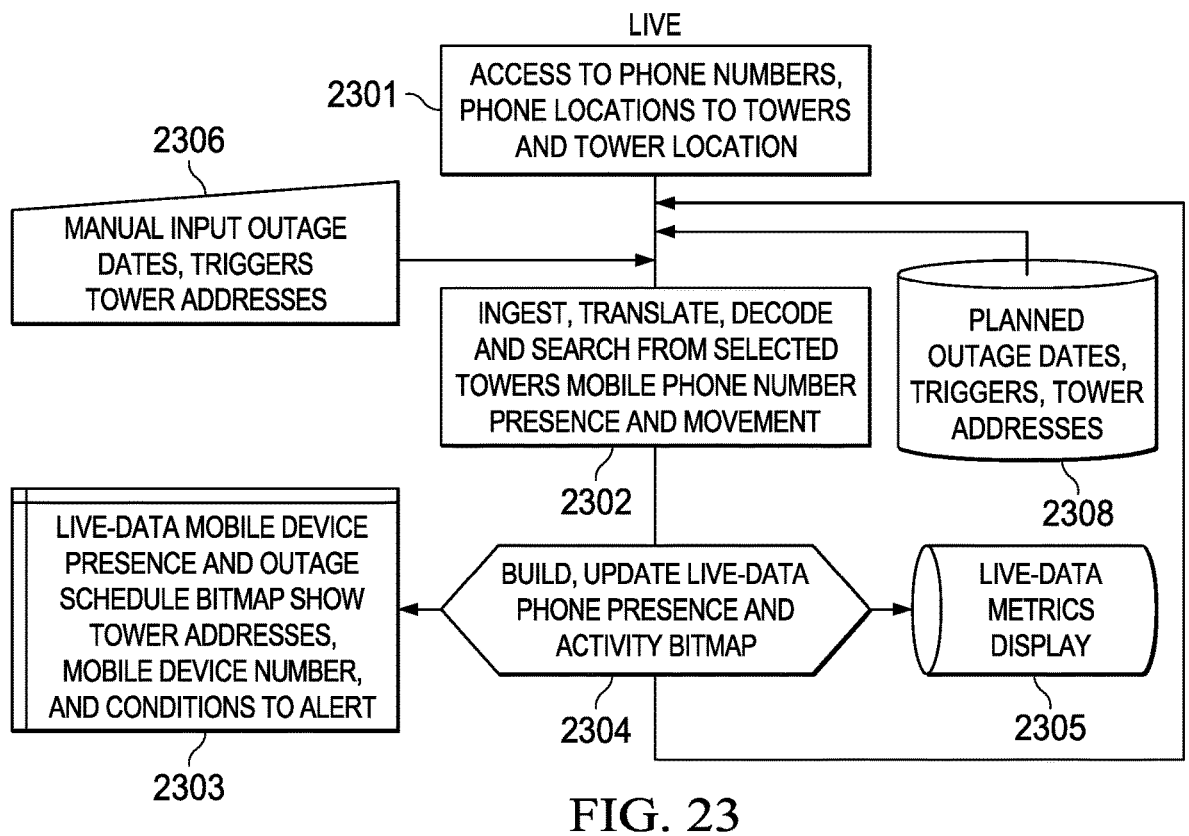
FIG. 23 illustrates planned network outage notifications for customers using a network live-data, real time data analysis system.
Figure 25:
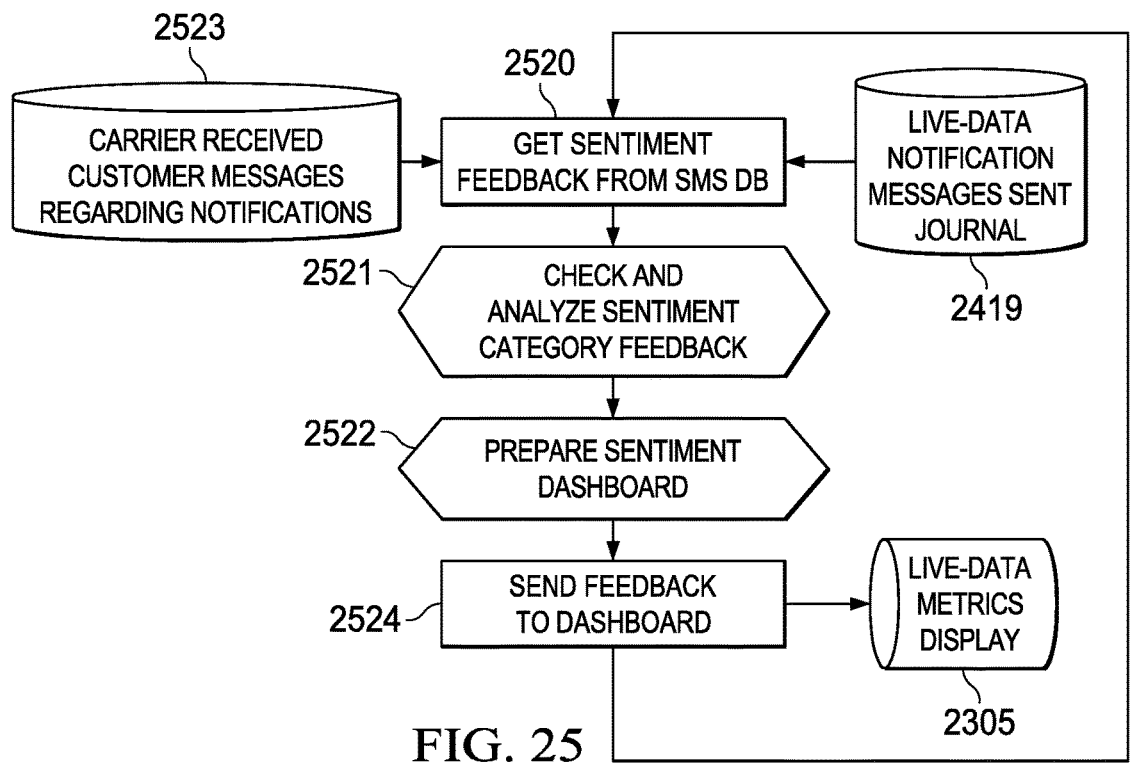
FIG. 25 illustrates the system provisions of real time sentiment analysis during a network outage using a network live-data, real time data analysis system.
Figure 24:
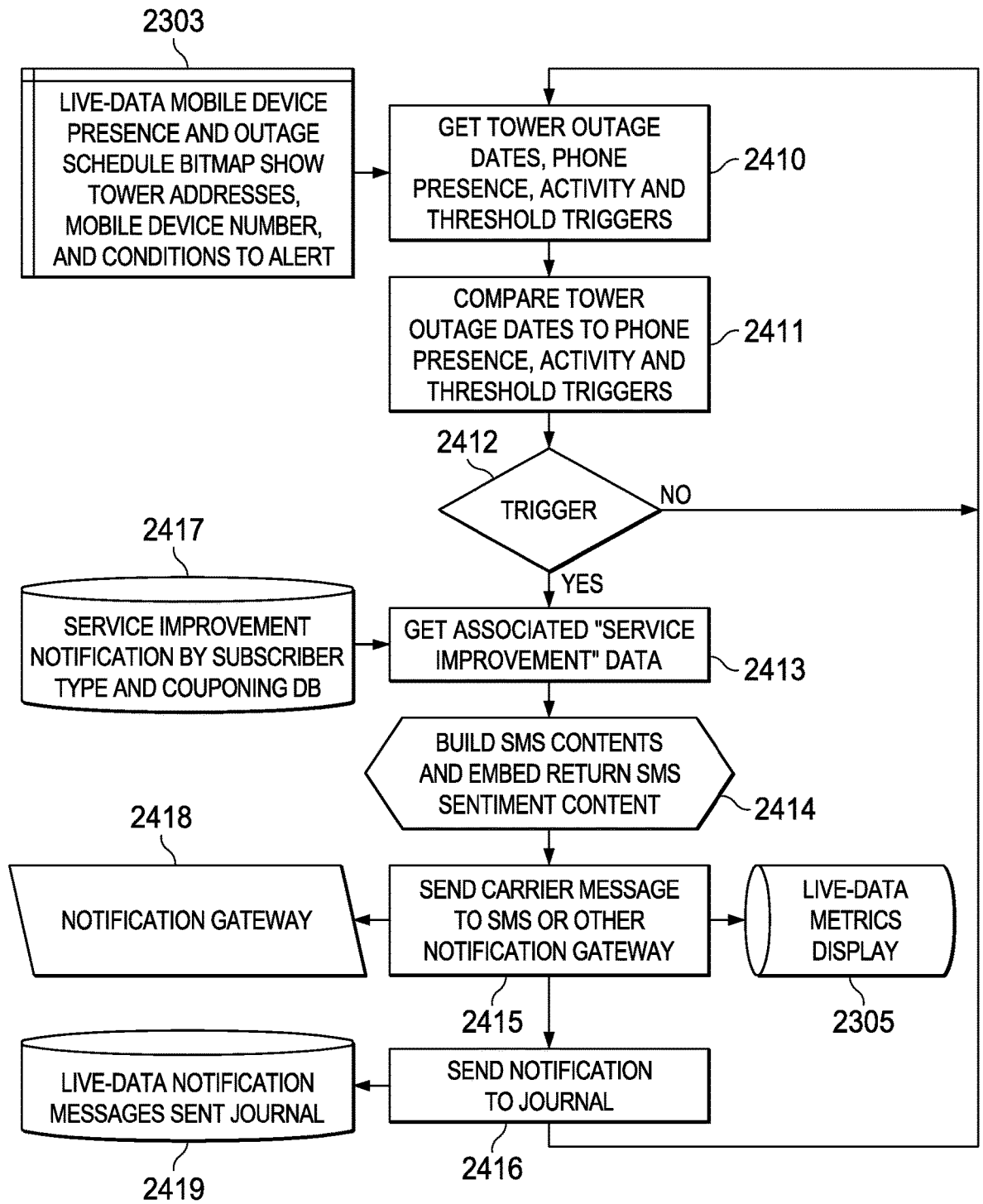
FIG. 24 illustrates the manner for providing network outage notifications to subscribers using a network live-data, real time data analysis system.

Referring now to FIGS. 23, 24 and 25, there is illustrated the manner in which the real-time data monitoring system may be used to provide network outage notifications. As carriers upgrade network infrastructure to 4G/LTE, cell towers and sites must periodically be brought down for planned maintenance. Additionally, unplanned outages occur with regularity. Carriers must be able to notify subscribers of these outages. The system can utilize contextual big data to model the cell site(s) subscribers spend the majority of their time in and automatically push SMS message notifications when there is a planned outage. In the case of an unplanned outage, or an outage that will affect subscribers that are not usually in that cell site but are headed toward it, the system can identify which subscribers will soon be approaching a degraded service area and send an SMS message to anyone who is signed up for "just in time" notifications.

FIG. 23 illustrates a situation for outage notification. In this case, the live-data source 2301 is any network element that provides cell tower location and mobile device address coupled with cell tower location to the ingest VM process 2302. The ingest VM 2302 ingests this mirrored live-data and decodes and identifies data pertaining to the presence of mobile phone numbers within selected cell tower locations. A relationship is built between these data points 2304, and sent onwards to a network topology bitmap 2303. As these mobile devices move geographically along with their human users, the related cell tower location data is continuously updated at 2302 and 2304 to build and represent a real-time, live-data representation of each mobile device's live movements.

Simultaneously, the planned cell tower outage schedules act as event triggers 2308, and manual updates and changes to these schedules 2306 are ingested by the ingest VM 2302. These are integrated at 2304 and sent onwards to the network topology bitmap 2303. The network topology bitmap 2303 represents a live-data mirror of device locations, the cell tower locations or planned or dynamically required outages for service improvements of those towers, as well as accessing a historical record of the presence of the device locations within the targeted cell tower locations. This historical record allows for a deductive process to occur as to the multiple locations over a period of time with regard to both individual devices as well as multiple cell towers. In this fashion, outage notifications can be based on both real-time (immediately-occurring), or historically based device presence in each cell tower location.

The role of the semantic node is shown in FIG. 24. The semantic node deductive processes 2410 and 2411 access the network topology bitmap 2303 and compare cell tower outage trigger dates with regard to the need for an action. Should action be required, process 2413 deduces the current and historic presence relationship of mobile devices to the triggered cell tower address and accesses prescribed notification content data 2417. Step 2414 builds the required notification and embeds any prescribed or dynamically available additional information based on customer status, carrier events or sentiment-analysis feedback. Step 2415 sends the completed message to the carrier notification gateway for transmission to the selected mobile device(s) or other communication endpoints and additionally sends notification metrics for live-data display 2305. Step 2416 sends a copy of the notification output to a journal 2419 for later analysis.

The ability for the system to provide real-time sentiment analysis to the carrier is illustrated in FIG. 25. Step 2520 retrieves 'sent' notification information 2419 and compares with feedback messages 2523 from carrier message hub. Step 2521 compares sentiment feedback with regard to keywords, timeliness of response to outage notification, redemption of included coupons, use of curse words, and other embedded criteria used to measure subscriber sentiment. Such information is compiled into a live-data report at 2522 and additionally readied for transmission at 2524 to display 2305 as live-data sentiment analysis with regard to the impact of the outage. Such live-data sentiment analysis provides time and opportunity for the carrier to respond in kind to the sentiment reporting.

A further example of the use of the real-time data monitoring system is with respect to network/core instrumentation and alerting. Examples of this include the ability to monitor, measure and alert on any network operation or function with the option to set configurable parameters for threshold, limits, alarms and performance optimums. In all cases, visualizations and queries can be drilled down to show innumerable combinations of data (e.g. calls by time, country, circuit, partner, device, etc.), and time periods (real-time, immediate performance and drill down to show how immediate conditions compare against any desired time period of minutes, hours, days, weeks, months, etc.). In all cases, thresholds or performance norms can be set or changed in real-time by the customer and any deviation or desired alerting/alarming can be sent to a variety of destinations including dashboards, email, mobile devices or other applications, solutions or systems.

The system can measure the performance of network circuits (CICs) in real-time and provide visualization of all monitored CICs over a selectable time period to show trends and performance norms. When any single CIC or group of fellow CICs fall below the threshold which are configurable and changeable in real-time from the dashboard, alerts can be sent to the dashboard and/or to email, SMS or other connected systems.

Measurements of total network traffic can be as granular as the customer desires. Measurements can include total calls in/out, total SMS in/out and any combination of drill down on these analyses including querying the data by circuit, by cell tower, by interconnected partner, by inbound or outbound traffic, by destination or origin country, by device type, by conversation length, etc. Anything that can be measured can be queried and displayed on the dashboard.

The system may be used to measure the ratio of answered to unanswered calls against a customer-configured threshold. Real-time data can be drilled down by any of the categories mentioned in the previous use case and thresholds can be changed in real-time. Alerts can be sent to a dashboard, email, SMS or other system. This system may also detect average conversation times and interconnect traffic data and provide alerts, reports, etc., based upon this information. Thus, using the above described system and method, real-time data flow within a network, via a connection to a particular network element, switch, etc., may be achieved in order to analyze the real-time data flow in order to generate analysis and reports of the data while the data is actively being generated before it exits the network for onward storage. This enables network providers to provide much more up to date and real-time responses to the analyzed data and achieve improvements to system performance and issues as these events are occurring rather than at a later date based upon post-data analysis.

Figure 26:
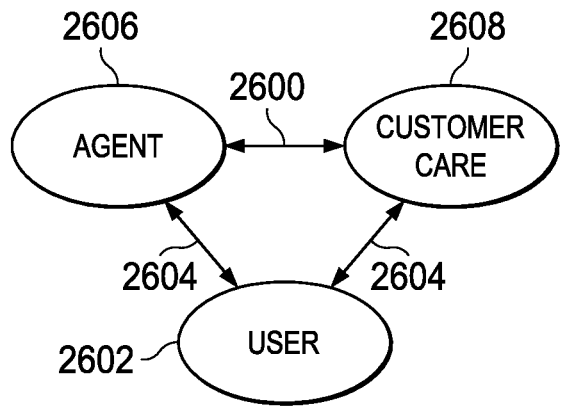
FIG. 26 illustrates the interactions between a user, agent and customer care center.
Figure 27:
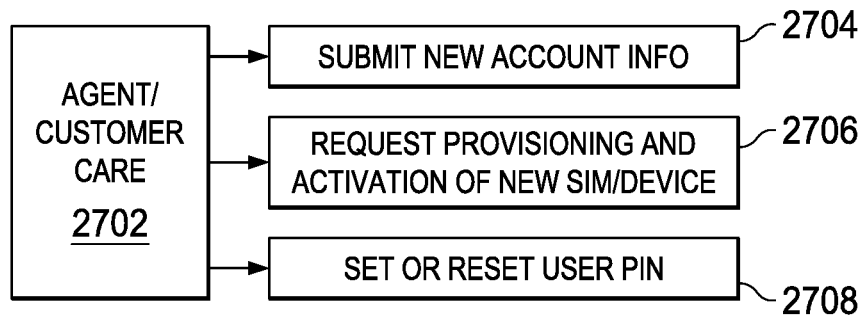
FIG. 27 illustrates examples of agent/customer care functions.
Figure 28:
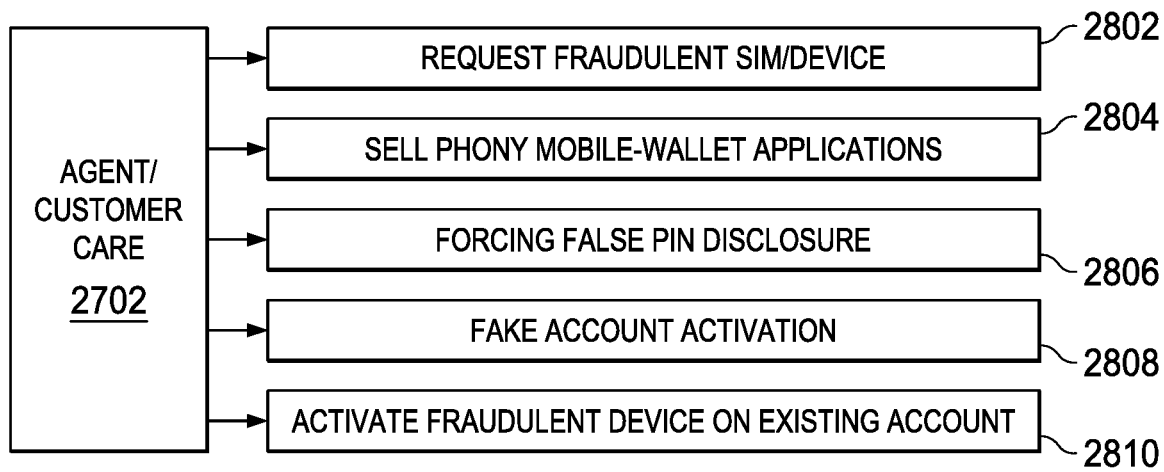
FIG. 28 illustrates examples of agent/customer care fraud.
Figure 29:
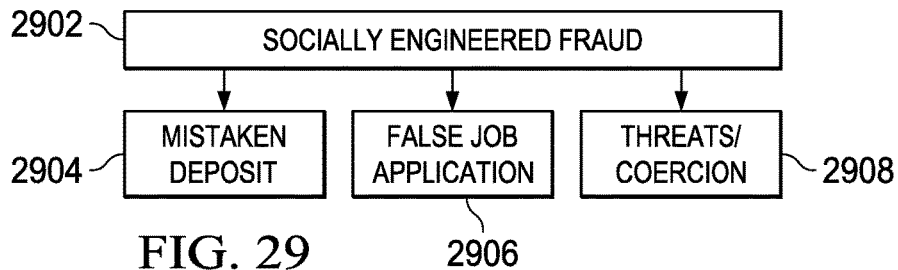
FIG. 29 illustrates examples of socially engineered fraud.

The system described herein above may be used in a number of different applications using the ingestor nodes and semantic nodes. In one example, mobile devices are used in many parts of the world not merely as communication and information devices but also to carry out financial transactions between parties. The mobile device carrier may provide financial transaction services very similar to those provided by a bank. There are several types and channels of mobile money transfer fraud that illustrate the need for a system such as that described herein to monitor for and detect fraud. Some examples are illustrated in FIGS. 27-29. It will be appreciated that the examples of fraud described herein below are only some examples of the types of fraud that the described system is useful for intercepting and correcting. Referring now to FIG. 26, two examples include fraud perpetrated by the mobile carrier agents 2606 and customer care center personnel 2608, and so called socially engineered fraud. There are four primary impacts of the system 3000. Firstly, to reduce the reliance on agents for identification verification. In this particular embodiment, for mobile carriers relying on agents and customer care centers to verify identify and intent for issuing new or replacement SIM cards, mobile devices, or PIN codes. Second, to continuously audit, inspect and verify all or targeted network usage until verification hurdles have been met and released. In this particular embodiment, for mobile carriers to inspect the usage of all newly issued or replaced SIM cards, PIN codes or mobile devices for potential socially-engineered or other fraud in mobile money transfers or mobile messaging as they occur. Third, to inspect all mobile money transfers for potential socially-engineered or other types of fraud as they occur. And finally, the ability to intercept the fraudulent transaction before it completes, when identified in the second and third cases above.

Fraud of various types may enter into the system through either of the agent 2606 or individuals working at the customer care center 2608. The agent 2606 and customer care center 2608 perform a number of functions for the mobile carrier. The agent 2606 is an individual responsible for selling mobile devices, SIM cards and other components necessary for the user 2602 to connect with a mobile network. Customer care 2608 interacts with agent 2606 when a new user 2602 is requested/added, validating the information provided and authorizing device/account provisioning in some cases. Customer care center 2608 also provides help services to the user 2602 once a user has established an account with a mobile carrier.

As shown in FIG. 27, the agent/customer care center personnel 2702 perform functions such as selling SIM cards or devices and handling activation of new accounts. Examples of agent 2606 activities include the submission of user information 2704 to customer care/carrier 2608 in order to facilitate the opening of a new customer account. This process will initiate the provisioning and activation of a mobile device onto the carrier mobile network. The agents 2606 can additionally request provisioning and activation of a new SIM card or mobile device for an existing user 2706 if a mobile device is lost or stolen. Another example of agent 2702 provided services include the setting or resetting of user PINs 2708. These user PINs are used for authorizing mobile money transfers by a user.

These processes present a number of opportunities for fraud involving both the agent and customer care center 2702. Examples include the request 2802 of a new SIM or device on the account of a customer who will be away for a long period of time—example, traveling abroad. With the customer absent, the issued SIM or mobile device may be used by an unauthorized party for an extended period of time, since the customer will be unaware of the fraudulent use until their return. Another example involves the agent 2606 selling customers phony mobile wallet applications 2804, where the deposited funds would go to the agent or fraudster rather than the genuine mobile provider. Another fraud example involves misleading users to believe that PIN numbers must be shared for customer service reasons 2806. The disclosed PIN number may then be used for nefarious purposes. Agents or customer care representatives 2702 can also perform fake account activations 2808. The fake account is opened using false user information. Similarly, fraudulent devices may be activated on an existing account

2810. In this case, an actual account is utilized but a device not authorized by the customer is activated on the account.

A result of any of these fraudulent situations may not become known to the original legitimate user until days or weeks later. The system described herein above may solve this issue by reducing carrier reliance on agents and customer care center personnel as the verifiers of customer identity and intent. This enables mobile carriers to monitor the provisioning process and use of devices based on rules and policies that are not controlled by the agents or customer care representatives, providing a solution to the challenge of 'quis custodiet ipsos custode' (who will guard the guards themselves).

Referring now to FIG. 29, socially engineered fraud 2902 is a low-tech method of fraud that relies on human interaction to break normal security protocols. There are several examples of socially engineered fraud 2902 including scams, phishing, threats and other methods. A mistaken deposit scam 2904 occurs when a victim receives a message that the sender has mistakenly sent a sum of money meant for someone else. As a thank you for returning the money, the victim is offered an opportunity to keep some of the money. The original "mistaken deposit" was never actually made in the first place, and the victim has lost the "returned" money. In a false job application scam 2906, a victim is invited to apply for a job but must pay an "application fee." There is actually no job, and the fraudster can scam hundreds of victims in a very short period of time. In a threats or coercion fraud 2908, a victim receives a message that a family member is being threatened or held hostage and will only be released if a certain sum of money is transferred, or receives other similar threats designed to extract a payment.

In most of these situations, the victim will willingly and unsuspectingly—except in the case of threats—initiate or respond to a mobile money transfer request and complete the transfer of money to the fraudster. The victim does not become aware of the fraud until afterwards, sometimes long afterwards, and may not immediately be aware that they have been victimized. The system described herein above may be used to enable mobile carriers to identify, interact with, and track the integrity of the transaction while the sender and recipient are engaged in the social interaction related to the mobile money transfer. The mobile carrier may thus apply a 'probable cause to doubt' model of assurance while the transaction is underway and before it is completed.

Figure 30:
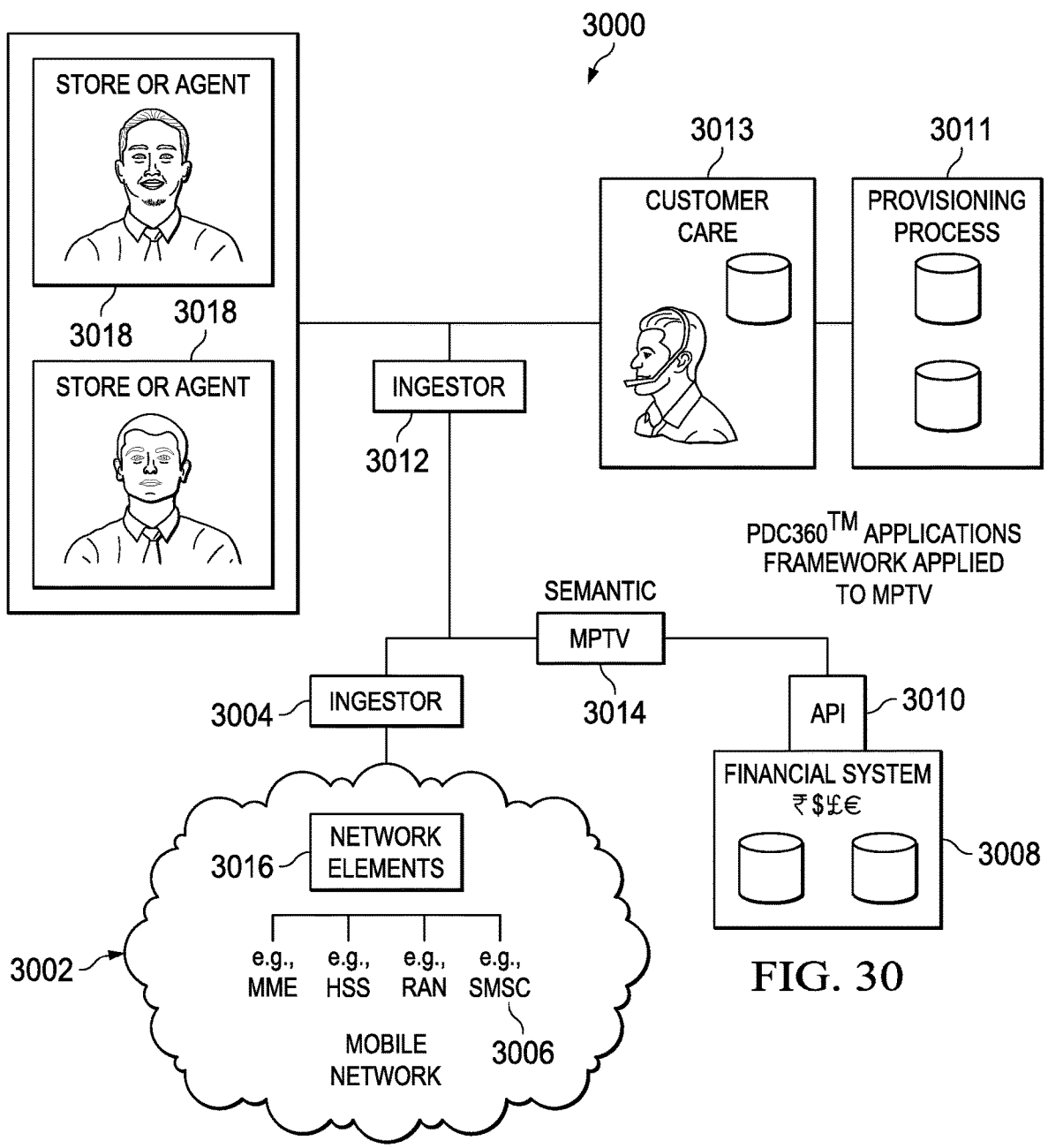
FIG. 30 illustrates the general topology of a mobile payment verification system.

Referring now to FIG. 30, there is illustrated the general topology of a mobile payment verification system (MPTV) 3000 described herein above as applied to the mobile money transfer application and fraud situations that have been described. The MPTV system 3000 is a system providing for the continuous observation, simultaneous audit, and pre-verification of user activities as they occur within a mobile network using a system such as the network real-time data analysis system described herein above. The MPTV system 3000 is implemented in parallel with a mobile carrier network 3002 using an ingestor node 3004 as described above. The MPTV system 3000 uses the network provider's SMS service 3006 or another suitable messaging or communications service. It will be appreciated by one skilled in the art that while the present disclosure references the use of the SMS service, that any messaging service, application or communications capability can be utilized where SMS is referenced herein. The MPTV system 3000 introduces a machine-driven, socially interactive, increased 'assurance of intent' layer in parallel to, and interactively with, mobile money transfers. The MPTV system 3000 interacts with several subcomponents of a mobile carrier network and mobile money transfer service including the mobile network 3002 through ingestor node 3004, the financial service layer 3008 through financial system API (application program interface) 3010, and the provisioning process 3011 through ingestor 3012.

The MPTV system 3000 performs several significant functions. The MPTV system 3000 reduces the reliance of mobile carriers on agents and customer care centers as the sole identifier of intent and/or as adjudicators of new or replacement SIM cards, devices and PIN issuances; as the MPTV system 3000 provides an automated ability to check and record the decision-making process for issuing or replacing SIM cards, devices or PINs. Second, the MPTV system 3000 provides the ability to continuously track the actions and usage of any target devices, PINs, SIMs, or users. And third, the MPTV system 3000 monitors network use for potential socially-engineered fraud in mobile money transfers or SMS messaging as they occur. The system can intercept fraudulent transfers or transactions as they occur. Any one of these MPTV activities has the ability to trigger subsequent alerts, recordkeeping and external notifications for remedial action while a transaction is in process. Thus, the system adjusts the outcome of the transaction to a more desirable result before its completion.

In addition to the live carrier network inputs, the MPTV system 3000 is able to dynamically receive fraud use case updates from multiple big data trending analysis pools. This information enables the MPTV system 3000 to incorporate fraud trends as part of its detection scenarios. Additionally, the MPTV system 3000 dynamically incorporates live updates via SMS from both the sender or the recipient as to whether the transaction was completed as expected. The MPTV system 3000 updates and integrates with the MPTV system 3000 self-learning capability to enhance the detection algorithms and assist in the continuous and automatic improvement of fraud detection as it happens. Both capabilities are assistive for investigative forensic efforts in addition to the live data interceptive detection and arrest.

The MPTV system 3000 architecture uses the network real-time data analysis system described herein above in the following manner. Ingestor node(s) 3004, 3012 connect to key points within the provisioning process and mobile network to gather and return data. Semantic node 3014 houses the mobile money transfer fraud detection software that analyzes the data in accord with its assigned policy or contextualization, returns verification criteria to the ingestor nodes 3004, 3012 for onward interaction with the carrier system, and manages the API 3010 that connects the MPTV system 3000 to the carrier's mobile money transfer financial system 3008.

The full extent of the MPTV system 3000 requires interactive ingestor node 3012 access to carrier retail internet/networks, and customer care communication system 3013. A network element (example: MSC, gateway, etc.) 3016 identifies mobile messaging or mobile payment transactions in progress. The MPTV system 3000 accesses the carrier financial system 3008 through the API 3010 as a duly authorized administering agent. The ingestor nodes 3004, 3012 connect to the MPTV application implemented at the semantic node 3014.

Each of these components form the virtual machine providing automated message-based interactive test and verification of a mobile network user identity and intent for the provisioning of new or replacement PINs, SIM cards or mobile devices and, in parallel to their network usage, conduct such test and verification for fraudulent mobile money transfers or other deemed activities including the ability to test and alert for ongoing socially engineered fraud, threats or scams.

The MPTV system 3000 provides mobile carriers with a new approach and a new level of sophistication in tracking the fidelity of activity occurring in mobile networks 3002. This level of continuous observation and continuous audit is not restricted to mobile money transfers or PIN verification. Other uses may be applied pertaining to all manner of content transfer, trap and trace of socially engineered scams, network security, hacking, privacy, or operational fidelity. Nor is it restricted to mobile networks; the MPTV system 3000 can be targeted towards other networks and events requiring pre-verification, including but not limited to enterprise networks, sensors, M2M and others.

The MPTV system 3000 is well suited to providing a new approach to security for the requirements of network function virtualization, hybrid, and increasingly virtualized networks and the requirement of generating network elements on-demand. The MPTV system 3000 does not compete with legacy or other security and fraud detection methodologies, but adds a new detection and interception paradigm in keeping with the move to mobility and virtualization with its need for on-demand change or scale.

When applied to mobile money transfers, this new level of interactive pre-verification of the transaction before funds are actually transferred also lessens (if not removes) the fiduciary responsibility of the mobile carrier to reimburse users for the majority or any part of fraudulent transactions, as the authorization involves the user himself. The process also provides an immediate audit trail of events before and during the transaction that can be played forward to engage trap and trace of future related activities. For mobile carriers, the three greatest assets are the network, subscribers, and the brand. The MPTV system 3000 increases the operational fidelity of each of these three assets.

The user is assured within the MPTV system 3000 that policing of transactions is undertaken during the actual transaction itself, with the capability to stop nefarious and fraudulent transfers. This offers a new and higher level of security and a new and higher level of assurance and protection from victimization through socially engineered fraud and other fraud types.

The MPTV system 3000 uses the semantic node 3014 to provide the mobile carrier with live observation and audit processing statistics including but not limited to: number of SMS messages being processed; number of fraud events detected/intercepted/prevented by location, type and date/time; new detection types; alerts on suspicious activity; view of current social dialogue keywords and trends; individual or group transaction drilldowns; all PINs or SIMs under surveillance; all mobile money transfers currently in dialogue; all transactions related to a particular subscriber; any subscriber engaged in [X]+dialogues and social webs. These types of statistics are variable and live and can identify patterns of fraud and perpetrators as they occur as they are generated from the live traffic. The MPTV system 3000 allows the mobile carrier to start and stop the system and to extract certain operational performance statistics for problem diagnosis. New algorithms can be introduced while the MPTV system 3000 is operational without the need to pause or take the system off-line to push out these updates.

Figure 31:
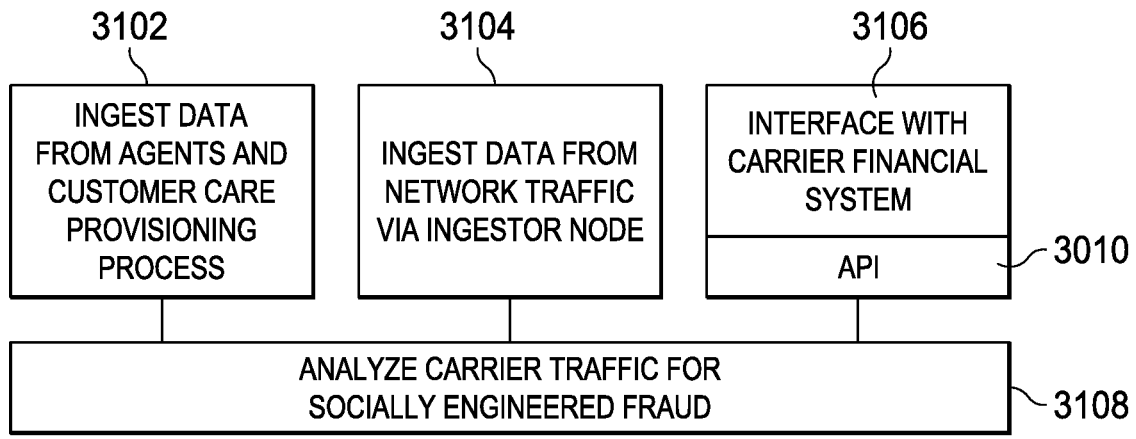
FIG. 31 is a flow diagram illustrating the manner for monitoring for fraudulent monetary transactions.

Referring now to FIG. 31, there is illustrated a general flow diagram of the manner in which the MPTV system 3000 can monitor for fraudulent monetary transactions over a mobile carrier network. An ingestor node ingests data from agents and customer care sources at step 3102 as described hereinabove. In parallel, an ingestor node ingests data from network traffic at step 3104. The MPTV system 3000 interfaces at step 3106 with the carrier financial system 3008 through the API 3010. The semantic node 3014 analyzes carrier traffic at step 3108 and correlates a common view of all ingested data from 3102, 3104 and 3106 to detect socially engineered fraud or other fraudulent transactions. Using the MPTV system architecture 3000, steps 3102, 3104 and 3106 may be used for outward facing customer interaction while step 3010 may access machine-driven contextual verification algorithms and transaction management to provide the software-defined, interactive command-and-control security checkpoints for increased ID verification when provisioning users and includes an option for PIN issue tracking and to verify mobile money transfers.

Figure 32:
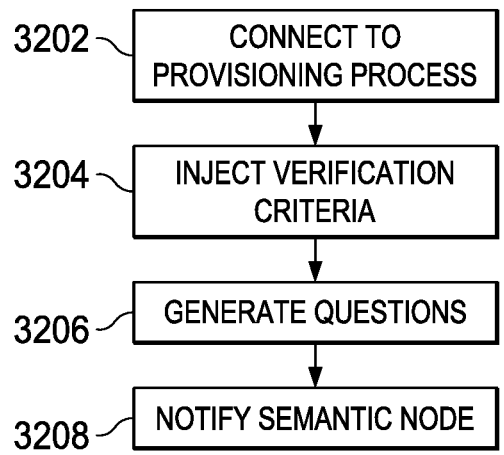
FIG. 32 is a flow diagram illustrating the ingesting of data by an ingestor node using the system illustrated in FIG. 30.

Referring now to FIGS. 30 and 32, the step of ingesting data from a data carrier provisioning process at an ingestor 3012 to reduce reliance on agents & customer care centers when determining validity of new or replacement SIM cards, PINs or mobile devices is more particularly described. The node 3012 monitors for new or replacement provisioning of SIM cards, PINs or mobile devices. Ingestor node 3012 observes traffic at key aggregation points of a carrier's Intranet between retail agents 3018 and the customer care center 3014. Ingestor node 3012 provides bidirectional monitoring and mirrors data passing through the point as described herein above for observing requests for provisioning of SIM cards, PINs or mobile devices. The ingestor node 3012 also has output connectivity to the customer care process 3014, retail agents 3018 and provisioning process 3011 to facilitate notifications to those functions.

Using the ingestor node 3012, the MPTV system 3000 at semantic node 3014 connects to and interacts with the provisioning request process at step 3202 between a carrier agent 3018 and the customer care center personnel 3014. Ingestor node 3012 injects at step 3204 subsequent system-deduced verification criteria that provides the ability to reduce the reliance on retail agents 3018 and customer care center personnel 3014 as the primary or only authority to qualify the validity of identity for the issuance of a new or replacement SIM card, PIN or mobile device. Using the data gathered from ingestor node 3004, the semantic node 3014 generates at step 3206 dynamic, time-sensitive questions to verify a user's identity. Since this information can remain in the closed-loop MPTV system 3000 deduced environment, the agent 3018 or customer care center personnel 3014 cannot access or influence it. The reissuance of a forgotten PIN or the replacement of a supposedly stolen device can be restricted until the user correctly answers a series of dynamically generated, personalized questions based on their own network activity.

Examples of these generated questions include:
Which one of the following three vendors did you purchase from in the last two days?
Which one of the following three locations were you in the last 36 hours?
Which of the following phone numbers did you call yesterday?
Which is the correct last four digits of a credit card you have used to top off your account?

When the issuance or reissuance has successfully passed these hurdles, the system 3000 enables the continuous audit and supervised usage of all newly issued or reissued SIM cards, PIN numbers or mobile devices to further ensure non-fraudulent usage. This is achieved by placing all these issue/reissue activities on a 'suspected hot list' until certain dynamic verification hurdles have been passed.

Ingestor node 3012 notifies the MPTV system 3000 at semantic node 3014 of the issuance of any new or replacement PINs, SIM cards or mobile devices at step 3208. This notification can also be programmatically prescribed (only those situations meeting certain criteria, for example). This notification updates the MPTV system 3000 at the semantic node 3014 plausible "hot list" and forwards the 'hot list" to all ingestor nodes 3004 monitoring the mobile network and to the nodes 3010 associated with the financial system 3008 to observe and report all activity as suspect until released. When identified, ingestor node 3012 interacts with the MPTV system 3000 at the semantic node 3014 to engage MPTV machine-driven, socially interactive, contextual verification algorithms. As an example, a carrier may choose to designate all reset/re-issued PINs as 'suspect' until the device has been used for 48 hours with no complaints or reports that the PIN was fraudulently reset. They may decide to designate as suspect only those users with reissued PINs who have been customers for 6 months or less. MPTV system 3000 monitors all relevant and target activity by those users for the prescribed time period and can require the user to confirm each mobile payment transaction via the socially interactive verification questions until they have reached a certain 'proof hurdle'. Then, the user is released from the suspect hot list.

Figure 33:
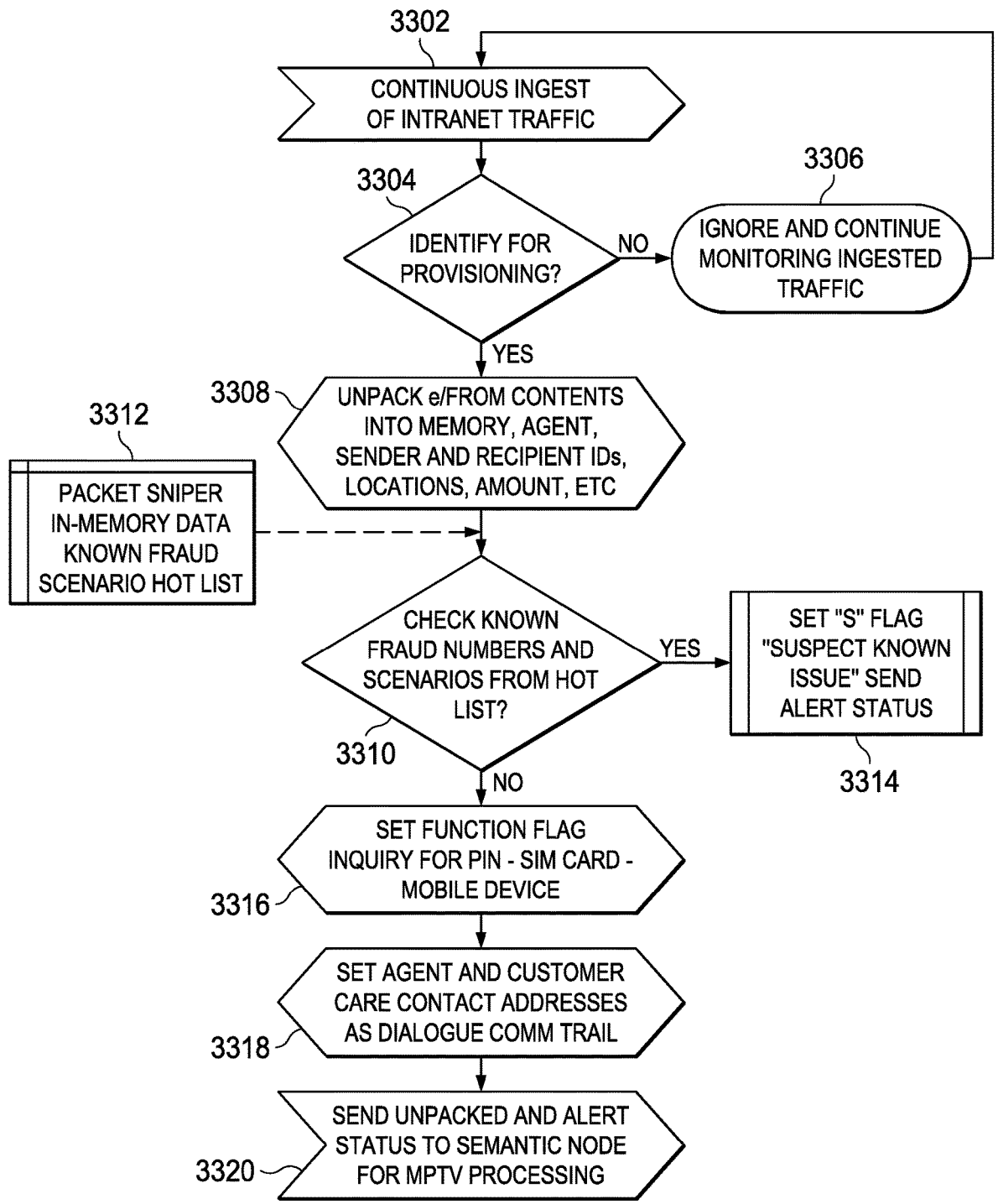
FIG. 33 is a flow diagram illustrating the software flow associated with identification of new or replacement PINS, SIM cards or mobile devices.
Figure 34:
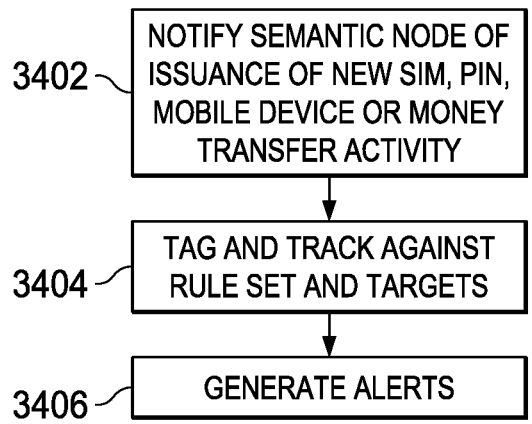
FIG. 34 is a flow diagram illustrating the manner in which the ingestor node monitors data flow from a mobile carrier network.

Referring now to FIG. 33 there is more particularly illustrated the software flow associated with ingestor node 3012 for detection and identification of new replacement PINs, SIM cards or mobile devices for the continuous audit and verification process. The ingestor node 3012 provides a continuous ingestion at step 3302 of the traffic between the agent 3018, customer care center 3013 and provisioning process 3011. Inquiry step 3304 determines whether a new or replacement PIN, SIM card or mobile device provisioning process has been detected. If not, the data is ignored at step 3306 and returns to inquiry step 3304 for a next group of data. If inquiry step 3304 identifies a new or replacement provisioning process, information is unpacked from the content of the data at step 3308 and placed into a memory of the ingestor node 3012. The data may comprise information such as identification of the agent, the sender and recipient IDs, location of the transaction amount of the transaction, etc. Next, inquiry step 3310 checks for known fraudulent numbers in fraudulent scenarios from a hot list stored locally at the ingestor node 3012. This information is provided from the packet sniper in-memory data of known fraud scenarios and hot list information 3012 provided from the semantic node 3014. When a known fraud number or scenario is detected, a flag is set for a suspected known issue at step 3314 and an alert status is sent to the semantic node 3014. (Examples of actions that can be triggered by this flag include intercepting actions by this user, or setting higher validation hurdles). If no known fraud number or scenario is detected at inquiry step 3310, a flag is set at step 3316 to generate an inquiry for provisioning of the new PIN, SIM card or mobile device. The agent and customer contact care addresses are set at step 3318 to enable the SMS communications to confirm the transaction. The unpacked data and alert status are sent at step 3320 to the semantic node for MPTV system processing and generation of the appropriate questions.

Referring now to FIGS. 30 and 34-37, there is described the operation of the ingestor node 3004 associated with a mobile carrier network 3002 as referenced in step 3104 of FIG. 31. Ingestor node 3004 monitors all activity as it occurs, including that of newly issued or replaced PINs, SIM cards mobile devices, usage and mobile money transfers.

The ingestor node 3012 notifies the semantic node at step 3402 of the issuance of new or replacement SIMs, PINs, mobile devices or any mobile money transfer activity. The semantic node 3014 tags and tracks at step 3404 all activity and usage that is detected by ingestor nodes 3004, 3012 against a set of rules and targets. When a particular transaction or situation is detected at step 3404, an alert is generated at step 3406 and this information is transmitted to the MPTV system 3000 at the semantic node 3014.

Figure 35:
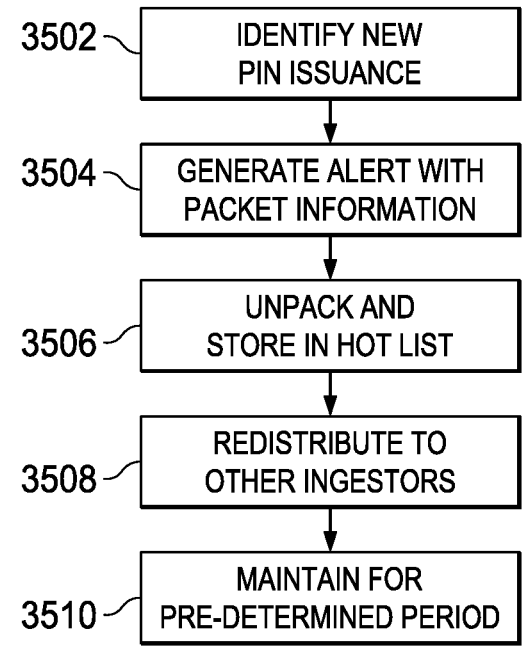
FIG. 35 is a flow diagram illustrating a particular example for monitoring for a newly issued or replacement PIN.

A particular example of this is illustrated with respect to FIG. 35. The MPTV system can treat all activity on newly issued or replacement PINs as suspect until that PIN or device is proven to be bona fide after a predetermined number of transactions or is released as bona fide through mobile carrier senior official recorded override. Using ingestor node 3004, all newly-issued PINs are identified at step 3502. When a newly-issued PIN is identified, an alert 3504 is generated and sent, along with packet information associated with the PIN, to the MPTV system semantic node 3014. This information is unpacked and stored at step 3506 within an MPTV system "hot list" at the semantic node 3014 for verification. Additionally, the MPTV system 3000 redistributes at step 3508 such summarized information to other ingestor nodes to identify further usage elsewhere. The "hot list" listing is maintained for a predetermined and/or dynamic period of time 3510 and provides a period of supervised usage for the PIN or mobile number to protect the user from stolen PINs or devices. The "hot list" becomes a trigger for intercept and verification regardless of the activity involved. As an example, a carrier may choose to designate all reset/re-issued PINs as 'suspect' until the device has been used for 48 hours with no complaints or reports that the PIN was fraudulently reset. They may decide to designate as suspect only those users with reissued PINs who have been customers for 6 months or less.

Figure 37:
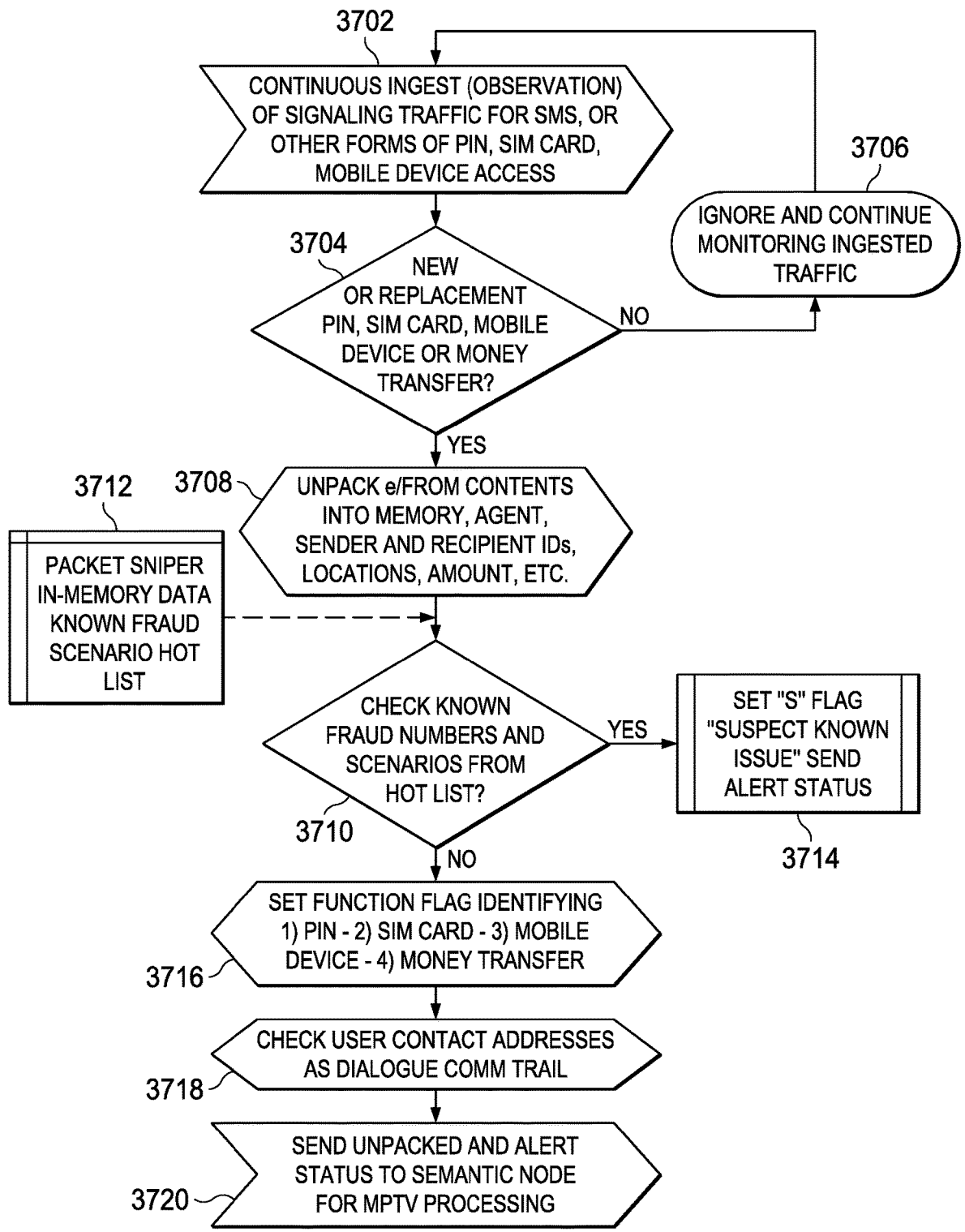
FIG. 37 provides a detailed flow diagram of the manner in which ingestor node software monitors for new or replacement PINS, SIM cards or mobile devices.

Referring now to FIG. 37, there is illustrated a more detailed flow diagram of the operation of the ingestor flow software of ingestor node 3004 that monitors for usage of new or replacement PINs, SIM cards or mobile devices. Ingestor node 3004 continuously ingests at step 3702 the network traffic for SMS or other forms of PIN, SIM card or mobile device access. Inquiry step 3704 determines if the detected information relates to new or replacement SIM card, PIN, mobile device or money transfer. If not, the process is ignored at step 3706 and returns to inquiry step 3704. If inquiry step 3704 determines that the data does relate to one of these items, information associated with the data is unpacked and stored in a memory of the ingestor node 3004 at step 3708. This information may comprise the agent identity, sender and recipient IDs, locations, amount of transfer, etc. Next, at step 3710 a determination is made if the detected information is associated with known fraud numbers or scenarios based upon a "hot list" at the ingestor node 3004. The information within the "hot list" is provided from the packet sniper and in-memory data of known fraud scenarios 3712. If a fraud number or fraud scenarios are detected at step 3710, a flag is set indicating a suspected known issue and an alert status is sent at step 3714. If inquiry step 3710 detects no known number or scenario within the "hot list," a function flag is set at step 3716 that identifies the PIN, SIM card, mobile device or money transfer operation as a "hot list" item. The user contact address is checked at step 3718 for the user associated with the data to enable a verification dialogue with the user. The unpacked data and alert status are transmitted at step 3720 to the semantic node for MPTV system 3000 processing.

Figure 36:
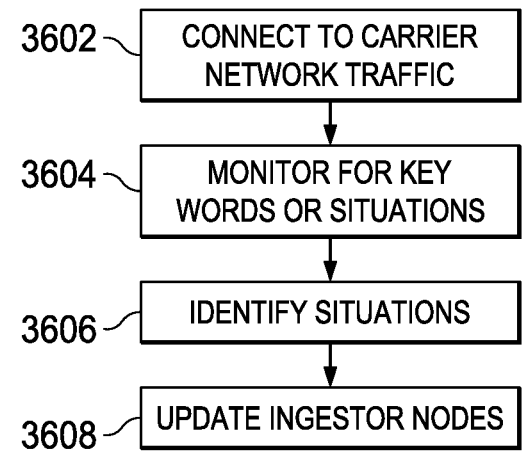
FIG. 36 is a flow diagram illustrating an ingestor node monitoring for a mobile money transfer.

Referring now to FIG. 36, there is illustrated the system 3000 capability to continuously audit all mobile money transfers for indications of socially-engineered and other types of fraud as it occurs, and to intercept it before the transaction completes. In the case of a mobile money transfer, the MPTV system 300 connects to and interacts in parallel alignment with the carrier network traffic at step 3602 using ingestor node 3004. This enables the ingestor node 3004 to monitor messaging undertaken between network users that indicates socially-engineered or other forms of fraud is occurring. The ingestor node 3004 inspects all traffic for mobile money transfer protocols or communications (such as SMS messaging) to identify such mobile money transfers, forms, hot-listed newly issued or suspected PINS. It can also deduce fraudulent payment situations using keywords or comparative situations (such as location or frequency) with regard to mobile money transfers or other prescribed indicators of fraud at step 3604. In this regard, there is an option to turn on inspection by the ingestor nodes of all messaging for keywords indicating situations suggestive of phishing, fraud or other threatening interactions. When the semantic node 3014 positively identifies such interactions at step 3606, the ingestor nodes 3004 within the system 3000 are updated 3608 with specific text and keywords to provide continual updating for the contextual self-learning process.

The API 3010 to the financial system 3008 is a bidirectional API that enables step 3106 of FIG. 31 to interact with the carrier mobile money transfer financial system 3008 to send instructions and commands, and to receive messages. The API 3010 interface acts as a virtual administrator to the financial services system 3008 for authorization commands from the semantic node 3014 (these can be diverted to a human administrator if desired). The authorization commands may comprise commands such as to place a hold on the account, place release on fund transfer, send fund transfer, request PIN change, generate soft PIN or automatically generated PIN. In sending the request through the API 3010, the processes carried out in step 3106 update their own files to indicate that interactions on this request have been completed.

Figure 38:
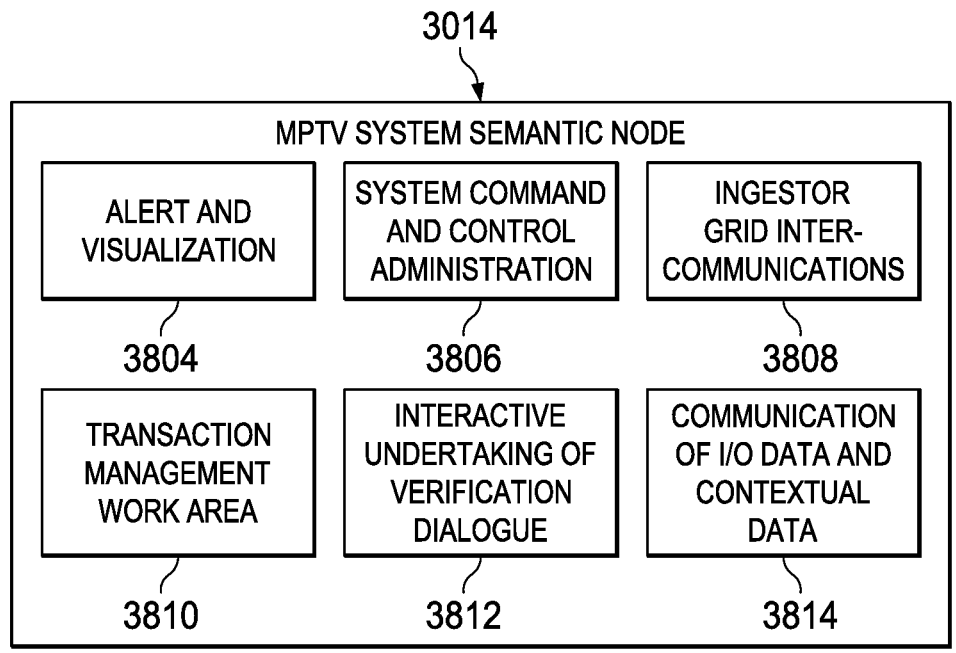
FIG. 38 illustrates the functional structure of the MPTV system within a semantic node.

Referring now to FIG. 38, there is more particularly illustrated the functional structure of the MPTV system within the semantic node 3014 for performing the analysis of the carrier traffic monitored by the ingestor nodes 3004 and 3012. The semantic node 3014 provides machine-driven contextual verification algorithms and transaction management. The semantic node 3014 houses the software-defined MPTV application that provides the deductive identity verification and interactive social conversation logic for verifying a transaction. The MPTV system semantic node 3014 consists of six primary functions. Three of these functions are provided to the MPTV system 3000 through the applications framework described herein above with respect to FIGS. 1-26. The remaining three functions are unique to the MPTV system 3000.

The three common functions include the alert and visualization functions 3804 for generating system alerts. The system command-and-control administration functions 3806 provide for command-and-control of system functions of the MPTV system 3000. The ingestor grid communications function 3808 enables communication between the semantic node 3014 and the various ingestor nodes 3004 and 3012 that the semantic node may be in communication with. It should be realized that while only a single ingestor node 3004 monitoring the mobile carrier services, a single ingestor node 3012 monitoring communications between agents, provisioning processes, and the customer care center, and a single semantic node 3014 have been illustrated with respect to FIG. 30, multiple such nodes may be utilized.

The three functions that are unique to the MPTV system 3000 are driven by data received from the ingestor nodes 3004 and 3012. These functions include a transaction management and work area function 3810, interactive undertaking of stored and contextually driven dialogue functions 3812 and communication for inbound and outbound data update and contextual learning functions 3814. The verification data is factual and empirical and is customized by the MPTV system 3000 to the individual user. In customization, the data is continuously updated by MPTV system 3000 as background tasks to MPTV's primary task of verification of intent. The carrier is able to set hurdles (metrics) to be achieved that allow the MPTV system 3000 to approve (or not approve) a mobile provisioning or mobile money transfer situation. If not approved, or if recommended not to proceed in a provisioning situation, the MPTV system 3000 sends an alert to the retail agent, the customer care representative and the carrier provisioning system. If not approved or if recommended not to proceed with a mobile money transfer situation, MPTV system 3000 informs the sender and recipient of such a non-approval and sends an alert and recommendation not to proceed to the mobile carrier financial system. In this manner, the transaction can be stopped, but in any regard, it is recorded as suspect, and tagged for future reference. If the transaction is approved, the MPTV system 3000 releases the transaction or situation from hold status and informs the carrier customer care center, retail agent or financial system that the transaction is completed.

Thus, the MPTV system 3000 semantic node 3014 takes inputs from ingestor nodes 3004 and 3012 and interfaces connections to other communication systems such as SMS or email services. It provides a contextual verification dialogue with both the sender and the recipient of a transaction or event in order to substitute a machine-interpreted validity and intent of the transaction or message. This dialogue occurs while the mobile money transfer transaction is underway and before the MPTV system 3000 determines whether to allow the transaction to occur. The generation of this dialogue is strengthened in parallel by all the inputs of external big data pools or other information sources (such as HLR/HSS interfaces) based on the prescribed and dynamic preset level of verification required by the mobile carrier and/or as the automated MPTV system 3000 engages in the process of self-learning. As the MPTV system 3000 in semantic node 3014 has the capability to manually or dynamically update its parameters based both on actual events as they occur and on trending information from big data pools, these parameters and the resulting dialogue is continuously updated.

Figure 39:
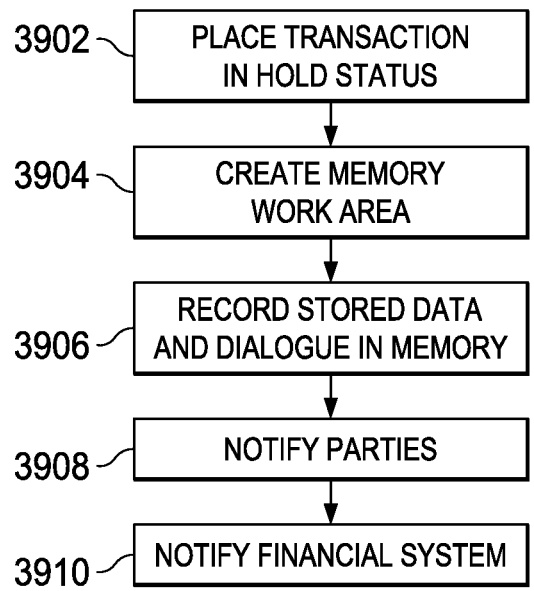
FIG. 39 is a flow diagram illustrating the operation of the MPTV system semantic node for verifying the integrity of a mobile money transfer.

FIG. 39 generally illustrates a flow diagram of the operation of the MPTV system semantic node 3014 for verifying the integrity of a mobile money transfer. To facilitate the dialogue, the mobile money transfer transaction or event data that is detected is placed into a hold status at step 3902. The MPTV system 3000 creates a work area internal to its memory at step 3904 and records stored data and dialogue within the memory work area. The system 3000 notifies the parties at step 3908 that a verification process is about to occur and notifies the financial system 3008 or other affected systems at step 3910 to suspend the transaction or event until cleared by the MPTV system 3000.

Figures 40, 41:
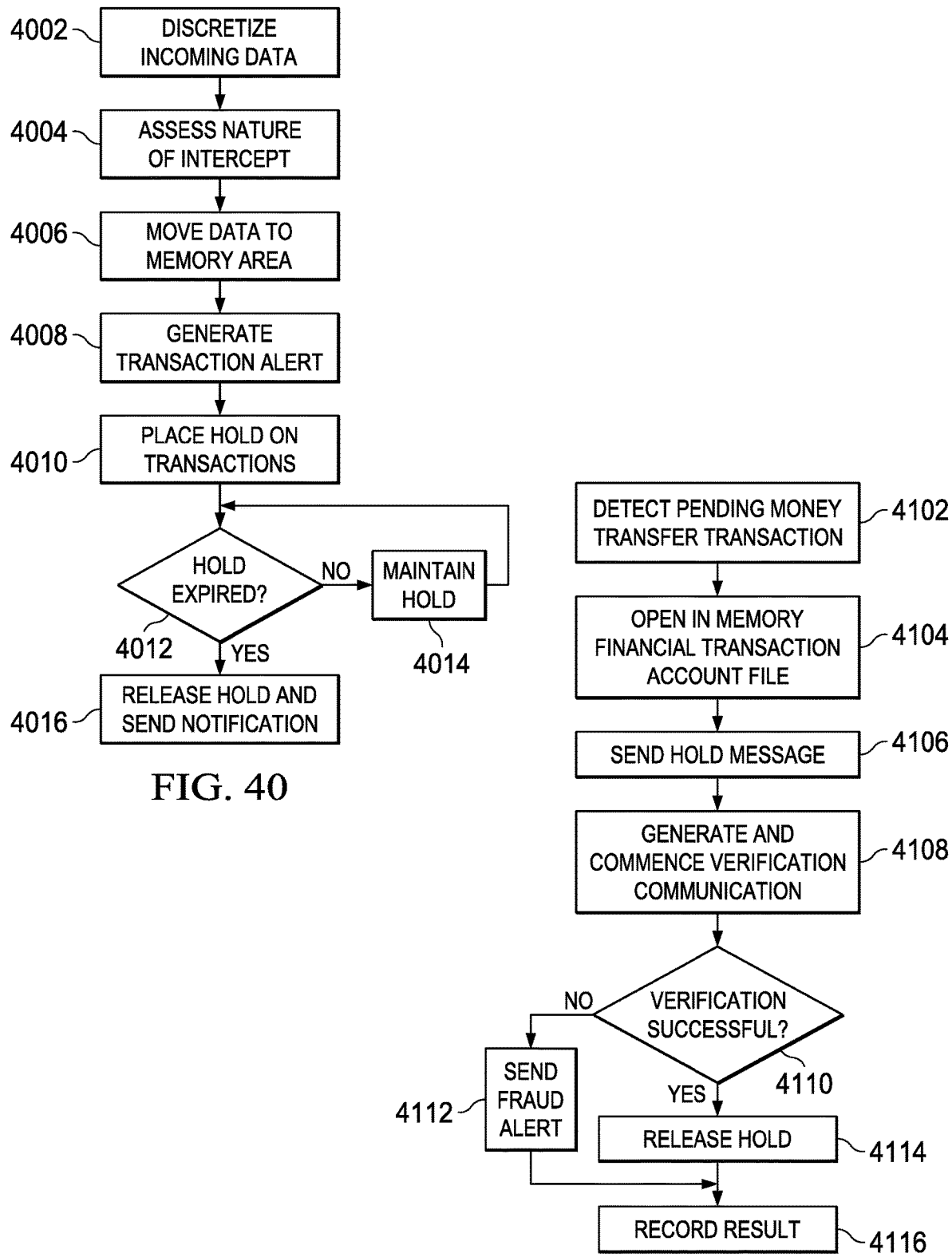
FIG. 40 is a flow diagram illustrating the operation of the transaction management work area functions.
FIG. 41 is a flow diagram illustrating the operation of the interactive undertaking of stored and contextually driven verification dialog functions.

The operations of the transaction management work area functions 3810 are more fully illustrated with respect to the flow diagram of FIG. 40. Using the semantic node time dependent buffer capture area, the MPTV system 3000 discretizes at step 4002 the incoming data from the ingestor nodes 3004 and 3012 and the API 3010. The semantic node 3014 assesses the nature of the intercept of the incoming traffic with regard to the required action. Examples of actions include, but are not limited to: a) new or replacement PIN, SIM card or mobile device ID verification, b) ID verification of in-use PIN, SIM card or mobile devices on a "watch list", c) mobile money transfer, d) suspected SMS threats or scams, or e) other related carrier selected ingestor node snipe criteria or requested data such as that provided by network elements (example: by HLR, HSS or RAN interfaces, or virtual private networks (VPNs)).

After identifying the need at step 4004, the data is moved out of the time dependent buffers of the semantic node 3014 into the discrete memory areas made available for the independent parallel processes covering the verification actions above, and others, at step 4006. The identification of one of these verification cases triggers a transaction alert at step 4008 to the carrier's financial system, and a hold is placed at step 4010 on any of the current or future transactions related to the item until cleared by the MPTV system 3000. The "hold" lasts for a configurable time period 4010 and serves as a timeout delay pending no resolution of identity, intent or verification. Thus, inquiry step 4012 determines if the hold is expired and if not, maintains a hold at step 4014. Once the hold period expires, the hold is released at step 4016 and a notification is sent. The verification actions have the ability to timeout and default to approved or not approved in which case the work areas are released and the notification is sent of a timed out default status result.

Referring now to FIG. 41, there is illustrated a flow chart describing the operation of the interactive undertaking of stored and contextually-driven verification dialogue functions 3812. Verification processes and dialogue are independently organized and aligned with the verification actions as described here and above with respect to FIG. 40. Each process is multithreaded and able to function in parallel to each other. Each process contains its own dialogue and data pertinent to its use case. Each process is also able to access a central file for commonly used data that may be internal or external to the MPTV system 3000.

Upon determining that the use case in question is a pending mobile money transfer transaction at step 4102, the MPTV system 3000 opens at step 4104 an in-memory temporary financial transaction account file as an application workspace and record. This file is used to store transactional message information and is used as a temporary work area so that no interaction or data is lost. This temporary work area is released on completion of the verification process or can be moved to a longer term storage as an audit trail. Simultaneously, the MPTV system 3000 sends a hold message at step 4106 to the financial authorization or transaction processing system. The MPTV system 3000 notifies the financial system 3008 of the status of the social verification, and the "hold" is either removed if verification is approved and the transaction continues, or can be substantiated as "declined" if the social verification for PIN or money mobile transfer fails.

Using the work area, the MPTV system 3000 commences communication with the sender and/or recipient of the transaction by messages via SMS or using other registered communication methods. The system 3000 runs through a prescribed, dynamically changeable dialogue of questions with specific prescribed answers at step 4108. A standard list of questions is precompiled and updated regularly as a matter of process using master files. These questions have been prescribed as a general set of questions and are customized on an individual basis with answers and ongoing questions that are personal only to the pre-verified sources (the sender and/or receiver).

Examples of dialogue (not limited to):
"Transaction received, waiting for verification"
"Is this what you want to do?"
"Do you have the money?"
"Are you in danger?"
"Are you with the seller now?"
"Do you have a brother or sister?"
"Did you receive the money before returning it?"
"Have you received the goods you are paying for?"
"Are you sure you are paying for a real service?"
"Have you borrowed the money for this?"
"Do you want to automatically contact the police?"
"Transaction sent, waiting for verification"
"Have you completed the work/sale?"
"Is the amount being transferred what you expected?"
"Transaction verified"
. . . "etc"

These questions can be specifically generated and selected based upon the keywords and dialogue between sender and receiver and the contextual information generated by the precious responses, the sender/receiver account information and network inputs, as well as other dynamically-generated inputs.

Examples of specific questions and inputs based on the fraud use cases introduced in this document hereinabove, including but not limited to:

Mistaken Deposit
Before 'returning' the money:
"Are you sure you have received "x" dollars from this person?"
In the semantic node 3014
Is the 'mistaken depositor' currently (or in the near past) communicating with other subscribers with similar dialogue and/or similar mobile money transfer amounts?
If so this may indicate he is perpetrating this scam on multiple victims simultaneously.
Look for these patterns on both the sender/receiver end.
False Job Applications
Before paying the 'application fee':
"Have you checked that this job is legitimate?"
"Has anyone else you know paid to apply for this job?"
"Have you called this employer to confirm there is a job available?"
In the semantic node 3014
Is the 'employer' currently (or in the near past) receiving many application fees?
Is he receiving phone calls or only inbound mobile money transfers?
Has he been on the network as a subscriber for a short period of time?
Correlate with provisioning data
This may indicate he is perpetrating this scam on multiple victims simultaneously.
Threats/Coercion
Before sending mobile money transfer
"Are you in danger?"
"Would you like to agree to this transaction for safety, but actually have it be delayed until you can contact the police?"

"Would you like to contact the police silently by pressing 5?"

Responses are received which lead to the next set of questions and answers until exhausted. An approved verification hurdle, such as 60% or 100% of questions answered correctly, must be reached. This hurdle can be adjusted manually or dynamically by the system. Thus, inquiry step 4110 determines if the verification has been successful. When the dialogue is approved, a release message is sent at step 4114 to the transaction vehicle where the event was previously notified to be placed on hold. If the dialogue is not approved, an alert is sent to the carrier's fraud detection and security authority at step 4112 of a possible fraud or nefarious activity occurrence.

The approvals and non-approvals are recorded for subsequent forensic reporting at step 4116 and MPTV system 3000 update. Non-approved events or transactions are updated to the ingestor "hot list" file for immediate and continuing trap and trace and to provide alerts when appearing on the carrier's network for any reason. Mobile devices, SIM cards, PINs or phone numbers are automatically removed from the suspect "hot list" after a number of approved transactions or events. This hurdle for automatic removal from the suspect watchlist can be adjusted manually or dynamically.

An alternative option is for the MPTV system 3000 to interact with the financial system 3008 and issue "soft token" PINs per transaction or for certain time periods to newly issued or replacement PIN holder's accounts. This will cause the financial institution to reject any transaction that occurs unless approved as to the fidelity or identity of the user and the transaction intent.

Referring now back to FIG. 38, the ingestor grid communications function 3808 controls communication for inbound and outbound data updates and contextual learning 3814 that are both active and passive. The MPTV system semantic node 3014 has active bidirectional communications capability, supplying the time dependent buffers with a constant input of targeted snipe packets for processing, and on-demand requests for situational data pertinent to the current verification processes in progress (for example interactive verification dialogue). These requests also have access to ingestors 3004, 3012 attached to relevant network elements.

The MPTV system 3000 ability to interface to outside big data pools is passive and runs as a background task. This background task regularly verifies the system's internal event-driven or empirical data for such metadata changes or trends from outside sources, and updates its internal files. In this manner, the MPTV system 3000 maintains and self-updates files from ingestor-driven experimental knowledge and from outside big data pool input for optimized relevancy. The operator or fraud/security analyst commands the interface through passive drivers and can provide global changes or system administrative functions.

Figure 42:
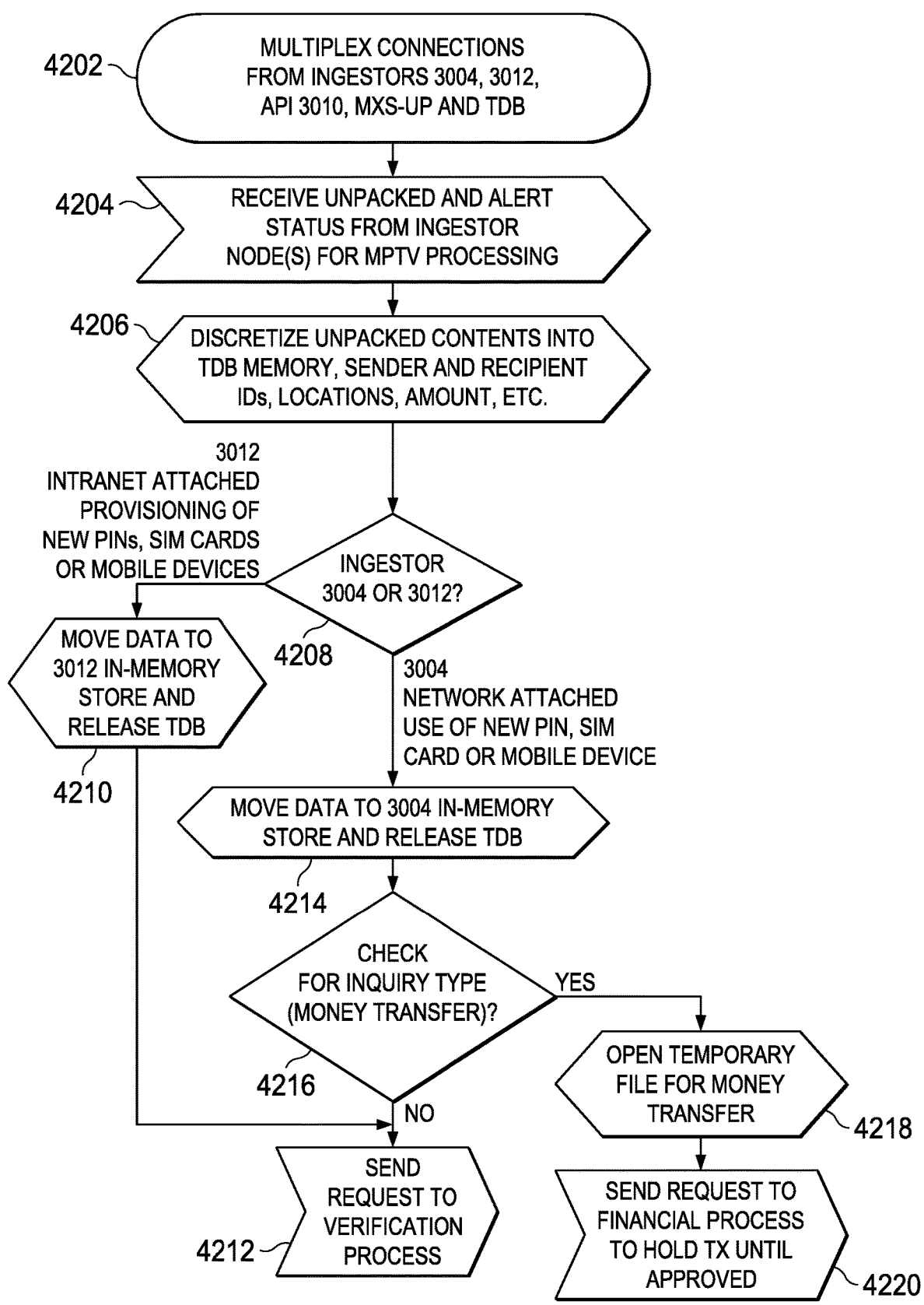
FIG. 42 is a flow diagram of the operation of a semantic node responsive to input from various ingestor nodes.

Referring now to FIG. 42, there is illustrated a flow diagram for the operation of the semantic node 3014 responsive to input from ingestor 3004 connected to a mobile carrier network 3002 and ingestor node 3012 connected to the intranet/provisioning process for provisioning new PINs or SIM cards or mobile devices. The semantic node 3014 includes multiple connections from ingestor nodes 3004 and 3012 and APIs 3010 at step 4202. The semantic node 3014 receives and unpacks at step 4204 alert status as information is received from ingestor nodes 3004 and 3012 for processing by the MPTV system 3000. The unpacked data is discretized at step 4206 into time dependent buffer memory as information such as sender and recipient IDs, locations, monetary amounts, etc. Inquiry step 4208 determines whether the information has been received from an ingestor node 3012 connected to an intranet network between agents, customer care centers and provisioning processes or an ingestor node 3004 connected to a mobile carrier network.

If inquiry step 4208 determines the data is from ingestor node 3012, the data is moved to ingestor node 3012 in-memory storage area and released from the time dependent buffer at step 4210. A request is sent to begin the verification process at step 4212. If inquiry step 4208 determines the data is from ingestor node 3004, the data is moved to ingestor node 3004 in-memory storage area and released from the time dependent buffer at step 4214. Inquiry step 4216 determines whether the inquiry type comprises a monetary transfer. If not, the request for a verification process is sent at step 4212. If a monetary transfer request has been received, a temporary file is opened at step 4218 for the monetary transfer, and a request for a financial process is transmitted at step 4220 along with a hold on the money transfer until approval by the MPTV system 3000.

Figure 43:
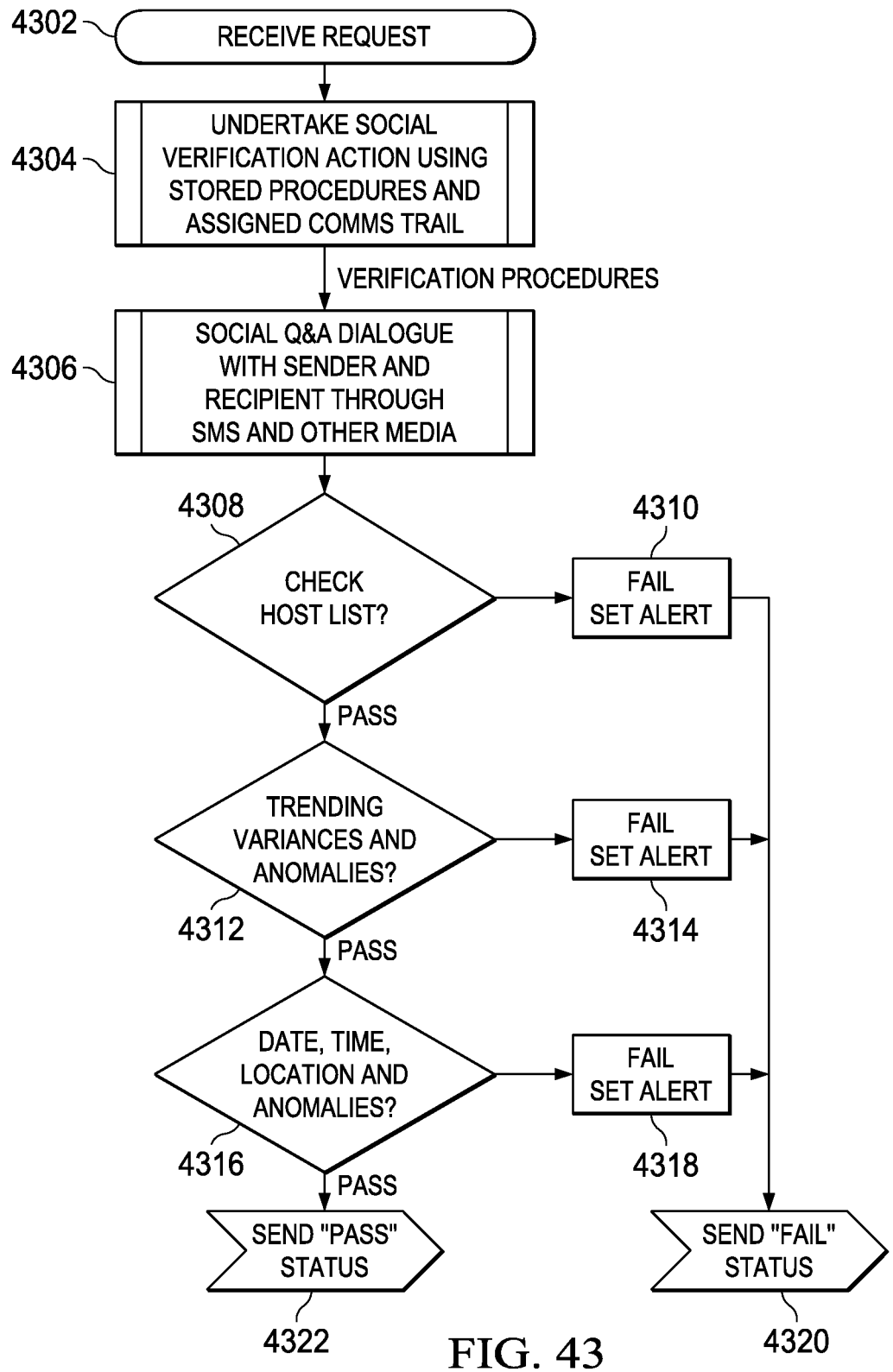
FIG. 43 is a flow diagram illustrating a social verification process.

Referring now to FIG. 43, there is illustrated an example social verification process responsive to a received request 4302. This is illustrative of the verification process parameters, which include but are not limited to those shown in FIG. 43. Responsive to the received request, the social verification process is initiated at step 4304 using stored procedures and assigned communications trails as discussed hereinabove. The verification procedures comprise a social Q&A dialogue at step 4306 between the sender and the recipient using SMS or other media. Inquiry step 4308 determines if the request relates to any items stored on the system "hot list." If so, a fail alert is set at step 4310. If the item is not on the "hot list," inquiry step 4312 determines if the item relates to any trending variances or anomalies indicating a problem with the verification request. If so, the fail alert is set at step 4314. If there are no variance or anomaly issues, inquiry step 4316 checks for any date, time or location anomalies. If any are detected, a fail alert is set at step 4318. Responsive to the setting of a fail alert at any of steps 4310, 4314 or 4318, the fail status is sent at step 4320. If no anomalies or "hot list" items are detected in any of inquiry steps 4308, 4312 or 4316, a pass status is sent at step 4322. If the sender/recipient fail the interactive dialogue 4306, a pass/fail status is sent at steps 4322 and 4320.

Figure 44:
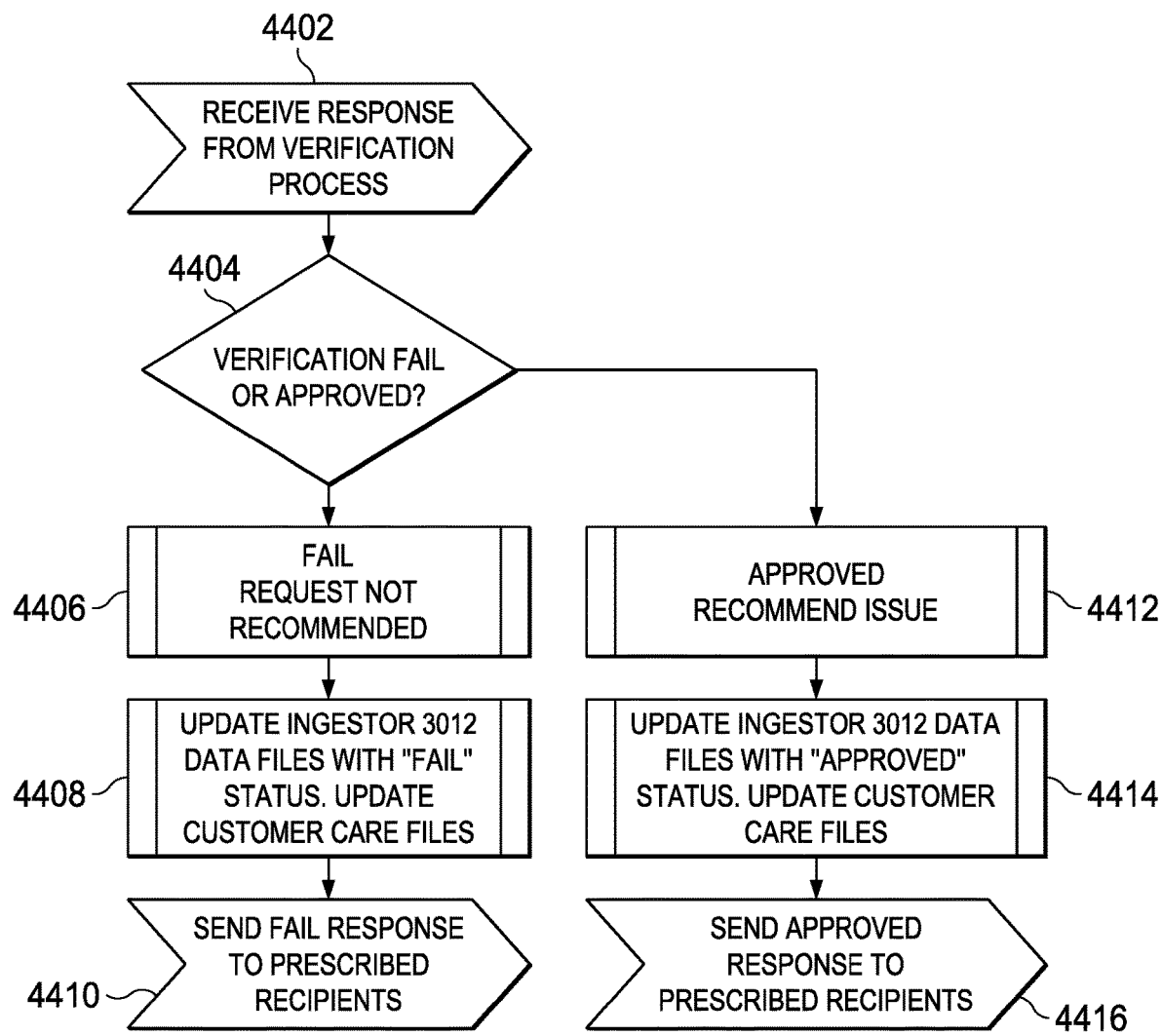
FIG. 44 illustrates a semantic node post-verification process.
Figure 45:
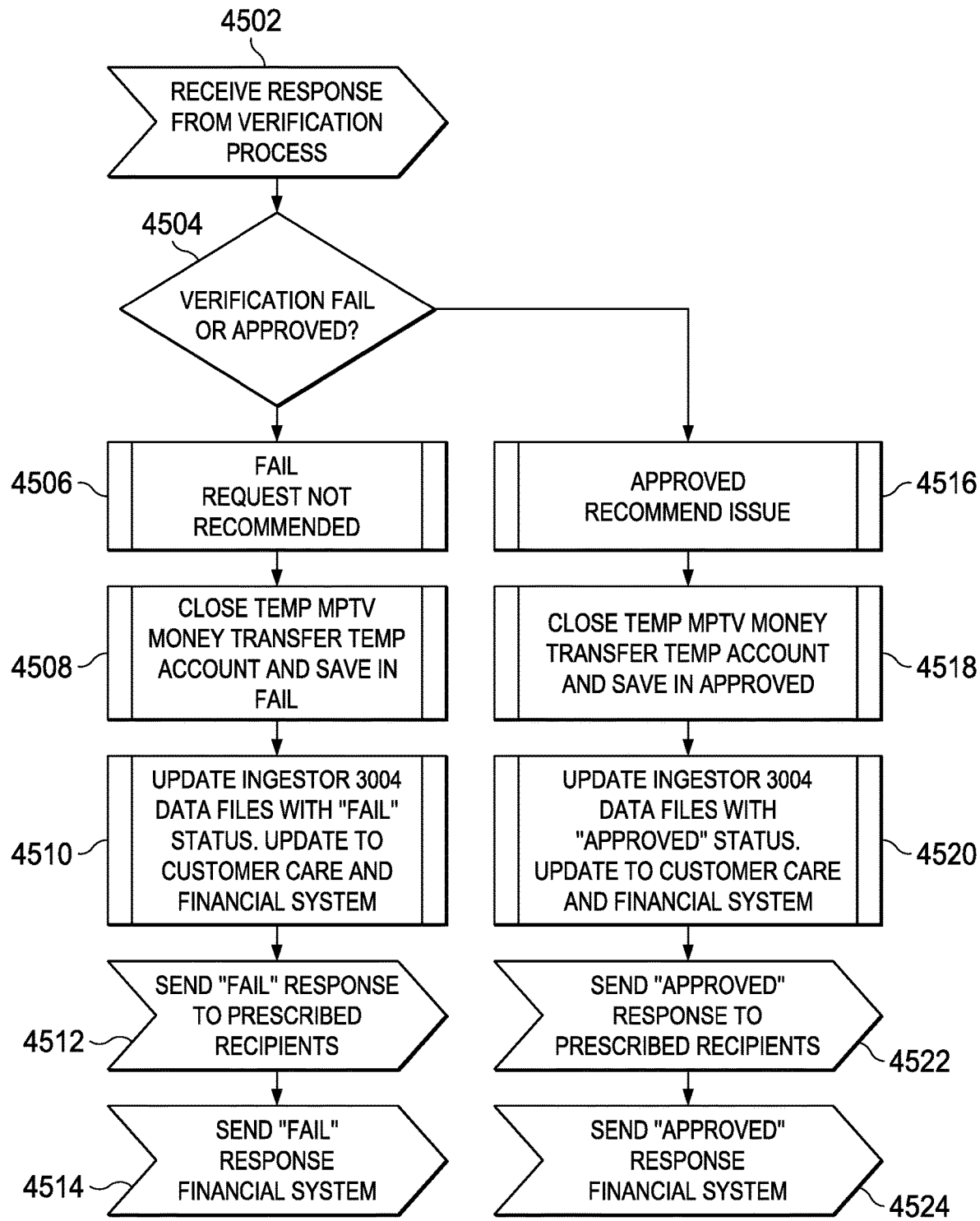
FIG. 45 provides a further illustration of the semantic node post-verification process

Referring now to FIGS. 44 and 45, there is illustrated the semantic node 3014 post-verification process responsive to the "fail" or "pass" status notification received from the social verification process discussed in FIG. 43. When a response is received from the verification process at step 4402 responsive to a request from ingestor node 3012, inquiry step 4404 determines whether the verification was failed or approved. If the request fails, the requested action is not recommended at step 4406, and the ingestor and data files are updated with a fail status, as are the customer care files at step 4408. A fail response indication is sent to the prescribed recipients at step 4410. If the verification process is approved, the request is recommended at step 4412 and the ingestor node 3012 data files are updated with an approved status, as are the customer care files at step 4414. An approval request is sent to the prescribed recipients at step 4416.

Referring now to FIG. 45, a response to the verification process relating to an ingestor node 3004 is received at step 4502. Inquiry step 4504 determines whether the verification request was failed or approved. Responsive to a failed request, the request is not recommended at step 4506, and the temporary MPTV money transfer temporary account is closed and saved in the fail indication at step 4508. The ingestor node 3004 data files are updated with a fail status as are the customer care and financial system files at step 4510. A fail response is transmitted to the prescribed recipients at step 4512 and to the financial system 3008 at step 4514. If the verification process has approved the request, the recommended item is approved at step 4516, and the temporary MPTV money transfer temporary account is closed and a save indication of approval is recorded for the request at step 4518. The ingestor node 3004 data files associated with the request are updated with an approved status as are the associated customer care and financial system files at step 4520. An approved response is sent to the prescribed recipients at step 4522 and to the financial system 3008 at step 4524.

It will be appreciated by those skilled in the art having the benefit of this disclosure that this system and method for real-time live-data analysis of network traffic provides a manner for monitoring and analyzing network content as the data is moving through the network and provides an ability to affect the outcome that ordinarily in the absence of such a system and method would be not-affected in relationship to its normal course of business.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for detecting a fraudulent attempt to activate a new PIN, SIM Card or mobile device comprising:
    monitoring, at a first processing node associated with a network interconnecting a first network point and a second network point, a mirrored live-data flow of a live data flow passing through the first processing node in a non-intrusive manner that does not affect the first live-data flow passing through the first processing node, wherein the live-data flow comprises data that is in active transmission between the first network point and the second network point and prior to storage of the data in a database;
    detecting that a transaction within the monitored live-data flow relates to an activation of the new PIN, SIM card or mobile device;
    comparing the detected transaction to a list of known fraud situations stored in the first processing node to determine if the detected transaction relates to a known fraud situation;
    generating an alert indication responsive to a determination the detected data relates to one of a plurality of known fraud situations;
    identifying the detected transaction as a potential fraud situation responsive to a determination the detected data does not relate to one of the plurality of known fraud situations; and
    performing an automatically generated dialog verification with a party requesting the new PIN, SIM Card or mobile device to verify identity of the party requesting the new PIN, SIM Card or mobile device for the detected transaction identified as the potential fraud situation.

2. The method of claim 1 further including storing within the first processing node the detected data relating to the activation of the new PIN, SIM card or mobile device.

3. The method of claim 2 wherein the stored information comprises at least one of agent identity, sender ID, recipient ID, sender location, recipient location and amount of money involved in the transaction.

4. The method of claim 1, wherein the known fraud situation comprises a known fraud number.

5. The method of claim 1, wherein the known fraud situation comprises a known fraud scenario.

6. The method of claim 1, wherein generating the alert indication further comprises:
    setting a flag indicating a suspected fraud situation responsive to the determination; and
    transmitting an alert message indicating the potential fraud situation responsive to the determination.

7. The method of claim 1, wherein the performing the automatically generated dialog verification further comprises determining a manner for contacting the party requesting the new PIN, SIM Card or mobile device.

8. The method of claim 1, wherein the performing the automatically generated dialog verification further comprises forwarding the data associated with the detected transaction from the first processing node to a second processing node.

9. A system for detecting a fraudulent attempt to activate a new PIN, SIM Card or mobile device comprising:
    a first processor associated with a network for implementing a first processing node, the first processing node configured to:
        monitor, at the first processing node associated with a network interconnecting a first network point and a second network point, a mirrored live-data flow of a live data flow passing through the first processing node in a non-intrusive manner that does not affect the first live-data flow passing through the first processing node, wherein the live-data flow comprises data that is in active transmission between the first network point and the second network point and prior to storage of the data in a database;
        detect that a transaction within the monitored live-data flow relates to an activation of the new PIN, SIM card or mobile device;
        compare the detected transaction to a list of known fraud situations stored in the first processing node to determine if the detected transaction relates to a known fraud situation;
        generate an alert indication responsive to a determination the detected data relates to one of a plurality of known fraud situations;
        identify the detected transaction as a potential fraud situation responsive to a determination the detected data does not relate to one of the plurality of known fraud situations; and
        perform an automatically generated dialog verification with a party requesting the new PIN, SIM Card or mobile device to verify identity of the party requesting the new PIN, SIM Card or mobile device, for the detected transaction identified as the potential fraud situation.

10. The system of claim 9, wherein the first processing node is further configured to store at a location associated with the first processing node the detected data relating to the activation of the new PIN, SIM card or mobile device.

11. The system of claim 10, wherein the stored information comprises at least one of agent identity, sender ID, recipient ID, sender location, recipient location and amount of money involved in the transaction.

12. The system of claim 9, wherein the known fraud situation comprises a known fraud number.

13. The system of claim 9, wherein the known fraud situation comprises a known fraud scenario.

14. The system of claim 9, wherein the first processing node is further configured to:
set a flag indicating a suspected fraud situation responsive to the determination; and
transmit an alert message indicating the potential fraud situation responsive to the determination.

15. The system of claim 9, wherein the first processing node is further configured to perform the automatically generated dialog verification by determining a manner for contacting the party requesting the new PIN, SIM Card or mobile device.

16. The system of claim 9, wherein the first processing node is further configure to perform the automatically generated dialog verification by forwarding the data associated with the detected transaction from the first processing node to the second processing node.

17. A method for detecting a fraudulent attempt to activate a new PIN, SIM Card or mobile device comprising:
monitoring, at a first processing node associated with a network interconnecting a first network point and a second network point, a mirrored live-data flow of a live data flow passing through the first processing node in a non-intrusive manner that does not affect the first live-data flow passing through the first processing node, wherein the live-data flow comprises data that is in active transmission between the first network point and the second network point and prior to storage of the data in a database;
detecting that a transaction within the monitored live-data flow relates to an activation of the new PIN, SIM card or mobile device;
comparing the detected transaction to a list of a known fraud numbers or known fraud scenarios stored in the first processing node to determine if the detected transaction relates to a known fraud number or known fraud scenario;
generating an alert indication responsive to a determination the detected data relates to one of a plurality of known fraud situations;
identifying the detected transaction as a potential fraud situation responsive to a determination the detected data does not relate to a known fraud number or known fraud scenario;
determining a manner for contacting the party requesting the new PIN, SIM Card or mobile device;
forwarding the data associated with the detected transaction from the first processing node to a second processing node; and
performing an automatically generated dialog verification with a party requesting the new PIN, SIM Card or mobile device to verify identity of the party requesting the new PIN, SIM Card or mobile device from the second processing node, for the detected transaction identified as the potential fraud situation.

18. The method of claim 17, wherein generating the alert indication further comprises:
setting a flag indicating a suspected fraud situation responsive to the determination; and
transmitting an alert message indicating the potential fraud situation responsive to the determination.

19. The method of claim 17 further including storing within the first processing node the detected data relating to the activation of the new PIN, SIM card or mobile device.

20. The method of claim 19 wherein the stored information comprises at least one of agent identity, sender ID, recipient ID, sender location, recipient location and amount of money involved in transaction.

* * * * *